(12) United States Patent
Dutronc et al.

(10) Patent No.: US 10,764,019 B2
(45) Date of Patent: Sep. 1, 2020

(54) RADIO COMMUNICATIONS SYSTEM AND METHOD BASED ON TIME TWISTED WAVES

(71) Applicant: EUTELSAT S A, Paris (FR)

(72) Inventors: Jacques Dutronc, Paris (FR); Antonio Saitto, Paris (FR)

(73) Assignee: EUTELSAT S A, Paris (FR)

( * ) Notice: Subject to any disclaimer, the term of this patent is extended or adjusted under 35 U.S.C. 154(b) by 0 days.

(21) Appl. No.: 16/469,521

(22) PCT Filed: Dec. 14, 2016

(86) PCT No.: PCT/IB2016/001972
§ 371 (c)(1),
(2) Date: Jun. 13, 2019

(87) PCT Pub. No.: WO2018/109518
PCT Pub. Date: Jun. 21, 2018

(65) Prior Publication Data
US 2020/0084012 A1 Mar. 12, 2020

(51) Int. Cl.
| | | |
|---|---|---|
| H04L 27/26 | (2006.01) | |
| H04L 5/00 | (2006.01) | |
| H04L 5/04 | (2006.01) | |
| H04L 27/36 | (2006.01) | |
| H04W 16/02 | (2009.01) | |
| H04L 27/22 | (2006.01) | |
| H04L 27/20 | (2006.01) | |

(52) U.S. Cl.
CPC .............. *H04L 5/04* (2013.01); *H04L 27/20* (2013.01); *H04L 27/22* (2013.01); *H04L 27/36* (2013.01); *H04W 16/02* (2013.01)

(58) Field of Classification Search
CPC ..... H04B 10/516; H04B 10/5161; H04L 5/04; H04L 27/20; H04L 27/22; H04L 27/36; H04W 72/044; H04W 16/02
See application file for complete search history.

(56) References Cited

U.S. PATENT DOCUMENTS

2015/0288542 A1  10/2015  Ashrafi et al.
2016/0044647 A1*  2/2016  Ashrafi .................. H04J 14/06
                                                         370/330

FOREIGN PATENT DOCUMENTS

| GB | 2 410 130 A | 7/2005 |
|---|---|---|
| WO | WO 2012/084039 A1 | 6/2012 |
| WO | WO 2014/016655 A1 | 1/2014 |

(Continued)

OTHER PUBLICATIONS

International Search Report as issued in International Patent Application No. PCT/IB2016/001972, dated Aug. 14, 2017.

(Continued)

*Primary Examiner* — David S Huang
(74) *Attorney, Agent, or Firm* — Pillsbury Winthrop Shaw Pittman LLP

(57) ABSTRACT

A radio communications method includes carrying out, by a transmitter, transmission operations that make use of different filters for the transmission of main mode signals and twisted wave signals. The radio communications method further includes carrying out, by a receiver, reception operations. The different filters include a first transmission filter and a second transmission filter that have different filtering characteristics.

20 Claims, 44 Drawing Sheets

(56) References Cited

FOREIGN PATENT DOCUMENTS

| WO | WO 2015/067987 A1 | 5/2015 |
| WO | WO 2015/068036 A1 | 5/2015 |
| WO | WO 2015/189653 A1 | 12/2015 |
| WO | WO 2015/189703 A2 | 12/2015 |
| WO | WO 2015/189704 A2 | 12/2015 |

OTHER PUBLICATIONS

Mohammadi, M., et al., "Orbital angular momentum in radio—a system study," IEEE Transactions on Antennas and Propagation, IEEE Service Center, vol. 58, No. 2, Feb. 2010, 8 pages.

Tamburini, F., et al., "Encoding many channels in the same frequency through radio vorticity: first experimental test," arXiv.org, Jul. 2011, 17 pages.

\* cited by examiner

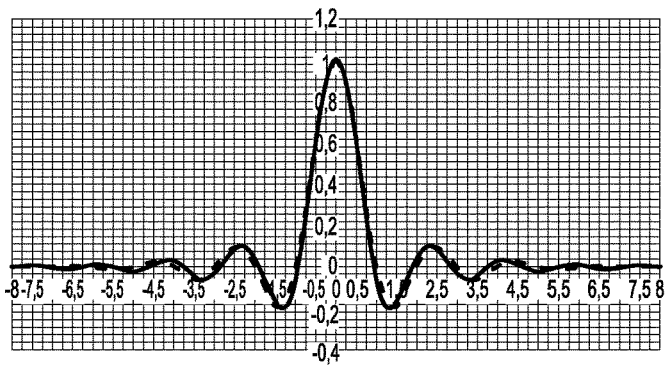

Main Mode signal at the output of the 1st Filtering Module 112

- - - - Raised cosine - roll-off 20%

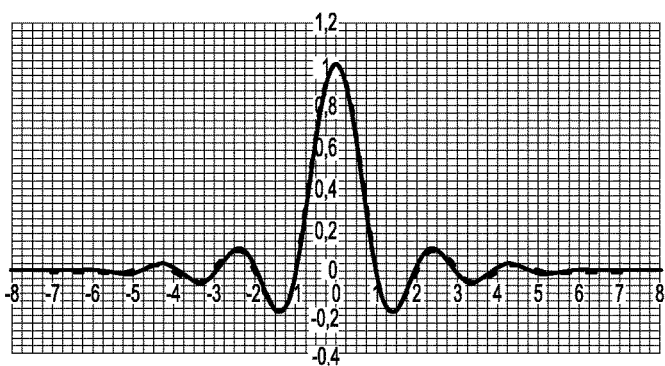

HOM signal at the output of the 2nd Filtering Module 114

- - - - Raised cosine - roll-off 20%

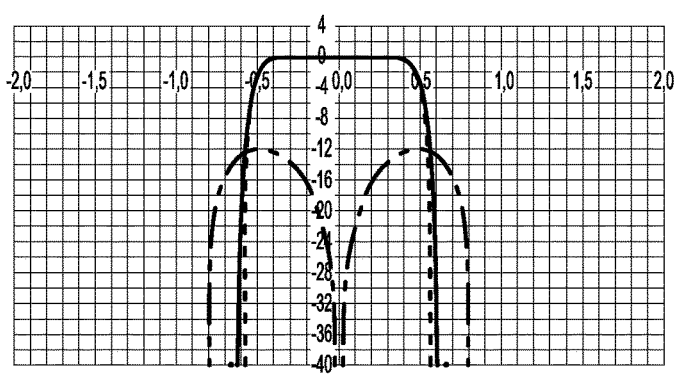

Main Mode spectrum at the 1st Combining Module 115

- - - - Raised cosine - roll-off 20%

- — - HOM spectrum at the 1st Combining Module 115

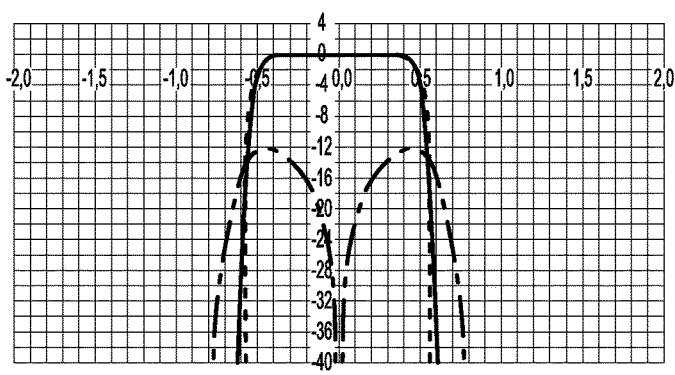

Signal spectrum at the 1st Reception Filter 122a

- - - - Raised cosine - roll-off 20%

- — - HOM spectrum at the 1st Reception Filter 122a

FIG. 5A

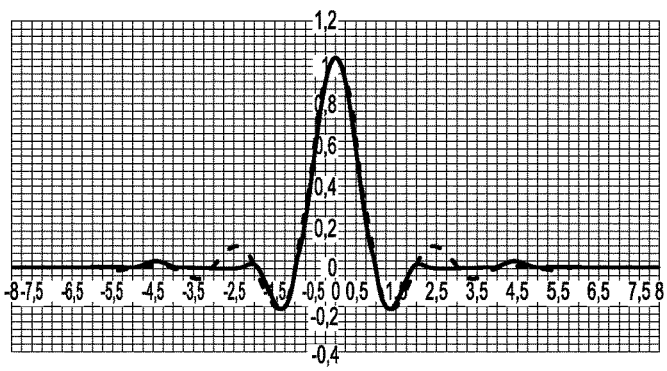

Main Mode signal at the
——— output of the 1st Filtering
Module 112

- - - - Raised cosine - roll-off 20%

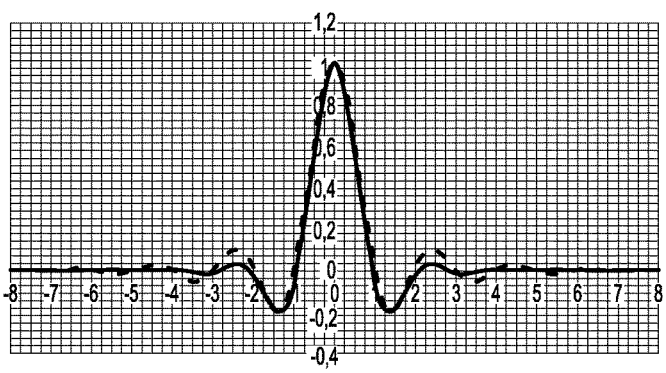

HOM signal at the
——— output of the 2nd Filtering
Module 114

- - - - Raised cosine - roll-off 20%

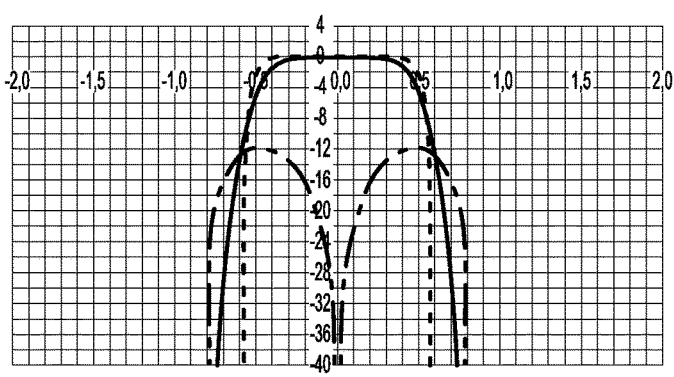

——— Main mode spectrum at the
1st Combining Module 115

- - - - Raised cosine - roll-off 20%

- — - HOM spectrum at the
1st Combining Module 115

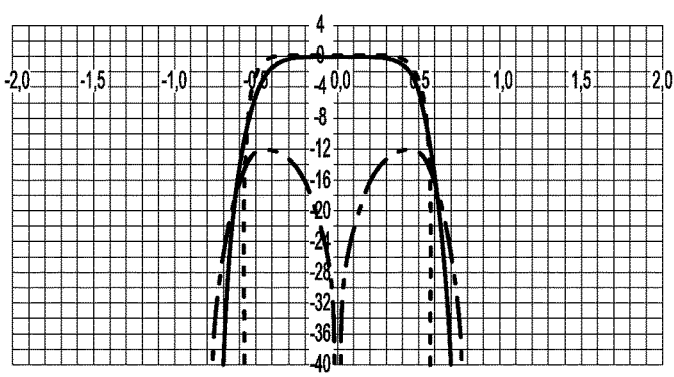

——— Signal spectrum at the 1st
Reception Filter 122a

- - - - Raised cosine - roll-off 20%

- — - HOM spectrum at the
1st Reception Filter 122a

FIG. 5C

Table I

| | FULL TAIL | Rectangular time window | Smoothed 100% time window |
|---|---|---|---|
| Inter Frame Main mode Interference dB | -36,0 | -39,0 | -43,0 |
| Inter Frame Interference Higher Order Modes dB | -23,8 | -34,0 | -30,0 |
| Adjacent channel Interference dB | -28,0 | -26,0 | -28,0 |

FIG. 6

Table II

| | Partitioning TX 0% and RX 100% HOM filters | Partitioning TX 50% and RX 50% HOM filters | Partitioning TX 100% and RX 0% HOM filters | Partitioning TX 10% and RX 90% HOM filters |
|---|---|---|---|---|
| Inter Frame Interference Main mode dB | -44,0 | -39,0 | -35,4 | -43,0 |
| Inter Frame Interference Higher Order mode dB | -29,0 | -31,0 | -34,0 | -30,2 |
| Adjacent Channel Interference dB | -27,0 | -29,0 | -22,0 | -28,0 |
| S/N variation at RX dB | 0,2 | 0,5 | 0,6 | 0,4 |

FIG. 8

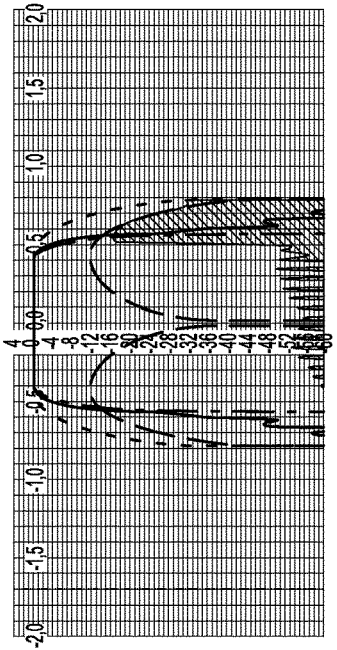

FIG. 7A

- - Raised cosine, roll-off= 20% bandwidth increase 0% dB
—— Twisted signal raised cosine roll-off 32% attenuation HMO/MM= 0dB
- - - Raised cosine for HOM dB FcHOM/FcMM= 1,25 HOM roll-off= 32%
—— Adjacent channel interference  interference power density same system -27,5 dB adjacent channel interference -35 dB
—— Signal spectrum at the 1st Reception Filter 122a

FIG. 7B

- - Raised cosine, roll-off= 20% bandwidth increase 0% dB
—— Twisted signal raised cosine roll-off 32% attenuation HMO/MM= 0dB
- - - Raised cosine for HOM dB FcHOM/FcMM= 1,25 HOM roll-off= 32%
—— Adjacent channel interference  Interference power density same system -26,1 dB adjacent channel interference -35 dB
—— Signal spectrum at the 1st Reception Filter 122a

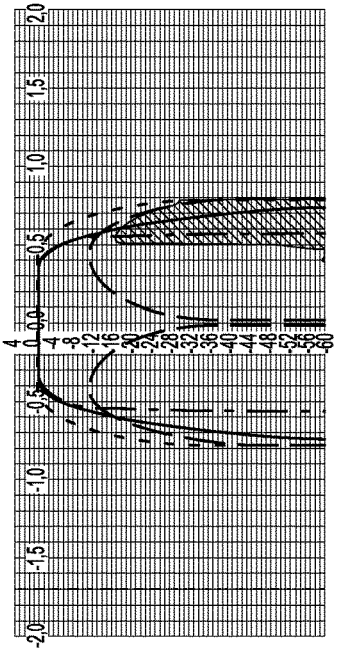

FIG. 7C

- - Raised cosine, roll-off= 20% bandwidth increase 0% dB
—— Twisted signal raised cosine roll-off 32% attenuation HMO/MM= 0dB
- - - Raised cosine for HOM dB FcHOM/FcMM= 1,25 HOM roll-off= 32%
—— Adjacent channel interference  interference power density same system -27,2 dB adjacent channel interference -35 dB
—— Signal spectrum at the 1st Reception Filter 122a Table III

| | transponder bandwidth (MHz) | transponder usable bandwidth (MHz) | Msymbol/s DVB ROF 35% | Msymbol/s DVB ROF 30% | Msymbol/s DVB ROF 25% | Msymbol/s DVB ROF 20% New Standard | Msymbol/s DVB ROF 5% (conventional system limit) | Maximum achievable performance |
|---|---|---|---|---|---|---|---|---|
| Conventional symbol rate | 40,0 | 36,0 | 26,7 | 27,7 | 28,8 | 30,0 | 34,3 | 34,29 |
| overall transmission gain with constant power conventional system wrt 35% ROF | | | 1,00 | 1,03 | 1,06 | 1,09 | 1,16 | 1,16 |
| additional symbol rate supported by mode 1 | | | 12,3 | 12,7 | NA | NA | NA | 12,74 |
| Overall symbol rate mode 0+mode 1 | | | 38,93 | 40,43 | 28,80 | 30,00 | 34,29 | 40,43 |
| overall transmission gain with constant power mode 0+mode 1 | | | 1,28 | 1,31 | NA | NA | NA | 1,31 |
| additional symbol rate supported by mode 2 | | | 6,13 | 6,37 | 6,62 | 6,90 | NA | 6,90 |
| Overall symbol rate mode 0+mode 2 | | | 32,8 | 34,1 | 35,4 | 36,9 | 34,3 | 36,90 |
| overall transmission gain with constant power mode 0+mode 2 | | | 1,14 | 1,17 | 1,20 | 1,24 | NA | 1,24 |

FIG. 14

Table IV

| ROF | symbol rate mode 0 for 36 MHz transponder | Symbol rate mode 0+mode 1 | Matrix noise level amplification factor dB | Gain factor | max bit rate over 36 MHz at 15 dB S/N | max bit rate over 36 MHz at 15 dB S/N using mode 0 only |
|---|---|---|---|---|---|---|
| 35% | 26,67 | 37,33 | -0,20 | 1,26 | 169,07 | 134,07 |
| 30% | 27,69 | 38,77 | 0,40 | 1,21 | 172,25 | 140,69 |
| 25% | 28,80 | 40,32 | 1,60 | 1,17 | 164,16 | 147,90 |
| 20% | 30,00 | 42,00 | 4,70 | 0,81 | 107,10 | 155,78 |
| 15% | 31,30 | 43,83 | 13,00 | 0,30 | 43,83 | 154,33 |
| 10% | 32,73 | 45,82 | 22,00 | 0,20 | 7,53 | 161,27 |
| 5% | 34,29 | 48,00 | 32,00 | 0,03 | 0,69 | 167,87 |

FIG. 17

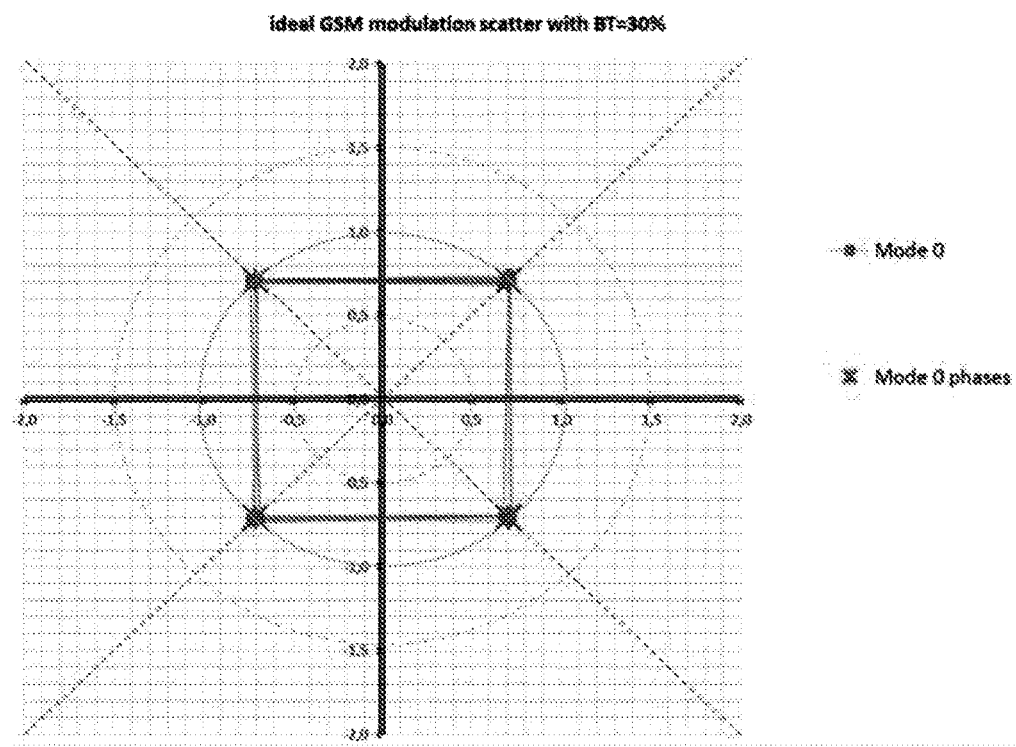
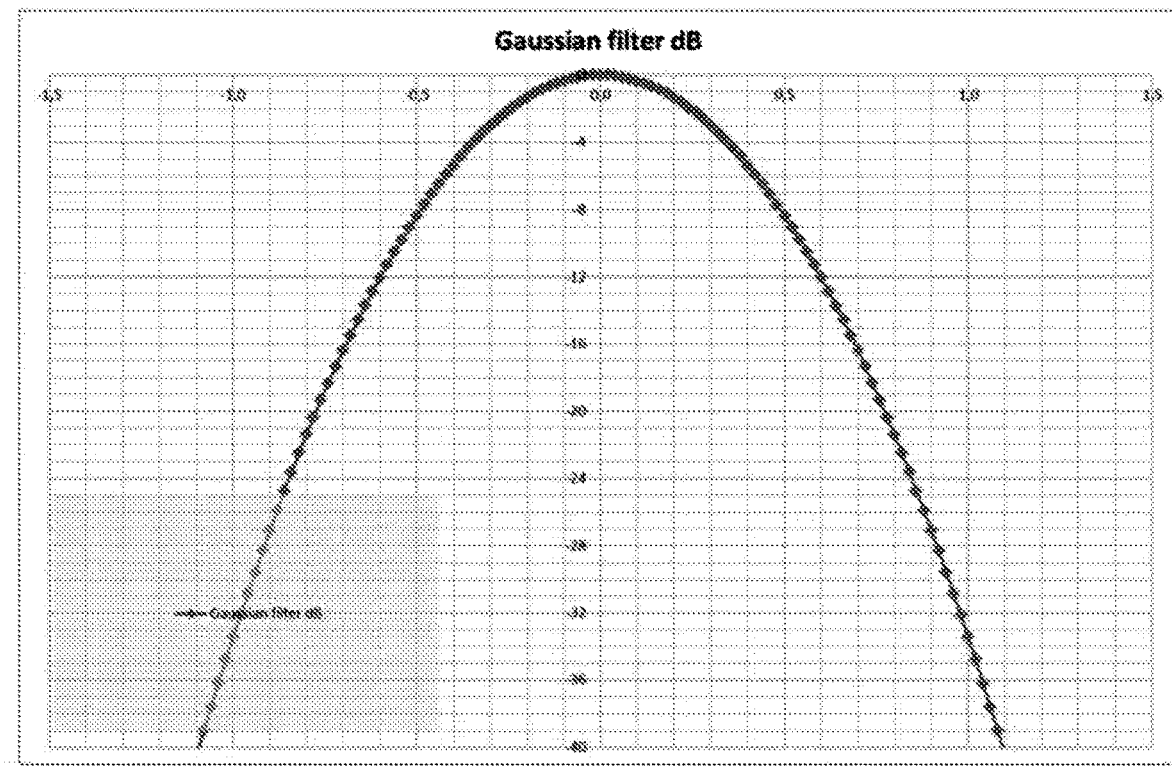
FIG. 29

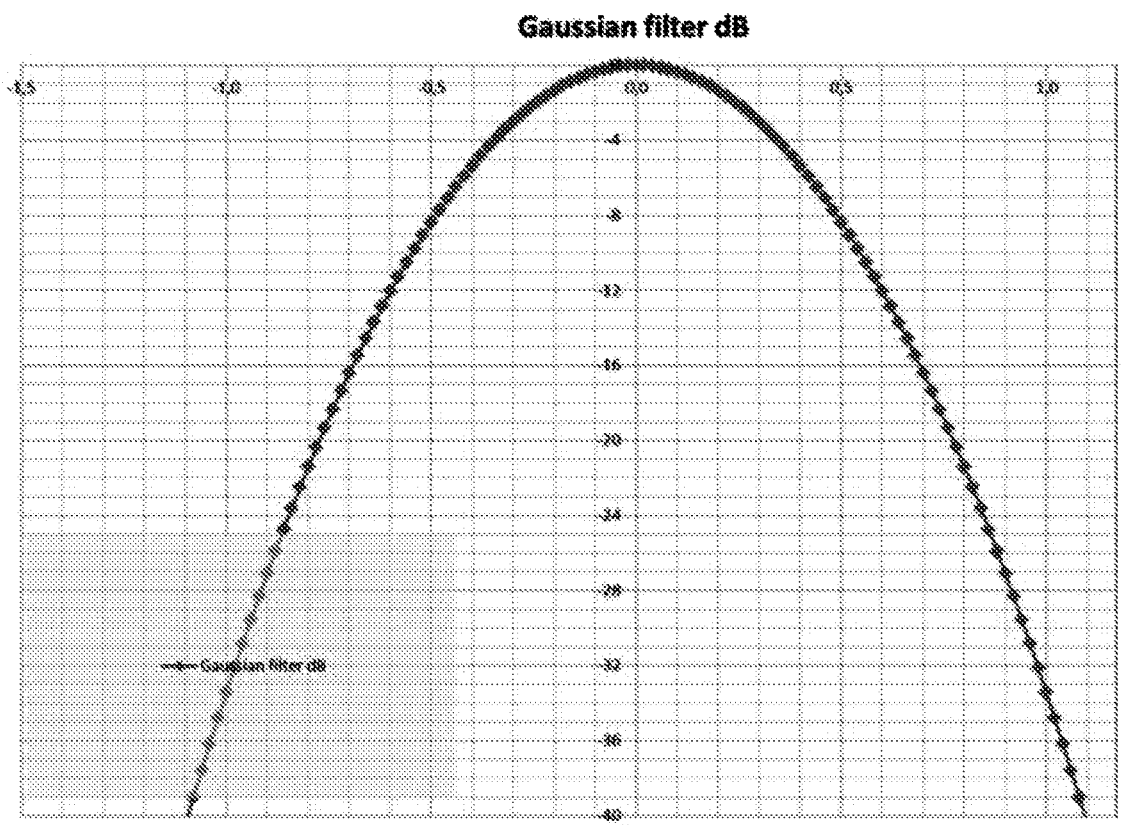
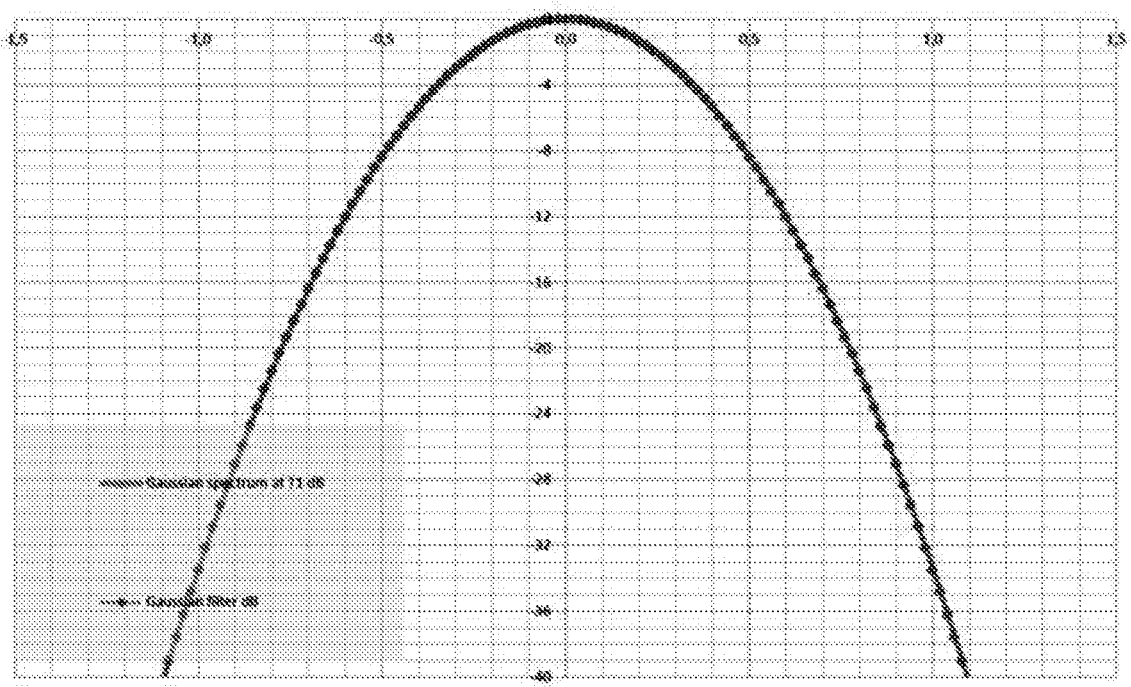
FIG. 30

——— xt n= 32        - - - - Raised cosine 30% 1        — — Filter output at T1
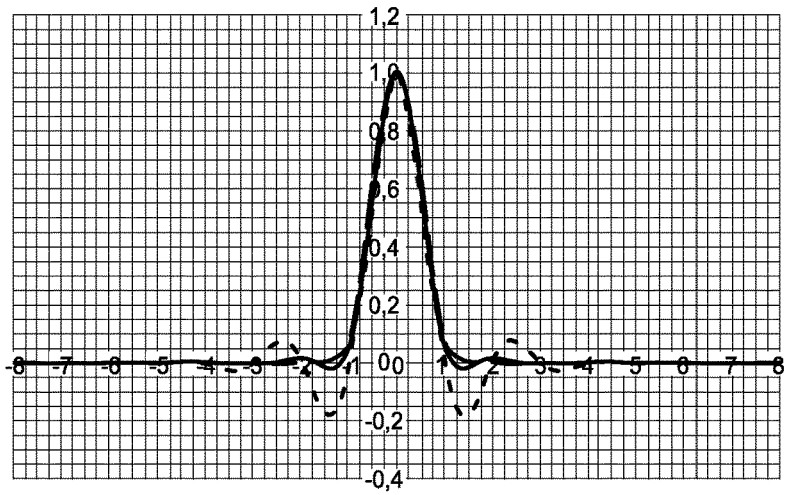
——— Gaussian after the 3rd        - -□- - Gaussian
       Transmission Filter 212a                filter dB
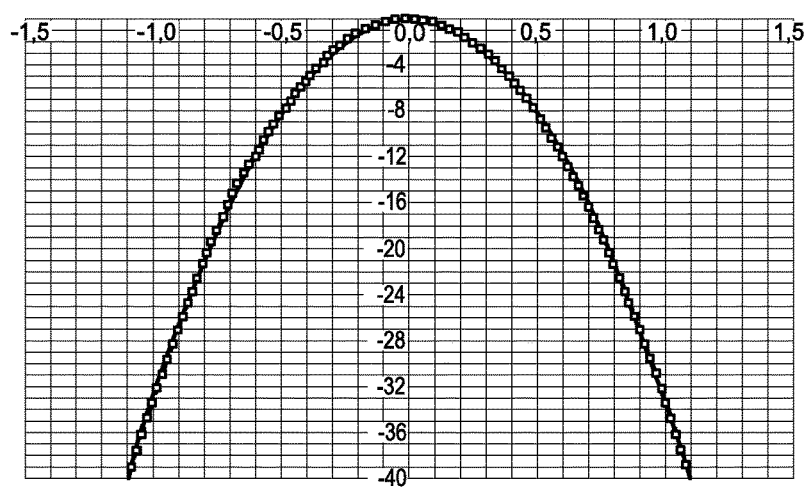
——— Gaussian after the 2nd        - -□- - Gaussian        - - - Twist bandwidth after
       Reception Filter 222a                filter dB              Raised Cosine filter
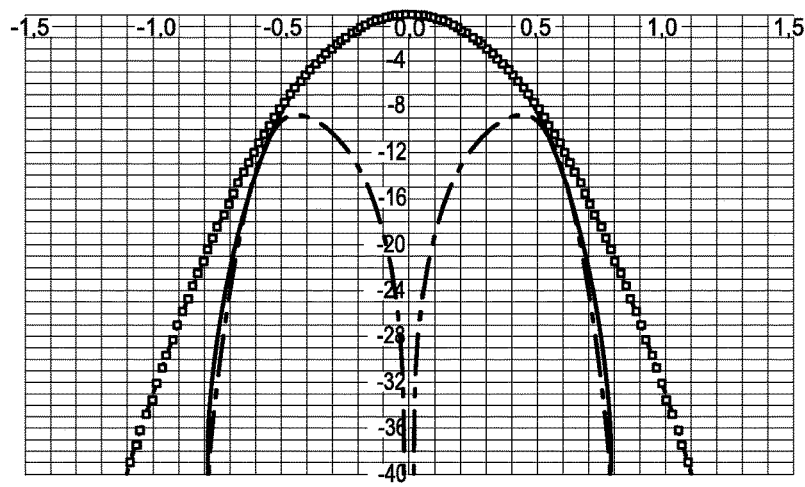
FIG. 32A ——— xt n= 32    - - - - Raised cosine 30% 1    — — Filter output at T1
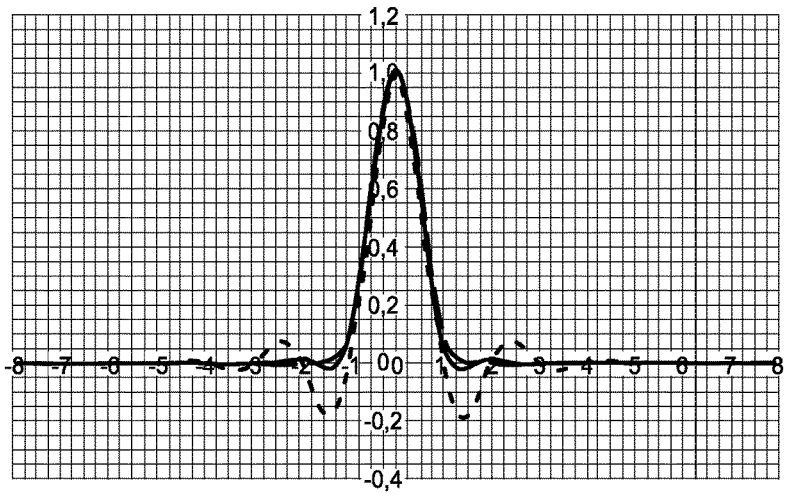
——— Gaussian after the 3rd transmission filter 212a    - -□- - Gaussian filter dB
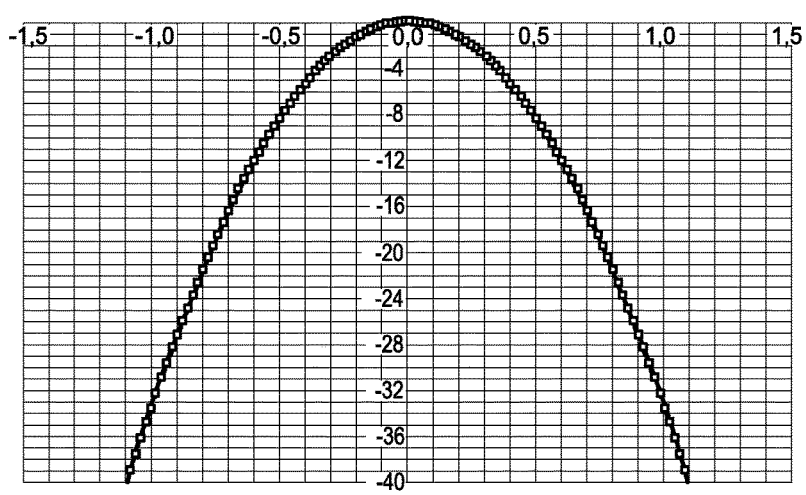
——— Gaussian after the 2nd Reception Filter 222a    - -□- - Gaussian filter dB    - — - Twist bandwidth after Raised Cosine filter
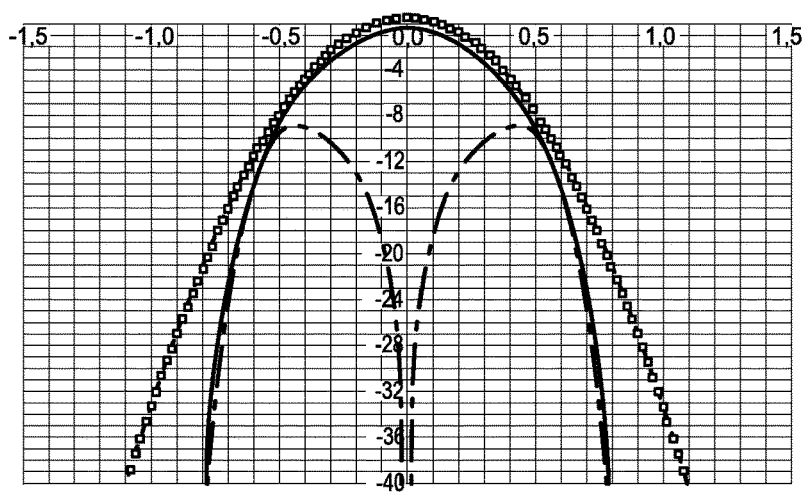
FIG. 32B ———— xt n= 32    - - - - Raised cosine 30% 1    —— —— Filter output at T1
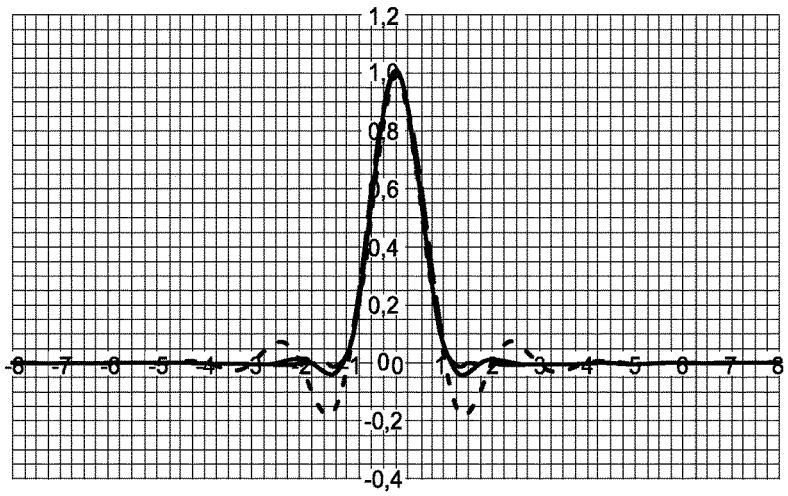
———— Gaussian after the 3$^{rd}$ Transmission Filter 212a    - -□- - Gaussian filter dB
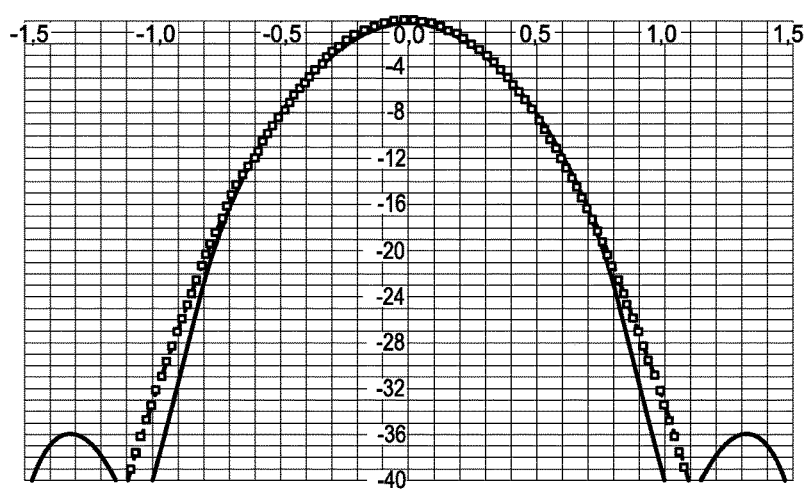
———— Gaussian after the 2$^{nd}$ Reception Filter 222a    - -□- - Gaussian filter dB    - - - Twist bandwidth after Raised Cosine filter
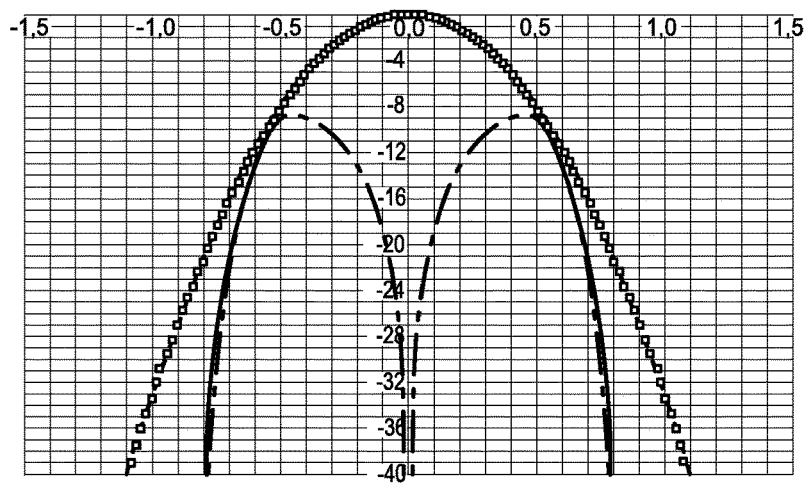
FIG. 32C Table V

| | Adjacent Channel Interference dB | Interference Mode 0 over Mode 1 dB | Overall Interference Mode 0 dB |
|---|---|---|---|
| No time window | 30,3 | 48,1 | 34,0 |
| Rectangular time window 4T | 30,3 | 48,1 | 34.0 |
| Rectangular time window 2T | 31,1 | 48,1 | 28,8 |

FIG. 33

RADIO COMMUNICATIONS SYSTEM AND METHOD BASED ON TIME TWISTED WAVES

CROSS REFERENCE TO RELATED APPLICATIONS

This application is the U.S. National Stage of PCT/IB2016/001972, filed Dec. 14, 2016, the entire contents of the application is incorporated herein by reference in its entirety.

TECHNICAL FIELD OF THE INVENTION

The present invention relates, in general, to an improved radio communications system and method (namely, a system and a method for implementing communications at radio frequency, i.e., at frequencies that can range from a few KHz to hundreds of GHz) based on time twisted waves.

In this respect, it is worth noting that, in the present application, the expressions "twisted modes/signals/waves" are used to denote orbital angular momentum modes with topological charge different than zero, and the expressions "main/conventional/traditional/plane mode/signal/wave" are used to denote the orbital angular momentum mode with topological charge equal to zero. Moreover, in the present application, the expression "higher order mode(s)" (or, equivalently, the corresponding acronym HOM(s)) is used as synonymous with "twisted mode(s)" (i.e., orbital angular momentum mode(s) with topological charge different than zero).

More specifically, the present invention concerns the use of different filters for the transmission of main mode signals and of twisted wave signals.

BACKGROUND ART

In consideration of Orbital Angular Momentum (OAM) potentialities of increasing transmission capacity and since radio frequency (RF) spectrum shortage problem is deeply felt in radio communications sector, recently a lot of experimental studies have been carried out on the use of OAM states, or modes, at RF (also known as radio vortices) in order to try to enhance RF spectrum reuse.

In this connection, reference may, for example, be made to:

Mohammadi S. M. et al., "*Orbital Angular Momentum in Radio—A System Study*", IEEE TRANSACTIONS ON ANTENNAS AND PROPAGATION, IEEE SERVICE CENTER, PISCATAWAY, N.J., US, vol. 58, no. 2, 1 Feb. 2010, pages 565-572, which shows that standard antennas arranged in circular arrays can be used to generate RF beams carrying OAM;

Tamburini F. et al., "*Encoding many channels in the same frequency through radio Vorticity: first experimental test*", arXiv.org, 12 Jul. 2011, Ithaca, N.Y., USA, which experimentally shows that it is possible to propagate and use the properties of twisted non-monochromatic incoherent radio waves to simultaneously transmit several radio channels on one and the same frequency by encoding them in different (and, thence, orthogonal) OAM states (even without using polarization or dense coding techniques);

GB 2 410 130 A, which discloses a planar phased array antenna for transmitting and receiving OAM radio vortex modes, which antenna comprises a circular array of cavity backed axial mode spiral antenna elements whose phase is controlled such that the phase of each antenna element changes sequentially about the array; and WO 2012/084039 A1, which discloses a transmit antenna arrangement comprising N antenna elements arranged along a circumference with an angular separation of $\alpha$ degrees between neighboring antenna elements, the antenna arrangement comprising an OAM encoder arranged to receive N input signals for transmission, indexed from $M=-(N-1)/2$ up to $M=(N-1)/2$ for odd N and from $M=-(N-2)/2$ up to $N/2$ for even N; the OAM encoder connecting each input signal to each antenna element and giving each input signal M at each antenna element a phase shift of $M*\alpha$ relative to the phase of the same input signal M at an adjacent antenna element; wherein two or more antenna elements are directional, have their directivity in the same direction, and have an antenna aperture higher than, or equal to, $5\lambda$, where $\lambda$ is the wavelength of the N input signals.

From a mathematical perspective, the transmission of an OAM mode (or state) at a single RF (i.e., by using a pure tone) implies that the electrical field on the radiating aperture can be represented as:

$$F(\rho,\phi) = F(\rho)e^{jk\phi},$$

where $\rho$ and $\phi$ are the cylindrical coordinates on the radiating aperture, j is the imaginary unit, and k is a positive or negative integer.

The radiated field can be represented in the far zone as:

$$E(\vartheta, \varphi) = \frac{1}{R} \int\int_S F(\rho, \phi) e^{-j2\pi \frac{\rho}{\lambda} \sin(\vartheta)\cos(\varphi-\phi)} \rho d\rho d\phi,$$

where $\vartheta$ and $\varphi$ are the spherical coordinates in the far field, R denotes the radius of the sphere centered on the radiating aperture, S denotes the integration surface used at reception side, and $\lambda$ denotes the wavelength used.

As is known, due to intrinsic characteristics of OAM, an OAM mode transmitted at a single RF (i.e., by using a pure tone) is affected by a phase singularity which creates a null at the bore-sight direction, thereby resulting that $$E(0,0)=0.$$

In order for said phase singularity to be compensated, the integration surface S used at reception side should be sized so as to include the crown-shaped peak generated by the OAM mode.

In particular, the integration surface S used at reception side should be different for each OAM mode and, considering the sampling theorem applied to the radiating antenna, should have an area given by:

$$\Delta S = \Delta \Omega R^2 = 2\left(\frac{\lambda}{D}R\right)^2,$$

where D denotes the diameter of the radiating antenna.

Therefore, the price to be paid with pure OAM modes transmitted by using pure tones (i.e., single radiofrequencies) is that the dimensions of the equivalent receiving antenna depend on the distance R from, and on the diameter D of, the transmitting antenna.

This solution is impractical for many applications, especially for satellite communications where the aperture efficiency and the size of the antennas are very critical issues.

For example, in geostationary-satellite-based communications in Ka band, for a ground antenna having a diameter D of about 9 m, the diameter of the receiving ring on board the geostationary satellite should be of the order of 50 km, thereby resulting impractical.

Thence, in view of the foregoing, the main criticality in using radio vorticity in practical systems is that the orthogonality between OAM modes depends on the size of antennas, on the distance between the transmitting and receiving antennas, and on the need for the receiving antenna to operate as an interferometer basis. These constraints result in OAM-based radio communication systems which are inefficient and unusable for very long distances, such as the ones involved in satellite communications.

Moreover, further criticalities in the use of radio vorticity for satellite communications are represented by the need of an extremely accurate mutual pointing of the transmitting and receiving antennas, and by the unfeasibility of the geometry for Earth-satellite configurations due to the criticality of the positioning of the receiving antennas (or of the receiving antenna elements).

A solution to the aforesaid technical problems is provided in Applicant's International application WO 2014/016655 A1 (whose content is herewith enclosed by reference), that concerns a multidimensional space modulation technique for transmitting and receiving radio vortices at frequencies ranging from a few kHz to hundreds of GHz. Specifically, the multidimensional space modulation technique according to WO 2014/016655 A1 allows to transmit and receive orthogonal RF OAM modes in one and the same direction (i.e., the bore-sight direction) and to overcome, at the same time, the aforesaid technical problems caused by OAM phase singularity at the bore-sight direction, thereby allowing the use of radio vortices also for long-distance radio communications, such as satellite communications.

In particular, the multidimensional space modulation according to WO 2014/016655 A1 is actually a phase modulation applied to signals to be transmitted at RF such that to result in orthogonal radio vortices along the bore-sight direction. Therefore, the modulation according to WO 2014/016655 A1 is conveniently called multidimensional space modulation because it allows orthogonal RF OAM modes to be transmitted and received in one and the same direction, namely the bore-sight direction, wherein each OAM mode represents a specific space channel along the bore-sight direction, which specific space channel is orthogonal to all the other space channels represented by the other OAM modes.

In order for the multidimensional space modulation according to WO 2014/016655 A1 to be better understood, attention is drawn, by way of example, to the fact that, as is known, a twisted RF signal having, or carrying, the OAM mode m=+1 (where m, as is known, is called topological charge) is characterized by only one clockwise rotation of 360° of the Poynting vector around the propagation axis per period T and, thence, it can be generated by transmitting, for example by means of four ring-arranged transmitting antenna elements, RF signals associated with phases of 0°, 90°, 180°, and 270° clockwise distributed among said four ring-arranged transmitting antenna elements. Instead, WO 2014/016655 A1 proves that it is possible and convenient, in order to transmit at RF the OAM mode m=+1 and, at the same time, to solve the problem caused by OAM phase singularity at the bore-sight direction, to exploit only one antenna transmitting the four different phases 0°, 90°, 180°, and 270° at different times (or at different frequencies) with a time step of T'=T/4. This possibility increases the efficiency of the transmitting and receiving configuration, which can work regardless of the elementary antenna element spacing in an antenna array.

From a conceptual perspective, according to WO 2014/016655 A1, in order to manage OAM rotation, namely in order to control the speed of rotation of an RF OAM mode about the bore-sight direction, a supplementary phase modulation is introduced, which leaves only a residue of the OAM twist and keeps the OAM signature in a limited bandwidth. This residual rotation achieved by means of the supplementary phase modulation allows a signal having a proper bandwidth to be orthogonal to another signal having a different rotation (multiple of the minimum one). Therefore, an RF twisted wave can be transmitted by means of a modulated waveform and can be received by an antenna operating in the complex conjugated mode. The received signal is equal to the transmitted one, except for standard attenuation and transmission and reception gains. The bandwidth increase does not prevent the transmission of plane waves (i.e., the OAM mode m=0), but limits the number of OAM modes at different frequencies in the available bandwidth. The multidimensional space modulation according to WO 2014/016655 A1 allows to use a standard antenna in place of a phased array antenna, since the used signals are natively orthogonal.

In detail, WO 2014/016655 A1 discloses a device for generating OAM modes for radio communications, which device is designed to receive one or more input digital signals, each of which:
  has a respective sampling period, which is a respective multiple of a given sampling period; and
  occupies a frequency bandwidth, which is a respective fraction of a given available frequency bandwidth.

The device for generating OAM modes according to WO 2014/016655 A1 is:
  operable to
    apply, to each input digital signal, a respective space modulation associated with a respective OAM mode having a respective topological charge to generate a corresponding modulated digital signal carrying said respective OAM mode, and
    provide an output digital signal based on the modulated digital signal(s); and
  configured to apply, to each input digital signal, the respective space modulation by interpolating said input digital signal and phase-modulating the interpolated input digital signal so as to generate a corresponding phase-modulated digital signal carrying said respective OAM mode, having the given sampling period, and occupying the given available frequency bandwidth.

In particular, the device for generating OAM modes according to WO 2014/016655 A1 is configured to apply, to each input digital signal, the respective space modulation by:
  digitally interpolating said input digital signal thereby generating a corresponding digitally-interpolated signal having the given sampling period; and
  phase-modulating the corresponding digitally-interpolated signal on the basis of digital phase shifts related to the respective OAM mode so as to generate the corresponding phase-modulated digital signal.

For example, in order to generate OAM mode +1, WO 2014/016655 A1 teaches to:
  digitally interpolate an input digital signal (having a sampling period equal to $4T_0$, where $T_0$ denotes the given sampling period) by outputting, for each digital sample of said digital signal, four corresponding digital samples with time step (i.e., time distance) $T_0$, thereby generating a corresponding digitally-interpolated signal having the given sampling period $T_0$;

apply, to each set of four digital samples obtained by means of the digital interpolation, digital phase shifts related to the OAM mode +1 (namely, digital phase shifts related to phase values 0, $\pi/2$, $\pi$ and $3\pi/2$) so as to generate a corresponding set of four phase-shifted digital samples, which corresponding set of four phase-shifted digital samples carries the OAM mode +1; and combine the sets of four phase-shifted digital samples into a single phase-modulated digital signal carrying the OAM mode +1, having the given sampling period $T_0$, and occupying the given available frequency bandwidth.

Accordingly, in order to generate OAM mode −1, WO 2014/016655 A1 teaches to:

digitally interpolate an input digital signal (having a sampling period equal to $4T_0$, where $T_0$ denotes the given sampling period) by outputting, for each digital sample of said digital signal, four corresponding digital samples with time step (i.e., time distance) $T_0$, thereby generating a corresponding digitally-interpolated signal having the given sampling period $T_0$;

apply, to each set of four digital samples obtained by means of the digital interpolation, digital phase shifts related to the OAM mode −1 (namely, digital phase shifts related to phase values 0, $-3\pi/2$, $-\pi$ and $-\pi/2$) so as to generate a corresponding set of four phase-shifted digital samples, which corresponding set of four phase-shifted digital samples carries the OAM mode −1; and combine the sets of four phase-shifted digital samples into a single phase-modulated digital signal carrying the OAM mode −1, having the given sampling period $T_0$, and occupying the given available frequency bandwidth.

The generation of higher-order OAM modes (i.e., with $|m|>1$, where m denotes the topological charge of the OAM mode considered) according to WO 2014/016655 A1 is performed, mutatis mutandis, conceptually in the same way as the generation of OAM modes ±1 previously described.

Additionally, Applicant's International applications WO 2015/067987 A1 and WO 2015/068036 A1 (whose contents are herewith enclosed by reference) disclose, both, the feasibility of increasing transmission capacity at RF (including frequencies from a few kHz to hundreds of GHz) by exploiting a proper approximation in time domain of the Hilbert transform of digital analytical signals, wherein said approximation of the Hilbert transform is obtained by exploiting time twisted waves.

Instead, Applicant's International applications WO 2015/189653 A1 and WO 2015/189704 A2 (whose contents are herewith enclosed by reference) teach, by exploiting duality between time and frequency, to use also a twisted-wave-based approximation of the Hilbert transform in frequency domain in order to increase transmission capacity.

In particular, as for time twisted waves, WO 2015/067987 A1 discloses a radio communications system comprising a transmitter and a receiver, wherein the transmitter is configured to:

generate or receive digital symbols having a given symbol rate associated with a corresponding symbol period;

generate, every S digital symbols generated/received (S being an integer higher than three), a respective multi-mode digital signal, which has a predefined time length shorter than S times the symbol period, which is sampled with a predefined sampling rate higher than the symbol rate, and which carries said S digital symbols by means of a plurality of orthogonal OAM modes comprising a main mode carrying P of said S digital symbols (P being an integer higher than zero and lower than S), and one or more secondary modes carrying the other S-P digital symbols, each secondary mode being time-shifted by half the symbol period with respect to the main mode; and transmit a radio frequency signal carrying a sequence of the generated multi-mode digital signals.

Moreover, the receiver of the radio communications system according to WO 2015/067987 A1 is configured to:

receive the radio frequency signal transmitted by the transmitter;

process the received radio frequency signal so as to obtain a corresponding incoming digital signal; and extract, from successive, non-overlapped portions of the incoming digital signal sampled with the predefined sampling rate, the S digital symbols respectively carried by each incoming digital signal portion by means of the orthogonal OAM modes; wherein each of the successive, non-overlapped portions of the incoming digital signal has the predefined time length.

More in detail, the transmitter of the radio communications system according to WO 2015/067987 A1 is configured to generate a multi-mode digital signal carrying S digital symbols by:

allocating P of the S digital symbols to the main mode by providing, for each of said P digital symbols, a corresponding complex value which represents said digital symbol and is related to the main mode;

allocating each of the other S-P digital symbols to a corresponding secondary mode by providing, for each of said S-P digital symbols, a corresponding complex value which represents said digital symbol and is related to the secondary mode to which said digital symbol is allocated;

computing, by using a predefined transmission matrix, M multi-mode complex values related to M successive time instants (M being an integer equal to, or higher than, S) which, within the predefined time length, are separated by half the symbol period, wherein the predefined transmission matrix relates the S complex values representing the S digital symbols and related to the OAM modes to the M successive time instants through complex coefficients each of which is related to a respective OAM mode and to a respective time instant; and generating a multi-mode digital signal having the predefined time length and sampled with the predefined sampling rate on the basis of the M multi-mode complex values computed.

Moreover, the receiver of the radio communications system according to WO 2015/067987 A1 is configured to extract the S digital symbols carried by an incoming digital signal portion having the predefined time length and sampled with the predefined sampling rate by:

extracting, from said incoming digital signal portion, M multi-mode complex values related to M successive time instants which are, within the predefined time length, separated by half the symbol period;

computing, by using a reception matrix derived from the predefined transmission matrix through a generalized inversion technique (such as a pseudo-inverse technique), S complex values representing the S digital symbol carried by said incoming digital signal portion by means of the orthogonal OAM modes, wherein said reception matrix relates the M extracted multi-mode complex values related to the M successive time instants to the S complex values to be computed through complex coefficients each of which is related to a respective OAM mode and to a respective time instant; and determining the S digital symbols represented by the S complex values computed.

Additionally, WO 2015/068036 A1 relates to a radio communications system and method based on time twisted waves. In particular, the radio communications method according to WO 2015/068036 A1 comprises carrying out, by a transmitter, the following steps:

a) generating or receiving digital symbols to be transmitted, said digital symbols having a given symbol rate associated with a corresponding symbol period;

b) generating, every S digital symbols generated/received (S being an integer higher than three), a corresponding multi-mode digital signal, which has a predefined time length shorter than S times the symbol period, has a predefined bandwidth larger than the Nyquist bandwidth corresponding to the given symbol rate, and carries said S digital symbols by means of OAM modes comprising a main mode, that is an OAM mode with topological charge equal to zero and that carries P of said S digital symbols (P being an integer higher than zero and lower than S), and one or more twisted modes carrying the other S-P digital symbols, wherein each twisted mode is an OAM mode with a respective topological charge different than zero and is time-shifted with respect to the main mode;

c) generating a multi-frame digital signal comprising successive, non-overlapped time frames, each of which has the predefined time length and carries a respective multi-mode digital signal generated; and d) transmitting a radio frequency signal carrying the multi-frame digital signal.

Moreover, the radio communications method according to WO 2015/068036 A1 further comprises carrying out, by a receiver, the following steps:

e) receiving the radio frequency signal transmitted by the transmitter;

f) processing the received radio frequency signal so as to obtain a corresponding incoming digital signal;

g) performing on the basis of the incoming digital signal carrier synchronization thereby recovering frequency and/or phase carrier used by the transmitter to generate the multi-mode digital signals, clock synchronization thereby recovering the symbol rate and sampling time instants of the multi-mode digital signals generated by the transmitter, and frame synchronization thereby detecting successive, non-overlapped portions of the incoming digital signal corresponding to the successive, non-overlapped time frames of the multi-frame digital signal generated by the transmitter; and h) extracting, on the basis of the carrier, clock and frame synchronizations performed, the S digital symbols respectively carried by each detected incoming digital signal portion by means of the OAM modes.

Instead, WO 2015/189653 A1 relates to a radio communications system and method with increased transmission capacity based on frequency twisted waves. In particular, the radio communications method according to WO 2015/189653 A1 comprises:

carrying out, by a transmitter, the steps of a) providing a digital time signal carrying digital symbols to be transmitted, and b) transmitting a radio frequency signal carrying said digital time signal; and carrying out, by a receiver, the step of c) receiving the radio frequency signal transmitted by the transmitter, d) processing the received radio frequency signal so as to obtain a corresponding incoming digital signal, and e) extracting, from the incoming digital signal, the digital symbols carried by said incoming digital signal.

The radio communications method according to WO 2015/189653 A1 is characterized in that said digital time signal carrying the digital symbols to be transmitted results from an approximation of the Hilbert transform in frequency domain, which approximation is based on a frequency main mode and one or more frequency twisted modes, wherein said frequency main and twisted modes carry, each, respective digital symbols to be transmitted.

In detail, according to WO 2015/189653 A1, the digital time signal is time-limited, carries a limited sequence of digital symbols to be transmitted, and results from:

main mode frequency samples carrying respective digital symbols of said limited sequence via a frequency main mode; and twisted mode frequency samples carrying the other digital symbols of said limited sequence via one or more frequency twisted modes, wherein each frequency twisted mode is an OAM mode that is orthogonal to the frequency main mode and to any other frequency twisted mode used.

More in detail, the main mode frequency samples are at main mode frequencies spaced apart by a predetermined frequency spacing, and the twisted mode frequency samples comprise, for a frequency twisted mode, respective twisted mode frequency samples at corresponding twisted mode frequencies that:

are related to said frequency twisted mode;

are spaced apart by said predetermined frequency spacing; and are different from the main mode frequencies.

Additionally, also WO 2015/189704 A2 relates to a radio communications system and method with increased transmission capacity based on frequency twisted waves. In particular, the radio communications method according to WO 2015/189704 A2 comprises:

carrying out, by a transmitter, the steps of a) generating a digital time signal, that is time-limited, carries a limited sequence of digital symbols to be transmitted and results from an approximation of the Hilbert transform in frequency domain, which approximation is based on a frequency main mode, that is associated with an OAM mode with topological charge equal to zero, and that includes main mode frequency samples carrying respective digital symbols of said limited sequence via said OAM mode with topological charge equal to zero, and one or more frequency twisted modes carrying the other digital symbols of said limited sequence, wherein each frequency twisted mode is associated with a corresponding OAM mode with a respective topological charge different than zero, and includes respective twisted mode frequency samples carrying one or more respective digital symbols of said limited sequence via said corresponding OAM mode with said respective topological charge different than zero; and b) transmitting a radio frequency signal carrying the digital time signal generated; and carrying out, by a receiver, the step of c) receiving the radio frequency signal transmitted by the transmitter, d) processing the received radio frequency signal so as to obtain a corresponding incoming digital signal, and e) extracting, from the incoming digital signal, the digital symbols carried by said incoming digital signal.

In particular, according to WO 2015/189704 A2, for each frequency twisted mode, the respective twisted mode frequency samples are mutually phase-shifted on the basis of phase shifts related to the corresponding OAM mode with the respective topological charge different than zero.

Additionally, Applicant's International application WO 2015/189703 A2 relates to the use of frequency twisted waves to increase transmission capacity of:

in general, wireless communication systems based on Orthogonal Frequency-Division Multiplexing (OFDM) and/or Orthogonal Frequency-Division Multiple Access (OFDMA) and/or Single-Carrier Frequency-Division Multiple Access (SC-FDMA) and/or combinations/variants/developments of these technologies; and, in particular, 4G ($4^{th}$ Generation) cellular networks based on Long Term Evolution (LTE) and/or LTE Advanced standards, future 5G ($5^{th}$ Generation) cellular networks, and also wireless communication systems based on Worldwide Interoperability for Microwave Access (Wi-MAX) standard.

In particular, WO 2015/189703 A2 discloses a method for radio communications in a wireless communication system including one or more base stations and one or more user terminals, said method comprising performing a radio communication between a base station and a user terminal of said wireless communication system, wherein performing a radio communication includes transmitting, in a given time slot, first digital symbols by using a frequency-division technique, whereby the first digital symbols are carried by first frequency samples at respective sub-carriers, that are distributed over a predefined frequency band and belong to a given sub-carrier block.

The method according to WO 2015/189703 A2 is characterized in that performing a radio communication further includes transmitting, in said given time slot, also second digital symbols by means of one or more frequency twisted modes, wherein each frequency twisted mode carries a respective OAM mode with a respective topological charge different than zero by means of respective second frequency samples, that:

are phase-shifted with respect to each other on the basis of phase shifts related to said respective OAM mode;

carry one or more respective symbols of said second digital symbols via said respective OAM mode; and are at respective frequencies, that are distributed over said predefined frequency band and are different than the sub-carriers belonging to said given sub-carrier block.

In detail, according to WO 2015/189703 A2, the sub-carriers belonging to the given sub-carrier block are spaced apart by a predetermined frequency spacing, and each frequency twisted mode includes respective second frequency samples at respective frequencies that are spaced apart by said predefined frequency spacing and are distributed over said predefined frequency band between pairs of consecutive sub-carriers belonging to the given sub-carrier block.

More in detail, according to WO 2015/189703 A2, for each second digital symbol to be transmitted in the given time slot, a respective frequency twisted mode carries, by means of respective second frequency samples, said second digital symbol via a phase-modulation related to the OAM mode carried by said respective frequency twisted mode.

OBJECT AND SUMMARY OF THE INVENTION

The use of time twisted waves in time domain requires, in general, the use of filters at transmission and reception sides. The use of filters introduces a convolutional process and, consequently, a potential additional complexity in the definition of a RF frame and as far as independence between frames (inter-frame interference) is concerned.

In this connection, WO 2015/067987 A1 and WO 2015/068036 A1 describe the use of a Gaussian filter with the same characteristics for the main mode and the higher order modes (HOMs—i.e., the twisted ones). Rather, WO 2015/068036 A1 teaches that the use of a Gaussian filter (with the same characteristics for the main mode and the OHMs) is more advantageous than, and hence preferable to, the use of a raised cosine filter (with the same characteristics for the main mode and the OHMs).

This overall channel filter has good performance, but makes complications when it is exploited in systems based on different types of communication channel standards. In practical terms, some difficulties may arise in using existing frequency bandwidth spacing and as far as backward compatibility is concerned.

Therefore, an object of the present invention is that of providing a solution to the aforesaid problems related to the use of time twisted waves.

This and other objects are achieved by the present invention in that it relates to a radio communications method and system, as defined in the appended claims.

In particular, the present invention concerns a radio communications method including carrying out, by a transmitter, transmission operations that comprise:

generating first digital time signals related to a first Orbital Angular Momentum (OAM) mode with topological charge equal to zero, wherein each first digital time signal includes respective first time samples carrying corresponding first digital symbols to be transmitted;

applying a first transmission filter to the first digital time signals, thereby obtaining filtered first digital time signals;

generating second digital time signals related to one or more second OAM modes with topological charge different than zero, wherein each second digital time signal includes respective second time samples carrying one or more respective second digital symbols by means of a phase, or amplitude and phase, modulation related to a respective second OAM mode with topological charge different than zero;

applying a second transmission filter to the second digital time signals, thereby obtaining filtered second digital time signals;

combining the filtered first and second digital time signals into combined digital time signals, all having one and the same predefined time length; and transmitting a radio frequency signal carrying, in successive, non-overlapped time frames having the predefined time length, the combined digital time signals.

The radio communications method according to the present invention further includes carrying out, by a receiver, reception operations that comprise:

receiving the radio frequency signal transmitted by the transmitter;

processing the received radio frequency signal so as to obtain a corresponding incoming digital signal; and processing said incoming digital signal so as to extract therefrom the first and second digital symbols carried thereby.

According to the present invention, the first transmission filter and the second transmission filter have different filtering characteristics.

Preferably, the first transmission filter is a Gaussian filter or a first raised-cosine-based filter, and the second transmission filter is a second raised-cosine-based filter different than said first raised-cosine-based filter.

Conveniently, processing the incoming digital signal includes processing successive, non-overlapped portions of said incoming digital signal, wherein the successive, non-overlapped portions of said incoming digital signal have the predefined time length, and wherein processing successive, non-overlapped portions of said incoming digital signal includes:

applying a reception filter to said successive, non-overlapped portions of said incoming digital signal, thereby obtaining filtered incoming digital signal's portions; and extracting, by using a reception matrix, the first and second digital symbols respectively carried by said filtered incoming digital signal's portions;

wherein said reception filter is a third raised-cosine-based filter that is related to the second transmission filter.

More conveniently, the reception filter and the second transmission filter are such that:

$H_{HOM}^{TX}(f) = (H_{RC}^{HOM-RX}(f))^{\alpha}$, $H^{RX}(f) = (H_{RC}^{HOM-RX}(f))^{(1-\alpha)}$, and $f_C^{HOM-RX} = \gamma \cdot f_C^{MM}$, where $H_{HOM}^{TX}(f)$ denotes a frequency response of the second transmission filter, $H^{RX}(f)$ denotes a frequency response of the reception filter, $H_{RC}^{HOM-RX}$ denotes a frequency response of a predefined reference raised cosine filter, $\alpha$ is a rational number higher than zero and lower than 1, $f_C^{HOM-RX}$ denotes a cut-off frequency of said predefined reference raised cosine filter, $\gamma$ is a rational number higher than one, and $f_C^{MM}$ denotes a cut-off frequency of the first transmission filter.

Preferably, the first transmission filter is a square root raised cosine filter with roll-off factor equal to, or higher than, 20%, the transmission operations further comprise applying a transmission time window to the filtered first digital time signals, thereby obtaining filtered, time-limited first digital time signals, and combining the filtered first and second digital time signals includes combining the filtered, time-limited first digital time signals and the filtered second digital time signals into combined digital time signals, all having one and the same predefined time length.

Conveniently, the transmission time window is a raised cosine time window.

Preferably, the transmission operations further comprise arranging the filtered second digital time signals within the combined digital time signals according to a given time arrangement criterion modifiable by the transmitter.

BRIEF DESCRIPTION OF THE DRAWINGS

For a better understanding of the present invention, preferred embodiments, which are intended purely by way of non-limiting example, will now be described with reference to the attached drawings (all not to scale), where:

FIGS. 2-26 show results of experimental analyses, simulations and tests performed by the Applicant in relation to the first radio communications system of FIG. 1;

FIGS. 28-41 show results of experimental analyses, simulations and tests performed by the Applicant in relation to the second radio communications system of FIG. 27.

DETAILED DESCRIPTION OF PREFERRED EMBODIMENTS OF THE INVENTION

Figure 1:
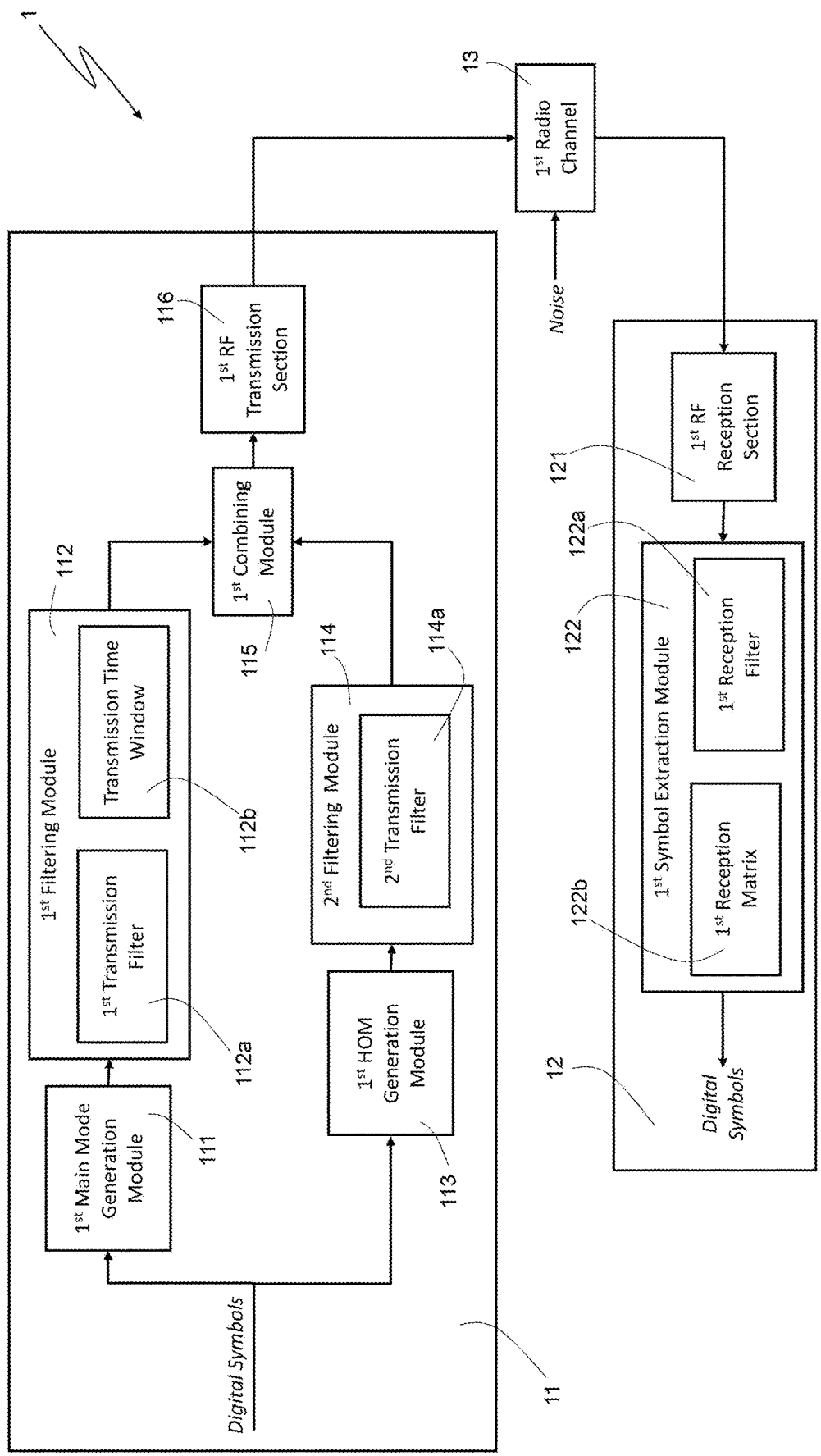
FIG. 1 schematically illustrates a first radio communications system according to a first preferred embodiment of the present invention.
Figure 2A:
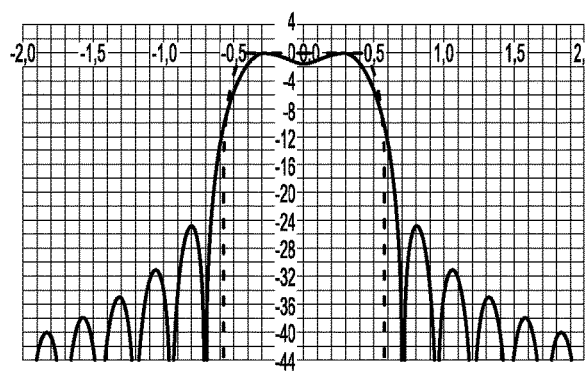
Figure 2B:
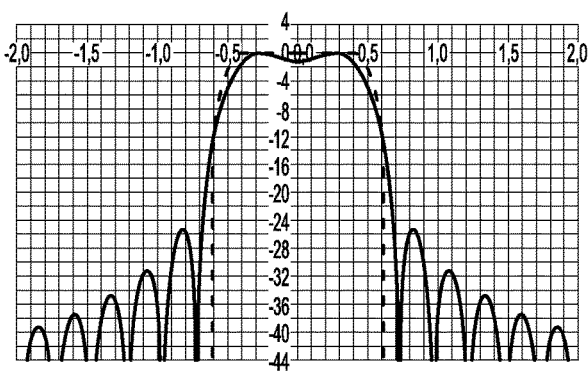
Figure 2C:
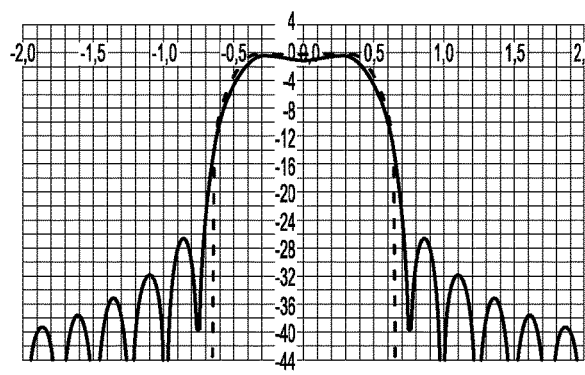
Figure 2D:
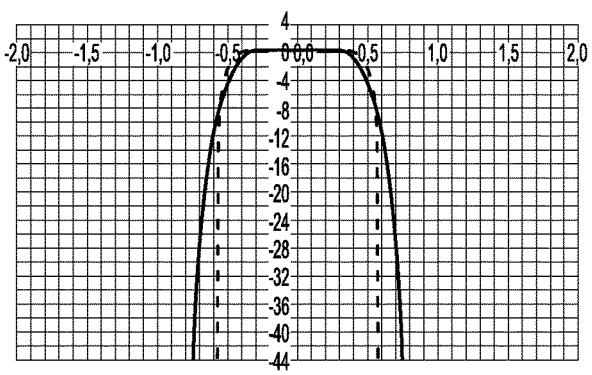
Figure 2E:
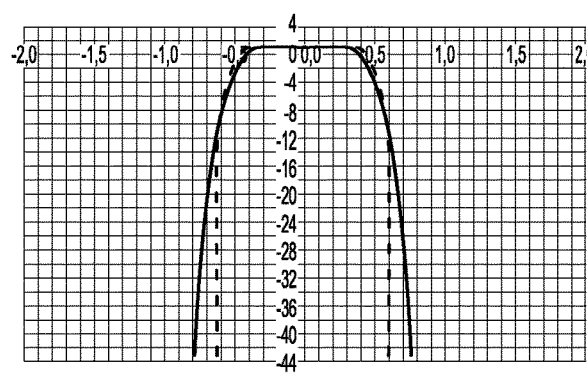
Figure 2F:
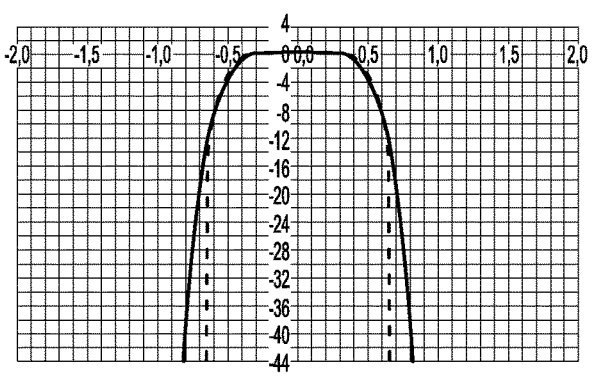

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown and described, but is to be accorded the widest scope consistent with the principles and features disclosed herein and defined in the appended claims.

As previously explained, in the present application the expressions "twisted modes/signals/waves" are used to denote OAM modes with topological charge different than zero, and the expressions "main/conventional/traditional/plane mode/signal/wave" are used to denote the OAM mode with topological charge equal to zero. Moreover, in the present application, the expression "higher order mode(s)" (or, equivalently, the corresponding acronym HOM(s)) is used as synonymous with "twisted mode(s)" (i.e., OAM mode(s) with topological charge different than zero).

As explained in Applicant's International applications WO 2015/067987 A1, WO 2015/068036 A1, WO 2015/189653 A1, WO 2015/189703 A2 and WO 2015/189704 A2, the bandwidth advantage obtainable by using twisted waves can be regarded as an extended use of the Hilbert transform.

In practical terms, the presentation, side by side, of half spectrum of two independent signals can be developed by exploiting twisted waves, keeping the two original signals independent.

The impossibility of realizing the discontinuity at the middle frequency for odd modes implies that the maximum theoretical advantage, which is equal to 2, is not obtainable, although a figure close to 1.4 is feasible.

Reconstruction at reception side of independent signals transmitted via main and twisted modes requires a bandwidth that is slightly larger than the minimum one (i.e., the Nyquist one) strictly necessary to sample the main mode signal. This need is a general characteristic of the use of the Hilbert transform and is well known to those working with Single Side Band (SSB) radio channels.

Twisted waves can be used in both time and frequency domains. In particular, time twisting can be regarded as a new formalization of the SSB technique applied to digital signals, while frequency twisting is completely new and can be considered an evolution of the very recent techniques based on OFDM/OFDMA and SC-FDMA.

From the point of view of the channel model, there is an important difference between the two channels: the time channel requires, in general, the use of filters at transmission and reception sides, while the frequency channel does not. The use of filters introduces a convolutional process and, consequently, a potential additional complexity in the definition of a RF frame and as far as independence between frames (inter-frame interference) is concerned.

In this connection, it is worth noting that WO 2015/067987 A1 and WO 2015/068036 A1 describe, both, the use of a Gaussian filter with the same characteristics for the main mode and the higher order modes (HOMs—i.e., the twisted ones). Rather, WO 2015/068036 A1 teaches that the use of a Gaussian filter (with the same characteristics for the main mode and the OHMs) is more advantageous than, and hence preferable to, the use of a raised cosine filter (with the same characteristics for the main mode and the OHMs). In particular, WO 2015/068036 A1 teaches to use a Gaussian filter with 3 dB Bandwidth-symbol Time (BT) product equal to 0.33.

This overall channel filter has good performance, but makes complications when it is exploited in systems based on different types of communication channel standards. In practical terms, some difficulties could arise in using existing frequency bandwidth spacing and as far as backward compatibility is concerned.

Therefore, the Applicant has carried out an in-depth study in order to develop a technical solution allowing an additional degree of freedom to use an arbitrary filtering function for the main mode, which in-depth study has led the Applicant to conceive the present invention.

In synthesis, the application of twisted waves in the time domain using Gaussian filtering (or, more in general, using at transmission side one and the same filter for main and twisted modes) can be a limitation on compatibility of time twisted wave technology with other time-domain-based radio communications technologies. To overcome this limitation, the present invention teaches to use:
  at transmission side, different filters for the main mode and the higher order modes (HOMs); and
  at reception side, one and the same filter for the main and higher order modes.

This solution allows to reduce the bandwidth of the main mode with two important results:
  the possibility of using, at transmission side, conventional (or almost conventional) filter shapes for the main mode and optimized filter shapes for the HOMs; and
  the possibility of reducing the residual interference between adjacent channels.

FIG. 1 shows a functional block diagram schematically representing a first radio communications system (denoted as a whole by 1) according to a first preferred embodiment of the present invention.

In particular, as shown in FIG. 1, the first radio communications system 1 includes a first transmitter 11 and a first receiver 12 configured to wirelessly communicate through a first radio channel 13 affected by noise.

More in detail, the first transmitter 11 is configured to:
generate or receive digital symbols to be transmitted; conveniently, said digital symbols having a given symbol rate associated with a corresponding symbol period;
generate, by means of a first main mode generation module 111, first digital time signals (conveniently, in-phase and quadrature components thereof), that are related to a first OAM mode with topological charge equal to zero (i.e., the main mode) and that carry first digital symbols to be transmitted; conveniently, each first digital time signal comprising respective first time samples having sampling period equal to the symbol period and carrying, each, a respective first digital symbol;
apply, by means of a first filtering module 112,
  a first transmission filter 112a to the first digital time signals, thereby obtaining filtered first digital time signals, and,
  conveniently, also a transmission time window 112b to said filtered first digital time signals, thereby obtaining filtered, time-limited first digital time signals;
generate, by means of a first HOM generation module 113, second digital time signals (conveniently, in-phase and quadrature components thereof), that are related to one or more second OAM modes with topological charge different than zero (i.e., one or more twisted modes) and that carry second digital symbols to be transmitted; conveniently, each second digital time signal comprising respective second time samples that carry one or more respective second digital symbols by means of a modulation (conveniently, a phase-modulation; more conveniently, an amplitude and phase modulation) related to a respective second OAM mode with topological charge different than zero,
  have sampling period equal to the symbol period, and
  are time-shifted with respect to the first time samples and to the second time samples of the second digital time signals related to second OAM modes different than the respective one;
apply, by means of a second filtering module 114, a second transmission filter 114a to the second digital time signals, thereby obtaining filtered second digital time signals;
combine, by means of a first combining module 115, the filtered, time-limited first digital time signals and the filtered second digital time signals into first combined digital time signals, all having one and the same first time length; and
transmit, by means of a first RF transmission section 116, a first (multi-frame) RF signal carrying, in successive, non-overlapped time frames having the first time length, the first combined digital time signals outputted by the first combining module 115.

Moreover, the first receiver 12 includes:
a first RF reception section 121 configured to receive the first RF signal transmitted by the first transmitter 11 and to process the received first RF signal so as to obtain a corresponding first incoming digital signal; and
a first symbol extraction module 122, which is coupled with said first RF reception section 121 to receive the first incoming digital signal therefrom, and which is designed to process said first incoming digital signal so as to extract the first and second digital symbols carried by said first incoming digital signal.

More in detail, the first symbol extraction module 122 is designed to process successive, non-overlapped portions of the first incoming digital signal having the first time length by:

applying a first reception filter 122a to the first incoming digital signal's portions having the first time length, thereby obtaining filtered first incoming digital signal's portions; and extract, by using a first reception matrix 122b, the first and second digital symbols respectively carried by said filtered first incoming digital signal's portions.

Conveniently, as far as first digital time signal generation (i.e., main mode generation), second digital time signal generation (i.e., twisted mode generation) combined digital time signal generation, and RF transmission are concerned, the first transmitter 11 is designed to operate according to the transmission-related principles and features described in detail in WO 2015/067987 A1 and WO 2015/068036 A1 in connection with main and twisted mode generation and transmission (which transmission-related principles and features are herewith enclosed by reference).

Moreover, again conveniently, as far as RF reception and symbol extraction are concerned, the first receiver 12 is designed to operate according to the reception-related principles and features described in detail in WO 2015/067987 A1 and WO 2015/068036 A1 in connection with RF reception and symbol extraction (which reception-related principles and features are herewith enclosed by reference).

On the other hand, the first radio communications system 1 differs from the systems described in WO 2015/067987 A1 and WO 2015/068036 A1 in that these latter ones teach to use, at transmission side, one and the same transmission filter for the main and twisted modes, while the first transmitter 11 exploits two different filters, namely the first transmission filter 112a for the first digital time signals (i.e., for the main mode signals) and the second transmission filter 114a for the second digital time signals (i.e., for the twisted mode (or HOM) signals), wherein said first and second transmission filters 112a and 114a have different characteristics.

Conveniently, the first transmission filter 112a is as similar as possible to the relevant filter of a conventional transmission system to be enriched with the time twisted wave technology; for instance, for transmission systems conventionally using raised cosine filters with a roll-off equal to, or higher than, 20%, the first transmission filter 112a can be, conveniently, a traditional square root raised cosine filter with roll-off equal to, or higher than, 20%; and, for transmission systems conventionally using GSM/PCS (Global System for Mobile Communications/Pulse-code modulation) full Gaussian filters with 3 dB BT product equal to 0.3, the first transmission filter 112a can be, conveniently, a Gaussian filter with 3 dB BT product equal to 0.3 (in this case, as it will be explained in the following, the transmission time window 112b is, conveniently, not used).

Conveniently, the second transmission filter 114a used to filter the second digital time signals (i.e., the twisted mode (or HOM) signals) is such that to take into account adjacent channel interference.

Moreover, according to the present invention, at reception side only one filter is used (i.e., the first reception filter 122a) to limit the impact of thermal noise and to maximize the stability of the first reception matrix 122b and, thence, of the generalized matched filter (GMF) defined in WO 2015/067987 A1 and WO 2015/068036 A1 (which GMF, in the present application, can be considered as the combination of the first reception filter 122a and the first reception matrix 122b).

As previously explained, conventional radio communications systems using raised cosine filters can be conveniently enriched with time twisted technology by upgrading architectures of these conventional radio communications systems according to the architecture of the first radio communications system 1, and by using, as the first transmission filter 112a, a conventional square root raised cosine filter (for example, with a roll-off equal to 20%, 25% or 35%).

Moreover, the first radio communications system 1 differs from the systems described in WO 2015/067987 A1 and WO 2015/068036 A1 also in that the first transmitter 11 applies the transmission time window 112b to the filtered first digital time signals (i.e., the filtered main mode signals) so as to limit inter-frame interference (IFI) due to signals' tails.

Generally speaking, time tails of conventional square root raised cosine filters are not satisfactory to twisted wave transmission. Anyway, these tails can be drastically reduced by conveniently using an optimized time window, i.e., the transmission time window 112b.

Conveniently, said first transmission time window 112b is a raised cosine time window so as to limit the effects in bandwidth increase, without changing the effective extension of the tail response.

In this connection, FIG. 2 shows examples of spectra of filtered, time-limited first digital time signals outputted by the first filtering module 112 (i.e., examples of spectra of the filtered, time-limited main mode signals at the output of the first filtering module 112), which spectra have been obtained by using:

as the first transmission filter 112a, square root raised cosine filters with roll-off equal to 20%, 25% and 35%, respectively; and as the transmission time window 112b, raised cosine time windows with time roll-off equal to 0% and 100%, respectively.

In particular, FIG. 2 shows signal spectra (dB) at the output of the first filtering module 112 when:

a) a square root raised cosine filter with 20% roll-off (illustrated by means of a dotted line) is used as the first transmission filter 112a and a raised cosine time window with 0% time roll-off is used as the transmission time window 112b;

b) a square root raised cosine filter with 25% roll-off (illustrated by means of a dotted line) is used as the first transmission filter 112a and a raised cosine time window with 0% time roll-off is used as the transmission time window 112b;

c) a square root raised cosine filter with 35% roll-off (illustrated by means of a dotted line) is used as the first transmission filter 112a and a raised cosine time window with 0% time roll-off is used as the transmission time window 112b;

d) a square root raised cosine filter with 20% roll-off (illustrated by means of a dotted line) is used as the first transmission filter 112a and a raised cosine time window with 100% time roll-off is used as the transmission time window 112b;

e) a square root raised cosine filter with 25% roll-off (illustrated by means of a dotted line) is used as the first transmission filter 112a and a raised cosine time window with 100% time roll-off is used as the transmission time window 112b; and f) a square root raised cosine filter with 35% roll-off (illustrated by means of a dotted line) is used as the first transmission filter 112a and a raised cosine time window with 100% time roll-off is used as the transmission time window 112b.

As it can be inferred from FIG. 2, the use of a time window with 100% time roll-off allows to minimize adjacent channel interference.

As previously explained, the transmission time window 112b is conveniently used to limit IFI, i.e., interference between adjacent RF frames. In fact, the lesser interference between adjacent RF frames, the better the robustness of the GMF, i.e. the resilience to noise of the first reception matrix 122b.

Conveniently, thanks to the digital nature of the considered signals, both the first transmission filter 112a and the transmission time window 112b can be implemented by a single first filtering module 112 designed to apply a square root raised cosine filter and a raised cosine time window to the first digital time signals (i.e., the main mode signals) in a combined way.

Figure 3A:
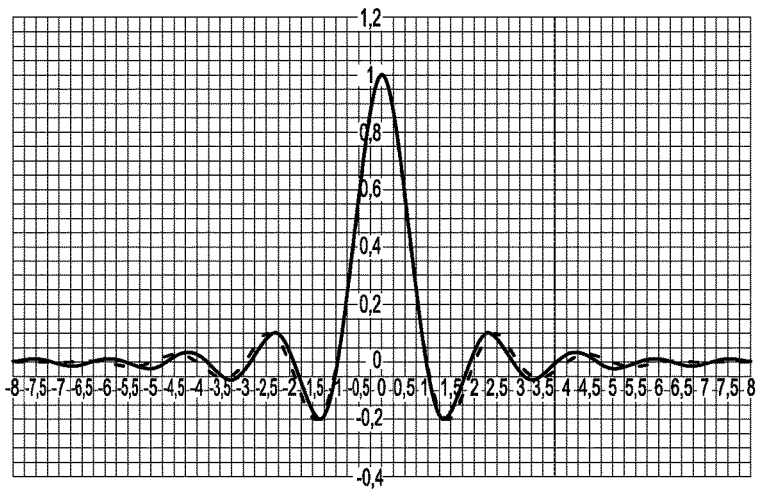
Figure 3B:
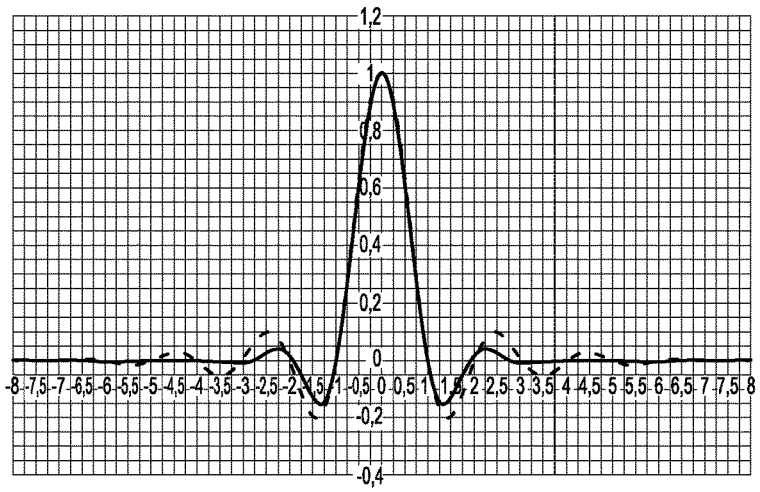
Figure 3C:
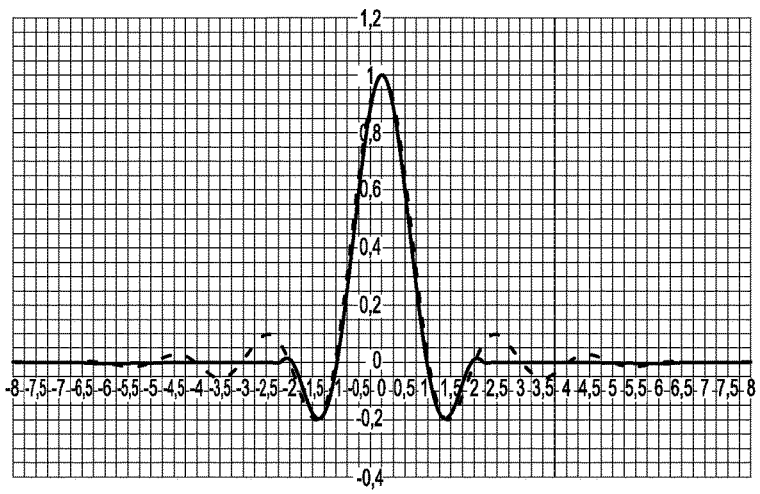

In this connection and in order to better understand the physical meaning of the requirement related to IFI reduction, FIG. 3 shows an example of impulse response of a square root raised cosine filter with 20% roll-off (illustrated by means of a dotted line) used as the first transmission filter 112a along with corresponding main mode signals at the output of the first filtering module 112 when:

a) no first transmission time window 112b is applied by said first filtering module 112;

b) a raised cosine time window with 100% time roll-off is used as the first transmission time window 112b; and c) a raised cosine time window with 0% time roll-off is used as the first transmission time window 112b.

From FIG. 3 it can be noted that the use of a 100% time roll-off allows to obtain a main mode signal with short time tails, that are not very different from the ones obtained with a 0% time roll-off; anyway, it is worth reminding that, as previously noted in connection with FIG. 2, the use of a 100% time roll-off has a strong advantage over the 0% time roll-off in terms of adjacent channel interference reduction. Therefore, a raised cosine time window with 100% time roll-off is preferably applied, as the transmission time window 112b, by the first filtering module 112.

As is known, square root raised cosine filters are frequently used as transmit and receive filters in digital communication systems to perform matched filtering for the purpose of minimizing inter-symbol interference (ISI). The overall response of two square root raised cosine filters (one applied at transmission side and one at reception side) is that of a raised cosine filter; in mathematical terms, $$H_{RC}(f) = H_{SRRC}^{TX}(f) \cdot H_{SRRC}^{RX}(f) \rightarrow H_{SRRC}^{TX}(f) = H_{SRRC}^{RX}(f) = \sqrt{H_{RC}(f)},$$

where $H_{RC}(f)$ denotes the frequency response of the raised cosine filter, $H_{SRRC}^{TX}(f)$ denotes the frequency response of the square root raised cosine filter used at transmission side, and $H_{SRRC}^{RX}(f)$ denotes the frequency response of the square root raised cosine filter used at reception side.

In more general terms, it is possible to use transmit and receive filters $H^{TX}(f)$ and $H^{RX}(f)$ such that:

$$H_{RC}(f) = H^{TX}(f) \cdot H^{RX}(f) \rightarrow \begin{cases} H^{TX}(f) = (H_{RC}(f))^{\alpha} \\ H^{RX}(f) = (H_{RC}(f))^{(1-\alpha)} \end{cases}. \quad (1)$$

As previously explained, the first radio communications system 1 uses two filters at transmission side, i.e., the first transmission filter 112a for the main mode and the second transmission filter 114a for the HOMs. Conveniently, again as previously explained, the first transmission filter 112a is a square root raised cosine filter with roll-off equal to, or higher than, 20% (for example equal to 20%, 25%, 30%, or 35%). Instead, as far as the second transmission filter 114a and the first reception filter 122a are concerned, the above equations (1) are conveniently applied; namely, in mathematical terms, the second transmission filter 114a and the first reception filter 122a are conveniently such that:

$$H_{RC}^{HOM-RX}(f) = H_{HOM}^{TX}(f) \cdot H^{RX}(f) \rightarrow \begin{cases} H_{HOM}^{TX}(f) = (H_{RC}^{HOM-RX}(f))^{\alpha} \\ H^{RX}(f) = (H_{RC}^{HOM-RX}(f))^{(1-\alpha)} \end{cases}, \quad (2)$$

where $H_{HOM}^{TX}(f)$ denotes the frequency response of the second transmission filter 114a, $H^{RX}(f)$ denotes the frequency response of the first reception filter 122a, and $H_{RC}^{HOM-RX}(f)$ denotes the frequency response of a given raised cosine filter with a cut-off frequency $f_C^{HOM-RX}$ such that $$f_C^{HOM-RX} = \gamma \cdot f_C^{MM}, \quad (3)$$

$f_C^{MM}$ denoting the cut-off frequency of the square root raised cosine filter used as the first transmission filter 112a for the main mode.

In the following, for the sake of description simplicity, the exponent $\alpha$ indicated in the equations (2) will be called filter-partition-related parameter, and the coefficient $\gamma$ indicated in the equation (3) will be called cutoff-frequency-related parameter.

Conveniently, in order to stabilize the behavior of the first reception matrix 122b requiring, as explained in WO 2015/067987 A1 and WO 2015/068036 A1, a larger bandwidth (similar to the vestigial bandwidth in SSB analog systems) to be resilient against channel errors and to allow pseudo-inversion procedure, the given raised cosine filter $H_{RC}^{HOM-RX}(f)$ in equations (2) has a roll-of of about 30% (for example, equal to 32%), the filter-partition-related parameter $\alpha$ is equal to 0.1, and the cutoff-frequency-related parameter $\gamma$ is comprised between 1.2 and 1.25 (for example, is equal to 1.25), thereby resulting that:

$$H_{HOM}^{TX}(f) = (H_{RC}^{HOM-RX}(f))^{0.1},$$

$$H^{RX}(f) = (H_{RC}^{HOM-RX}(f))^{0.9}, \text{ and}$$

$$f_C^{HOM-RX} = 1.25 \cdot f_C^{MM}.$$

In more general terms, the balance between the second transmission filter 114a and the first reception filter 122a should be optimized so as to minimize thermal noise level, IFI and adjacent channel interference (due essentially to the main mode contribution).

More in detail, the definition of the characteristics of the second transmission filter 114a and of the first reception filter 122a can be conveniently based on:
  the shape of the main mode and HOM functions to optimize the matrix coefficients;
  the tail extension for both the main mode and the HOMs;
  the thermal noise contribution due to the first reception filter 122a; and
  the adjacent channel interference noise contribution depending on the shape of the transmitted signal and on the shape of the first reception filter 122a.

In this respect, it is worth noting that the first reception filter 122a is defined in relation to HOMs, but is applied to main mode too.

The convolution between the main mode signal and the first reception filter 122a should be as much as possible limited to the RF frame size so as to limit IFI level.

The optimization of the filter parameters affects also the adjacent channel interference level and the thermal noise level, wherein these interference levels have opposite behaviors with respect to the IFI level. In fact, by increasing the filter-partition-related parameter α (and, hence, by decreasing the exponent (1−α) in equations (2)), the main mode signal keeps its shape and, thence, limits the IFI contribution, but the same choice increases the thermal noise contribution and the adjacent channel interference.

Both WO 2015/067987 A1 and WO 2015/068036 A1 describe the use, for HOMs, of a phase rotation of 90 degrees between two adjacent pulses; in this way each OAM mode 1 is generated by mixing the real part and the imaginary part of the symbol and the mode has its own subcarrier (either on the right or on the left of the OAM mode 0 (i.e., the main mode) carrier). This approach (double twist) is robust but implies a wider occupation of the overall spectrum bandwidth. This approach is reasonable in the Gaussian case with same transmission filters for both the main mode and the OAM mode 1, but is not efficient when using an optimized spectrum for the main mode, as according to the first preferred embodiment of the present invention.

Figure 4:
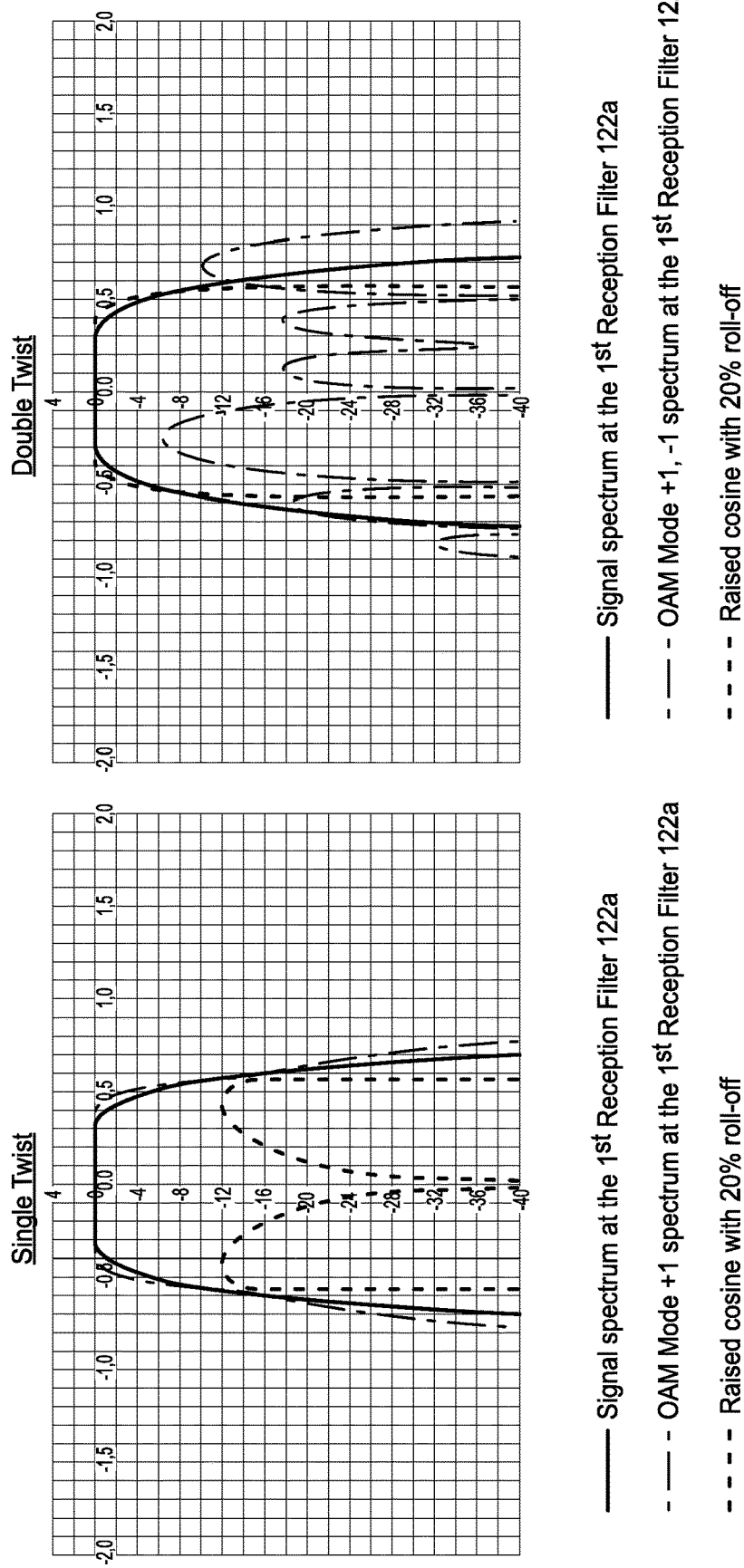

Therefore, preferably, for the OAM mode 1 is used a rotation of the symbol of 180 degrees (single twist) starting from a multiplication by j. In this way the subcarrier of the OAM mode 1 is coincident with the carrier of the OAM mode 0, as shown in FIG. 4 where the two cases (i.e., single twist and double twist) are compared. The advantage in terms of bandwidth reduction of the overall spectrum is evident and meaningful (more than 25%). The single twist approach could be mandatory in case of digital video broadcasting (DVB) signals occupying the full satellite transponder bandwidth.

As previously explained, the optimization process allowing to use raised cosine filtering for the main mode is very important; in fact, a different filtering between the main mode and the HOMs is adopted, the first reception filter 122a is matched with the second transmission filter 114a used for the HOMs which require more bandwidth, and this fact does not increase meaningfully the overall thermal noise level, the IFI or the adjacent channel interference. In the following some elements of this optimization process will be presented more in detail.

As is known and as previously explained, a generic impulse response of a square root raised cosine filter has a long time tail; thence, the transmission time window 112b is used for the main mode to limit time tails and to avoid any strong frequency filter distortion.

Figure 5B:
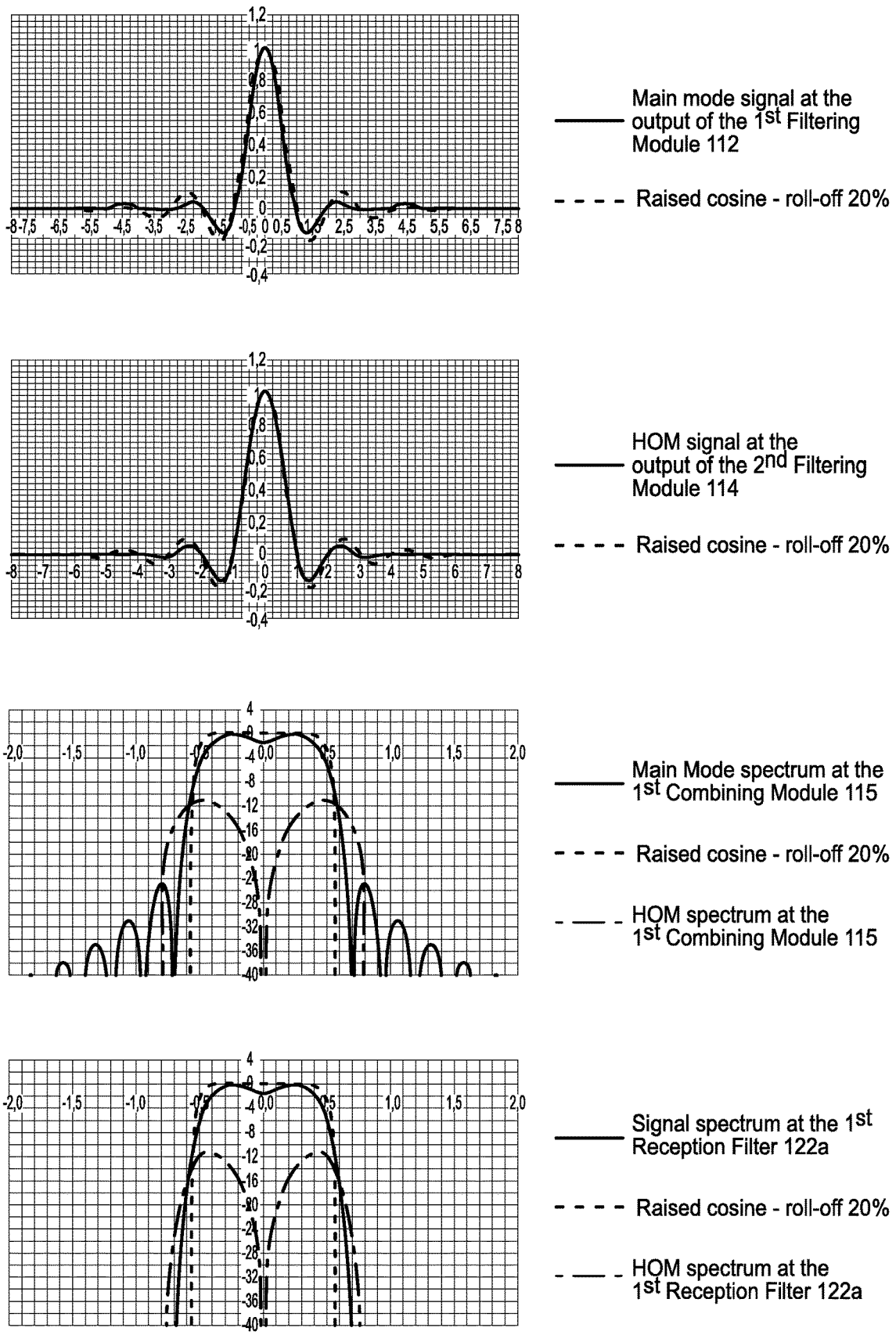

In this connection, FIGS. 5A, 5B and 5C schematically illustrate three examples of signal evolution from the first and second filtering modules 112 and 114 up to the application of the first reception filter 122a upon the assumption that:
the first transmission filter 112a is a square root raised cosine filter with 20% roll-off;
the given raised cosine filter $H_{RC}^{HOM-RX}(f)$ in equations (2) has a roll-off equal to 32%, the filter-partition-related parameter α is equal to 0.1, and the cutoff-frequency-related parameter γ is equal to 1.25; and,
as for the transmission time window 112b, no time window is used (FIG. 5A), a raised cosine time window with 0% time roll-off is used (FIG. 5B), and a raised cosine time window with 100% time roll-off is used (FIG. 5C).

From FIGS. 5A, 5B and 5C it can be noted that the presence of a long time tail introduces unacceptable RF frame contributions which, instead, should be avoided. On the other hand, a rectangular time window (i.e., a raised cosine time window with 0% time roll-off) introduces adjacent channel interference, while a smoothed time window (such as a raised cosine time window with 100% time roll-off) limits adjacent channel interference and, thence, is preferable.

In this connection, Table I in FIG. 6 shows a comparison of interference levels related to the three examples of signal evolution illustrated in FIGS. 5A, 5B and 5C.

Moreover, FIG. 7 schematically illustrates adjacent channel interference spectra again on the assumption that:
the first transmission filter 112a is a square root raised cosine filter with 20% roll-off;
the given raised cosine filter $H_{RC}^{HOM-RX}(f)$ in equations (2) has a roll-off equal to 32%, the filter-partition-related parameter α is equal to 0.1, and the cutoff-frequency-related parameter γ is equal to 1.25; and,
as for the transmission time window 112b,
a) no time window is used,
b) a raised cosine time window with 0% time roll-off is used, and
c) a raised cosine time window with 100% time roll-off is used.

As far as the second transmission filter 114a for HOMs and the first reception filter 122a are concerned, three main effects of the HOM filtering are to be taken into consideration; namely, a first effect is related to the GMF matrix stability (i.e., GMF matrix's sensitivity to errors occurring in received signal estimation). From this point of view it is not very important the way in which the given raised cosine filter $H_{RC}^{HOM-RX}(f)$ indicated in equations (2) is partitioned between transmission and reception sides. A second effect is the distortion on the main mode signal shape and the generation of IFI; finally, the third effect is related to the capability of filtering the thermal noise, with two impacts: the former on the overall level of noise affecting the main mode and the HOMs, the latter on the peculiar capability of the HOMs to be insensitive to a part of the noise, due to the matrix structure of the GMF.

In this connection, Table II in FIG. 8 shows a comparison of interference levels experienced with different filter partitions (i.e., assuming different values for the filter-partition-related parameter α). From the Table II in FIG. 8 the preferred configuration with α=0.1 represents the best performing choice.

Preferably, as previously explained, the given raised cosine filter $H_{RC}^{HOM-RX}(f)$ in equations (2) has a roll-off equal to 32%, the filter-partition-related parameter α is equal to 0.1, and the cutoff-frequency-related parameter γ is equal to 1.25 (i.e., $f_C^{HOM-RX}=5/4 \cdot f_C^{MM}$). Conveniently, at transmission side the signal can be filtered by an additional square filter with a half bandwidth (HBW) given by:

$$HBW = \frac{\frac{5}{4}(1+0.32)}{2}.$$

In this way the adjacent channel interference generated by the HOMs is limited to a minimum.

Figure 9:
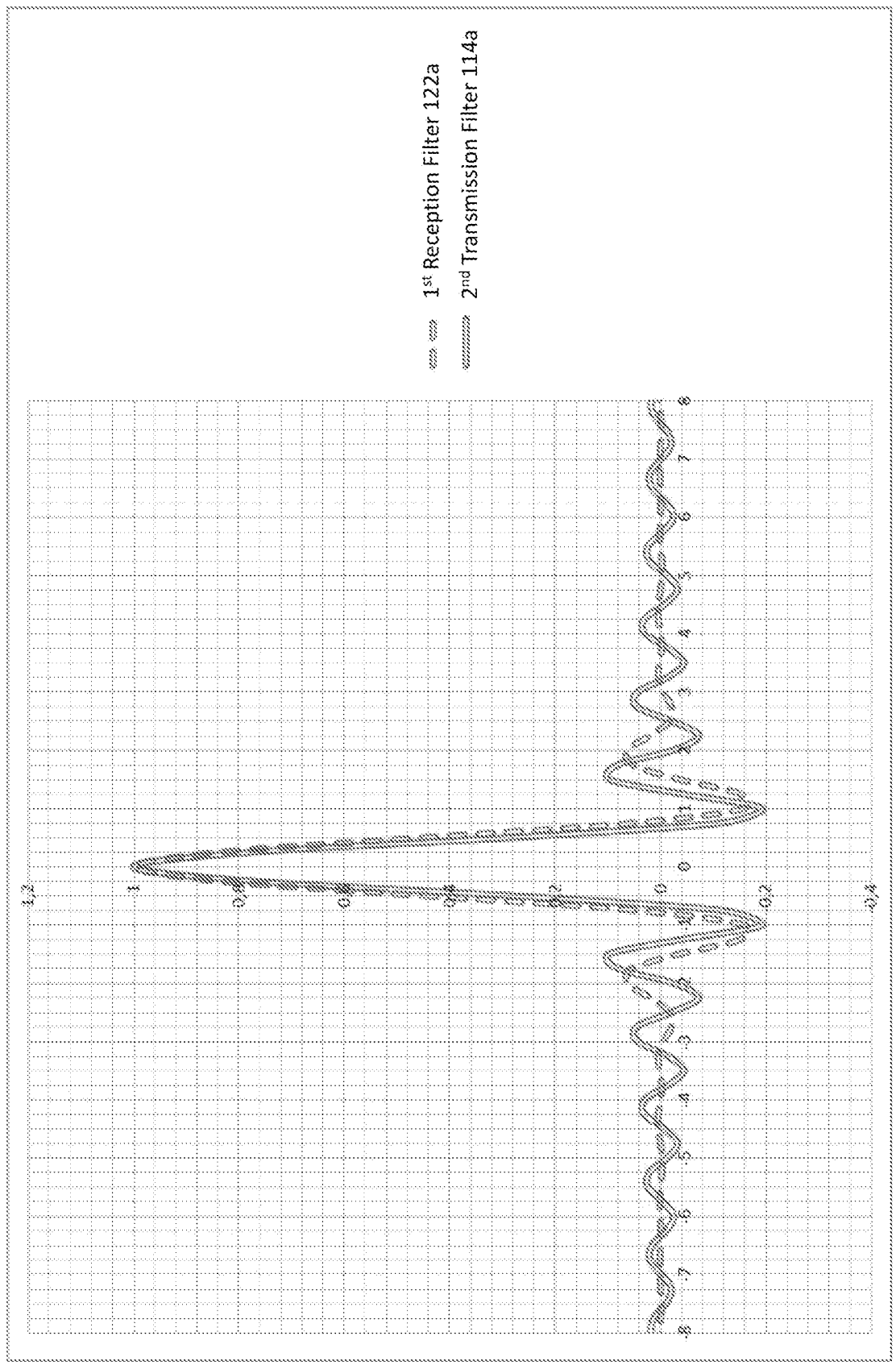

In this connection FIG. 9 shows:

an example of impulse response of the second transmission filter 114a on the assumption that the latter is a raised cosine filter with roll-off equal to 32%, the filter-partition-related parameter α is equal to 0.1, and the cutoff-frequency-related parameter γ is equal to 1.25; and an example of impulse response of the first reception filter 122a on the assumption that the latter is a raised cosine filter with a roll-off equal to 32%, the respective exponent (1−α) is equal to 0.9, and the cutoff-frequency-related parameter γ is equal to 1.25.

As expected, the two functions are not equal, due to the "unbalanced" partitioning of the raised cosine between transmission and reception sides.

As already explained several times in the foregoing, the use of a raised cosine filter introduces considerable signals' time tails (while this fact does not occur with a Gaussian filter). Therefore it can be convenient to increase the size of the RF frame so as to reduce the relative impact of these time tails.

The minimum size can be considered as ten main symbols (i.e., ten first digital symbols carried by the main mode); in this way the HOM(s) are protected from interference within the RF frame (i.e., insensitivity to the preceding and the following RF frames).

By using a more optimized matrix, the number of main mode pulses (i.e., symbols (since each main mode sample carries a respective symbol)) per RF frame can be increased, thereby introducing a lesser influence of the boundary limitation of the RF frame and increasing the efficiency of the overall space modulation system.

Figure 10:
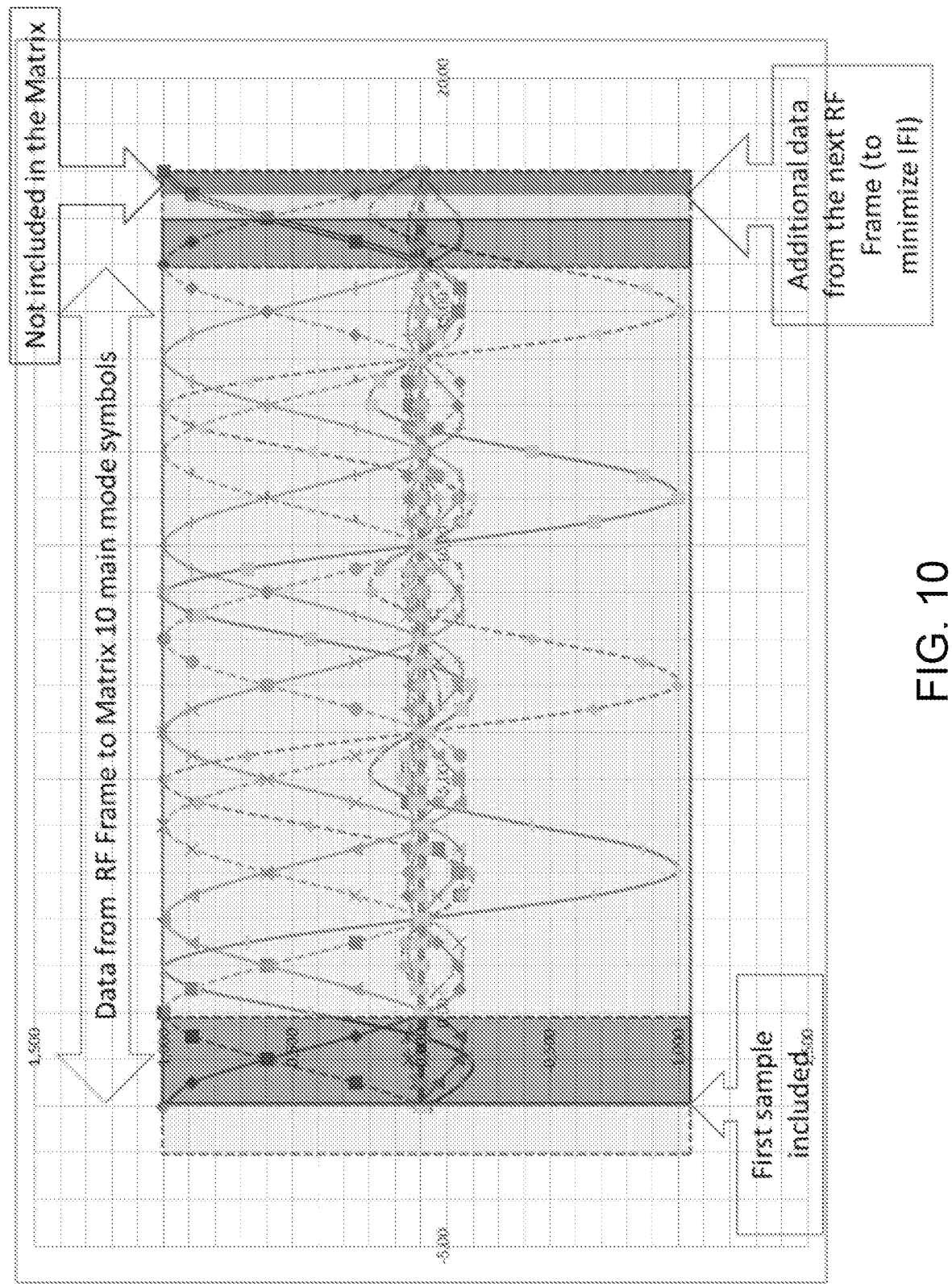

In addition to this consideration, the first symbol of the next frame is considered to take into account the tail elongation of the main mode signal. This symbol is not considered for its own estimation, but only for its impact on the symbols of the analyzed frame. The logics of this procedure is shown in FIG. 10. The HOMs are reasonably inside the RF frame and the eleventh main symbol gives the impact of the next RF frame on the symbols carried by the previous RF frame, so only the second symbol of the next frame is not included. On the contrary, the first symbol does not need any adjustment, due to its nature, for which it is sufficient to consider only one sampling at its maximum.

In general, the number of symbols carried by the main mode per RF frame can be much higher than ten symbols; for instance, it can be also higher than one hundred symbols. Preferably, the HOMs are arranged only in a central portion of the RF frame leaving RF frame boundaries free of HOM time samples, as illustrated in FIG. 10; namely, the HOMs are preferably arranged only after a given number of main mode time samples (and, thence, a given number of main mode symbols, since each first time sample carries a respective symbol), leaving free of HOM time samples also a final portion of the RF frame (where only one or more main mode time samples are present), so as to keep each RF frame insensitive to the preceding and the next RF frames. In particular, the HOMs can be conveniently positioned so that each symbol carried by a HOM is repeated once multiplied by j and once multiplied by −j and carried by respective HOM time samples that are time-shifted by half the symbol period T/2 (T denoting the symbol period) with respect to the main mode time samples.

Conveniently, the HOM sequence and/or positioning within an RF frame can be used as a sort of additional security layer to protect the contents of the HOMs from unwished detection; in fact, it is possible to:

multiply the first sample of a HOM symbol once by j or −j, 1 or −1, and once by the opposite value; and/or skip some positions to create a sequence of the HOM symbols, which is not regularly distributed along the RF frame; and/or define a "secret rule of composition" of each RF frame unknown to a non-authorized user; and/or have different HOM sequence for a defined number of RF frames; this fact implies that a super RF frame is introduced with an additional law of distribution of HOMs along each RF frame and a super RF matrix structure which is realized using a sequence of reception matrices according to the number of frame comprised within the super RF frame architecture.

The codification rule can be similar to a light cryptographic system with the meaningful advantage to be implemented at RF level and not at baseband level.

Figure 11:
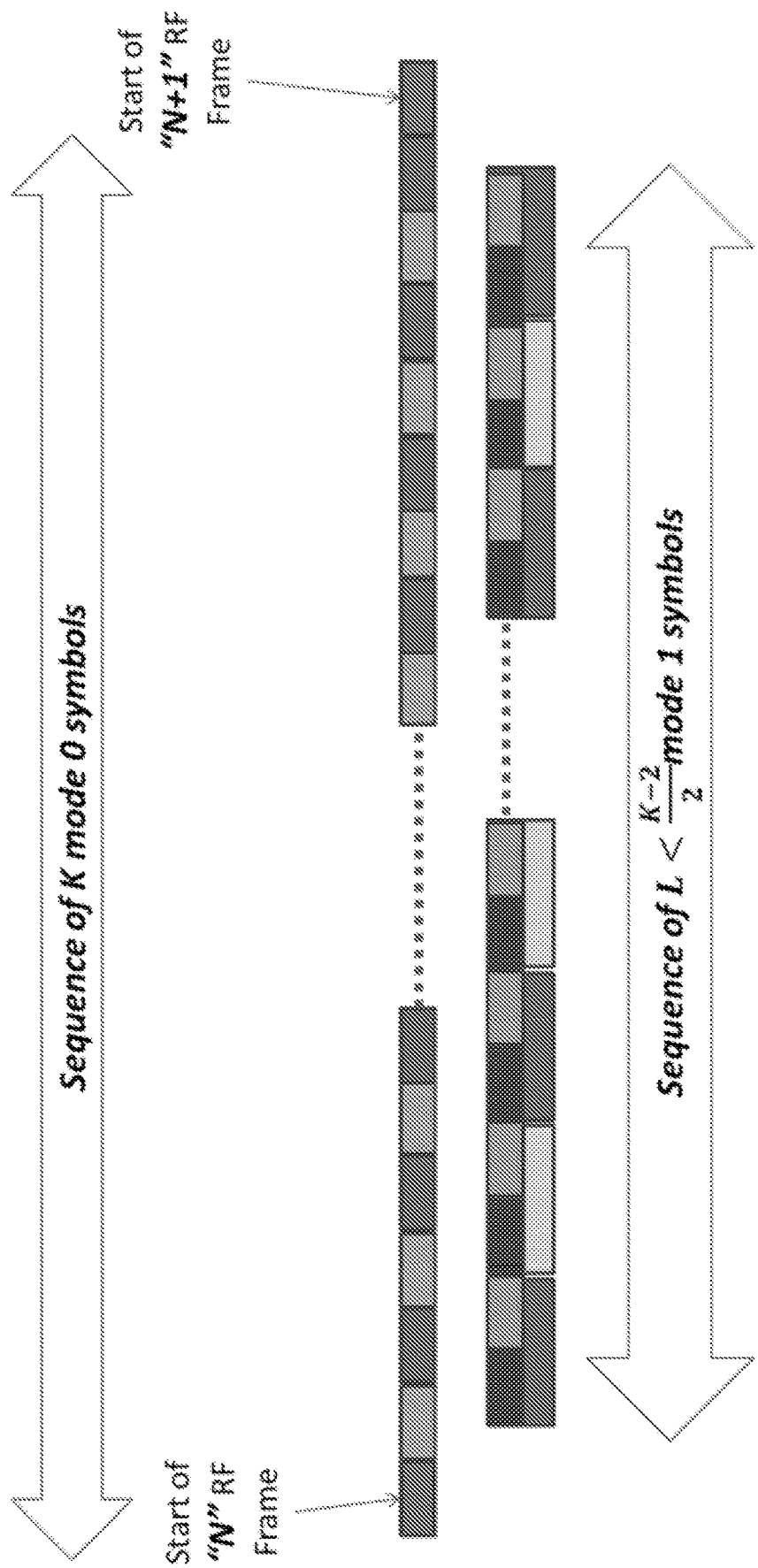
Figure 12:
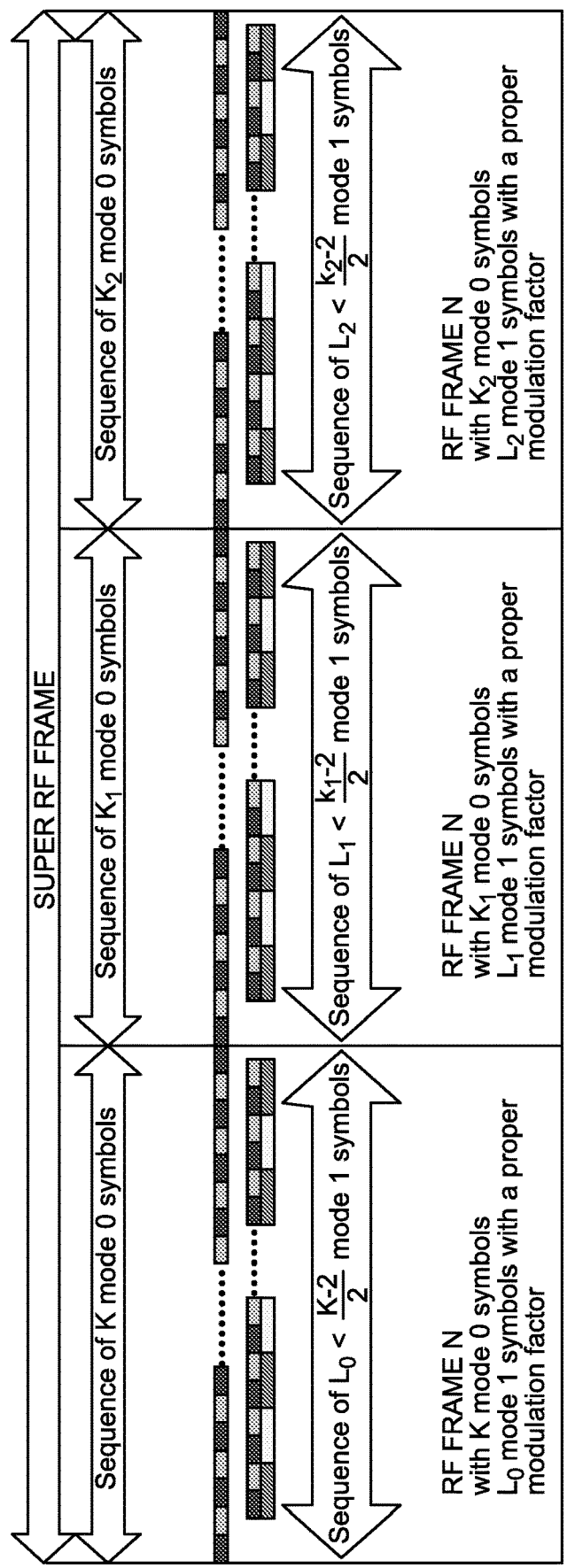

In this connection, FIGS. 11 and 12 show examples of, respectively, an RF frame and a super RF frame (including three RF frames as that one shown in FIG. 11), which are designed and used to protect HOMs from detection by non-authorized users.

On the assumption that the number P of symbols carried by the main mode per RF frame is equal to one hundred (i.e., P=100), the number of possible combinations to be considered with a super RF frame including N=3 RF frames is approximately given by:

$$\text{number of combinations} = 2^{N(P-2)} \cong 2 \cdot 10^{90}.$$

If P=10 and no super RF frame is used, the number of combinations is equal to 256.

In the following, backward compatibility of the first radio communications system 1 will be analyzed. In particular, the backward compatibility is considered to be the property of the transmitted twisted wave signal to be received by a traditional receiver, where the main mode signals are the traditional signal to be received by said traditional receiver, while the HOM signals are considered as noise signals.

From this point of view, the shape of the transmitted main mode signals is rather important. In fact, the choice of using a square root raised cosine filter as the first transmission filter 112a, followed by a suitable time window (i.e., the transmission time window 112b), is a very good solution, which does not increase ISI level of the overall received signal.

In the following also thermal noise property of the HOMs will be analyzed, which property depends on the GMF and allows to reduce power level of the HOM signals, maintaining a good quality of the symbol energy to noise power spectral density ratio ($E_S/N_0$).

The backward compatibility can be assessed by considering the first transmitter 11 operating at transmission side and a traditional receiver operating at reception side, which traditional receiver uses, as reception filter, a traditional square root raised cosine filter. Of course, there is no GMF at the reception side and, thence, the HOM signals present in the received signals are considered noise by said traditional receiver. This noise degrades the performance of the main mode on the conventional channel; moreover, it can be noted that the presence of HOMs is compatible with quadrature phase-shift keying (QPSK) and 8PSK modulations, but could be non-compatible with more complex modulations.

The additional noise introduced by the HOMs when received by a conventional receiver can be reduced by conveniently introducing a two-level configuration, taking into account that there may continue to exist equipments authorized to receive only main mode signals. In other words, there could exist receivers authorized to receive main mode only, and also receivers authorized to receive main mode and HOMs (i.e., receivers configured as the first receiver 12). The advantage of such a two-level configuration is to avoid the HOM noise on the main mode for users authorized to receive main mode only.

Figure 13:
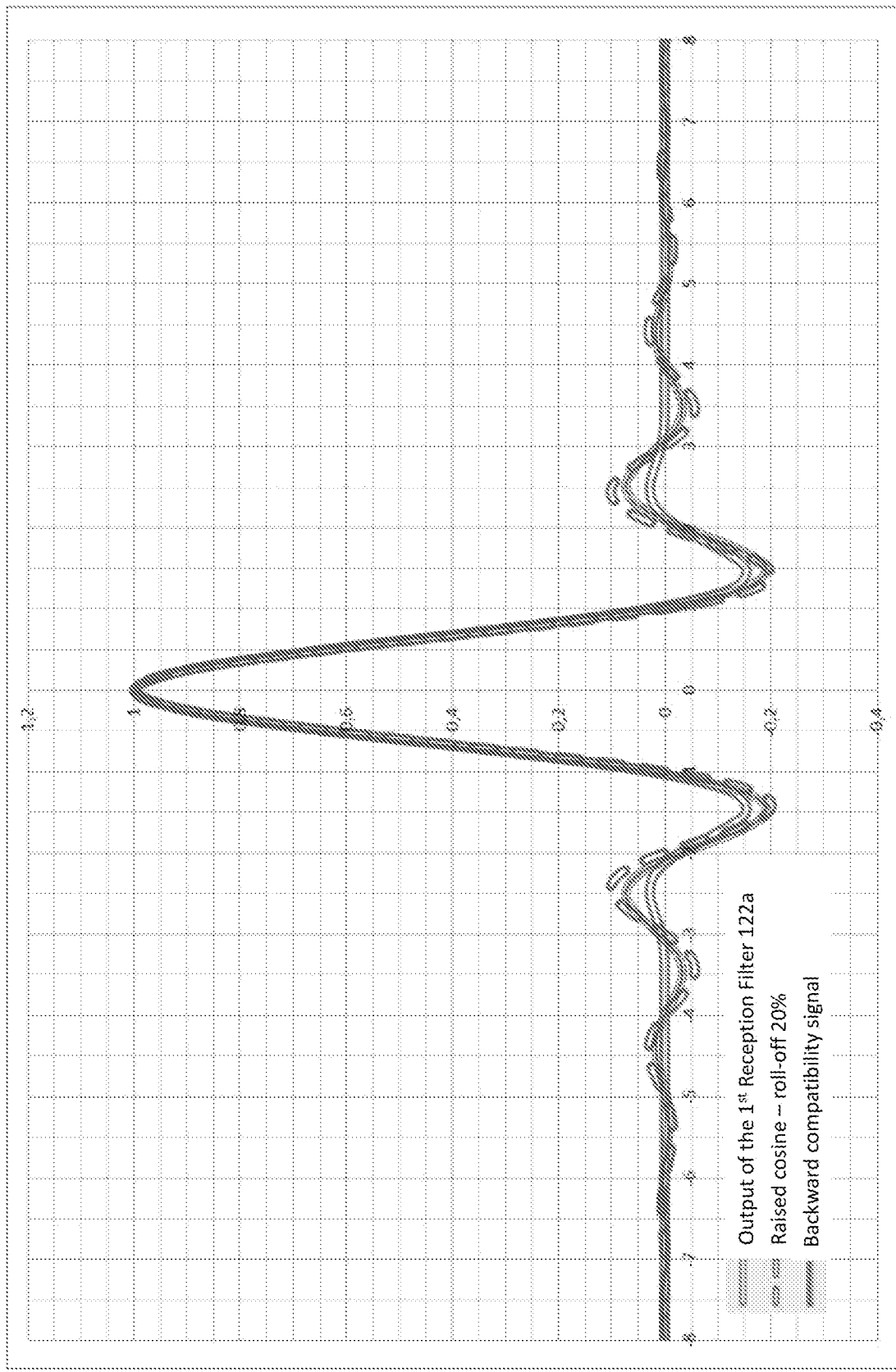

The main mode signal exhibits a very good behavior when it passes through a traditional square root raised cosine filter. In this connection, FIG. 13 shows three impulse response functions related to the outputs of, respectively, the first reception filter 122*a*, the traditional raised cosine, and the convolution of the truncated square root raised cosine applied by the first transmitter 11 and the traditional square root cosine applied by a traditional receiver. From FIG. 13 it can be noted that the positions of the zero points do not change; therefore, the ISI level is very good as requested to get a good communication channel.

It is worth noting also that experimental simulations and tests performed by the Applicant in relation to backward compatibility of the first radio communications system 1 have shown that adjacent channel interference due to HOMs is fully negligible for traditional receivers.

The use of time twisted waves for digital modulated signals requires an additional bandwidth (similarly to the SSB technique used for analogic modulated signals), which causes, when used in a multiple carrier configuration, the presence of an adjacent channel interference larger than the one generated by the conventional raised cosine signals. This aspect is very well known in the case of Gaussian-modulated signals used in GSM.

In satellite communications there is a configuration in which the available bandwidth is strongly limited by the transponder filter and is fully used by a single channel, that is the case of DVB, wherein the transmission is characterized by the presence of a unique time-division multiplexing (TDM) signal. In this case the overall bandwidth cannot be increased at all, therefore it is necessary to limit the roll-off factor to allow the presence of the HOMs avoiding criticalities for the first reception matrix 122*b*. In other words, also conventional DVB satellite systems can be enriched with the time twisted wave technology by exploiting a reduction of the roll-off factor which allows HOMs to be used also with a satellite transponder and, thence, a higher overall information rate to be obtained.

The sensitivity of the first reception matrix 122*b* to errors is an important element to be taken into account. The introduction of a sharp filter, such as the transponder one, might be critical to the consistency of the overall twisted wave architecture. Therefore, it is convenient to use a configuration optimized for such a particular case. In this connection Table III in FIG. 14 shows features related to the use, with a satellite transponder, of the OAM modes 0 and 1, and OAM modes 0 and 2. From Table III in FIG. 14 it can be noted that with mode 0 the first reception matrix 122*b* can support, in a 36 MHz transponder bandwidth, a time twisted wave configuration using mode 1 with a roll-off factor (ROF) up to 28% for the first transmission filter 112*a* (i.e., for the main mode 0). After this limit the matrix's sensitivity to noise and errors becomes unacceptable. When modes 0 and 2 are used, the first reception matrix 122*b* can easily support up to a 15% ROF for the first transmission filter 112*a* (i.e., for the main mode 0).

As previously explained, the use of a sharp filter can have an impact on the twisted wave overall performance, due the sensitivity of the first reception matrix 122*b* to errors, when the HOM filter (i.e., the second transmission filter 114*a*) is too narrow. Therefore, even if the impulse response of the overall communication channel is implemented into the first reception matrix 122*b*, the overall bandwidth can be too narrow to allow a satisfactory reconstruction of the incoming signals.

Figure 15:
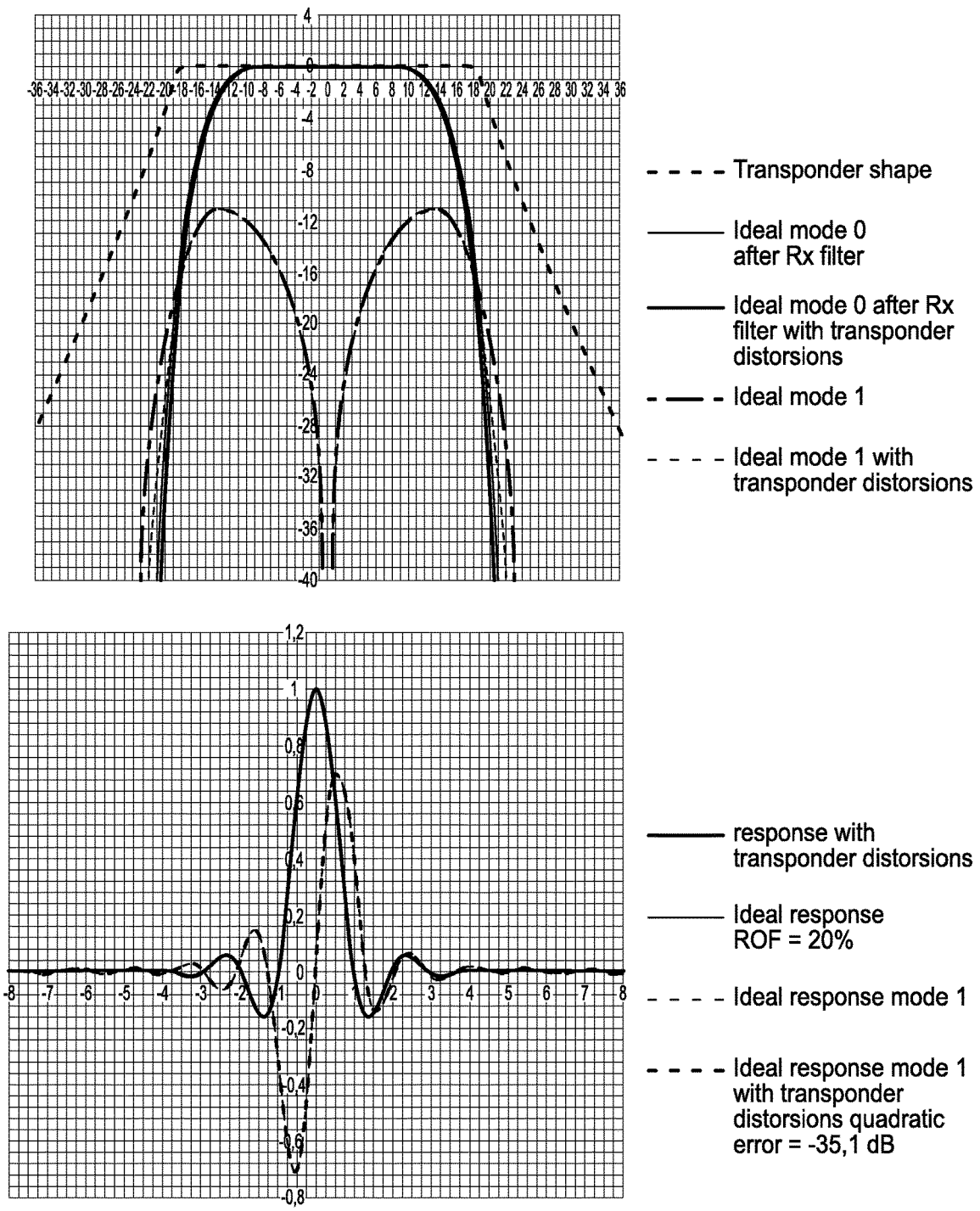

In this connection, FIG. 15 shows the effects of the transponder filter on the spectra and on the time responses of the main mode and the twisted mode 1 on the assumption that a 20% ROF is used for the first transmission filter 112*a* (i.e., for the main mode). In particular, such a 20% ROF produces a symbol rate of 30 MHz compared with 36 MHz transponder bandwidth. As it can noted from FIG. 15, the main mode is poorly modified but the HOM 1 has a severe reduction of its bandwidth at about 3 dB of its relative maximum. This causes a strong reduction of resilience of the first reception matrix 122*b* to errors and makes the system performance not acceptable.

Figure 16:
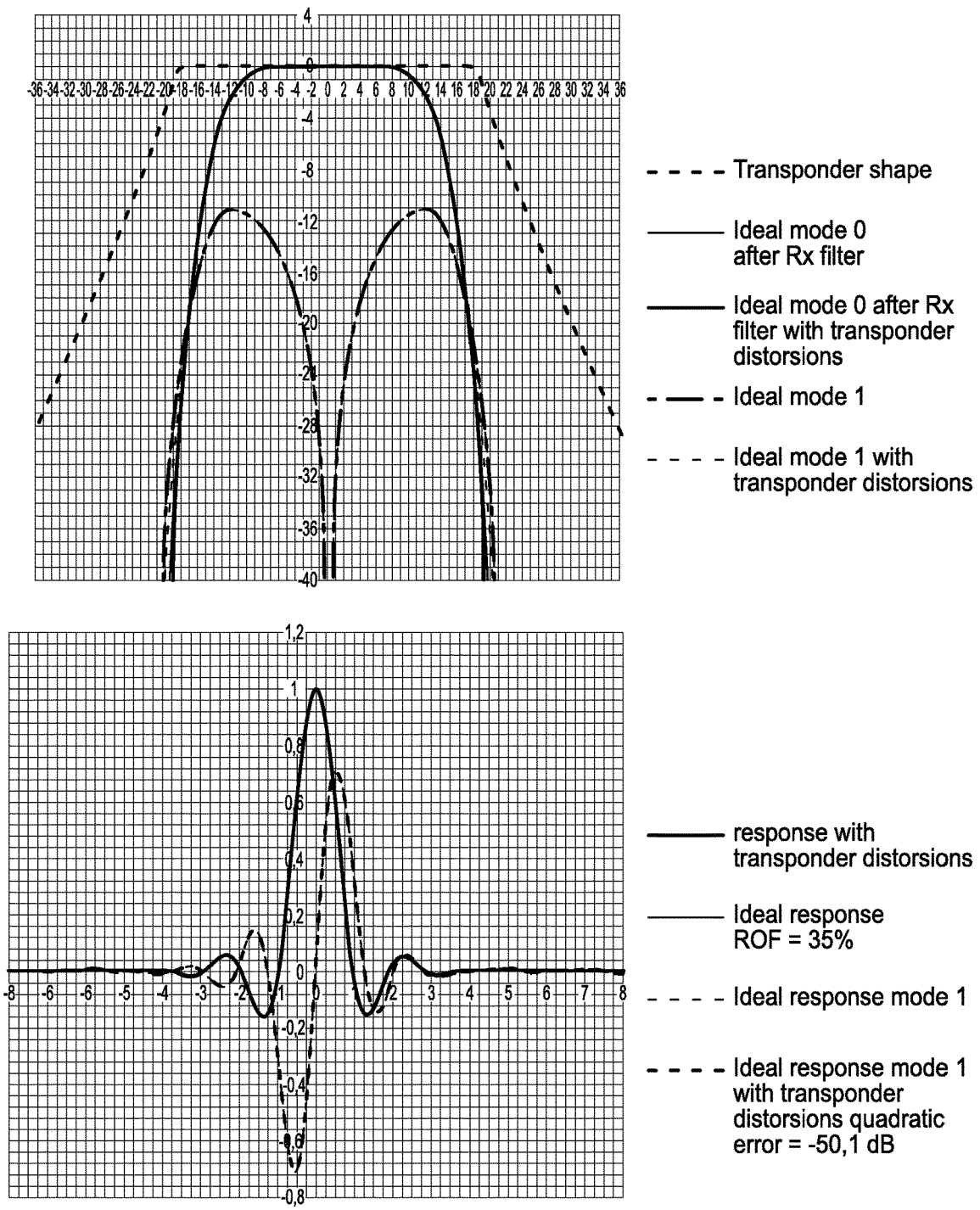

Instead, FIG. 16 shows a completely different situation. In fact, FIG. 16 shows the effects of the transponder filter on the spectra and on the time responses of the main mode and the twisted mode 1 on the assumption that a 35% ROF is used for the first transmission filter 112*a* (i.e., for the main mode). In particular, such a 35% ROF produces a symbol rate of 26.7 MHz compared with 36 MHz transponder bandwidth. In the example shown in FIG. 16, the HOM 1 cut is negligible, since it starts below 10 dB from the relative HOM maximum.

The shapes of the time responses allow to understand the different behavior introduced by the bandwidth cut of the HOM spectrum, showing the remarkable difference between the signal with and without the bandwidth cut for a main mode ROF of 20%, while the two signals are almost identical for a main mode ROF of 35%. In this connection, Table IV in FIG. 17 shows twisted wave performance for several main mode ROF from 5% up to 35%.

As previously explained, the first radio channel 13 is affected by thermal noise (as also shown in FIG. 1). The noise after the first reception matrix 122*b* can be represented, using the sampling theorem, with a sequence of pulses characterized by the spectrum of the first reception filter 122*a*. These samples are fully represented by the used sampling rate, which has been assumed to be four times the minimum one.

The noise contribution can be considered as an addition of two noise components, wherein:
  the former depends on the first transmission filter 112*a* and is present in the first reception matrix 122*b* with the same coefficients as the main mode, thereby not being distinguishable from the main mode samples; and
  the latter is an additional contribution due to the difference between the first reception filter 122*a* and the first transmission filter 112*a*.

In mathematical terms, in time domain there results that $$n_{RX}(t) = n_{MM\text{-}TX\text{-}Filter}(t) + n_{\Delta filter}(t)$$

or, considering the frequency domain, $$N_{RX}(f) = N_{MM\text{-}TX\text{-}Filter}(f) + N_{\Delta filter}(f),$$

where:
  $n_{RX}(t)$ and $N_{RX}(f)$ denote the noise at reception side, in particular at the input of the first reception matrix 122*b*;
  $n_{MM\text{-}TX\text{-}Filter}(t)$ and $N_{MM\text{-}TX\text{-}Filter}(f)$ denote the noise component depending on the first transmission filter 112*a*; and
  $n_{\Delta filter}(t)$ and $N_{\Delta filter}(f)$ denote the noise component due to the difference between the first reception filter 122*a* and the first transmission filter 112*a*.

The first noise component $n_{RX}(t)/N_{RX}(f)$, which has the same shape as the main mode, is considered by the GMF as an additional component of the main mode pulse, while the filter-difference-related component $n_{\Delta filter}(t)/N_{\Delta filter}(f)$ affects both the main mode and the HOMs.

Figure 18:
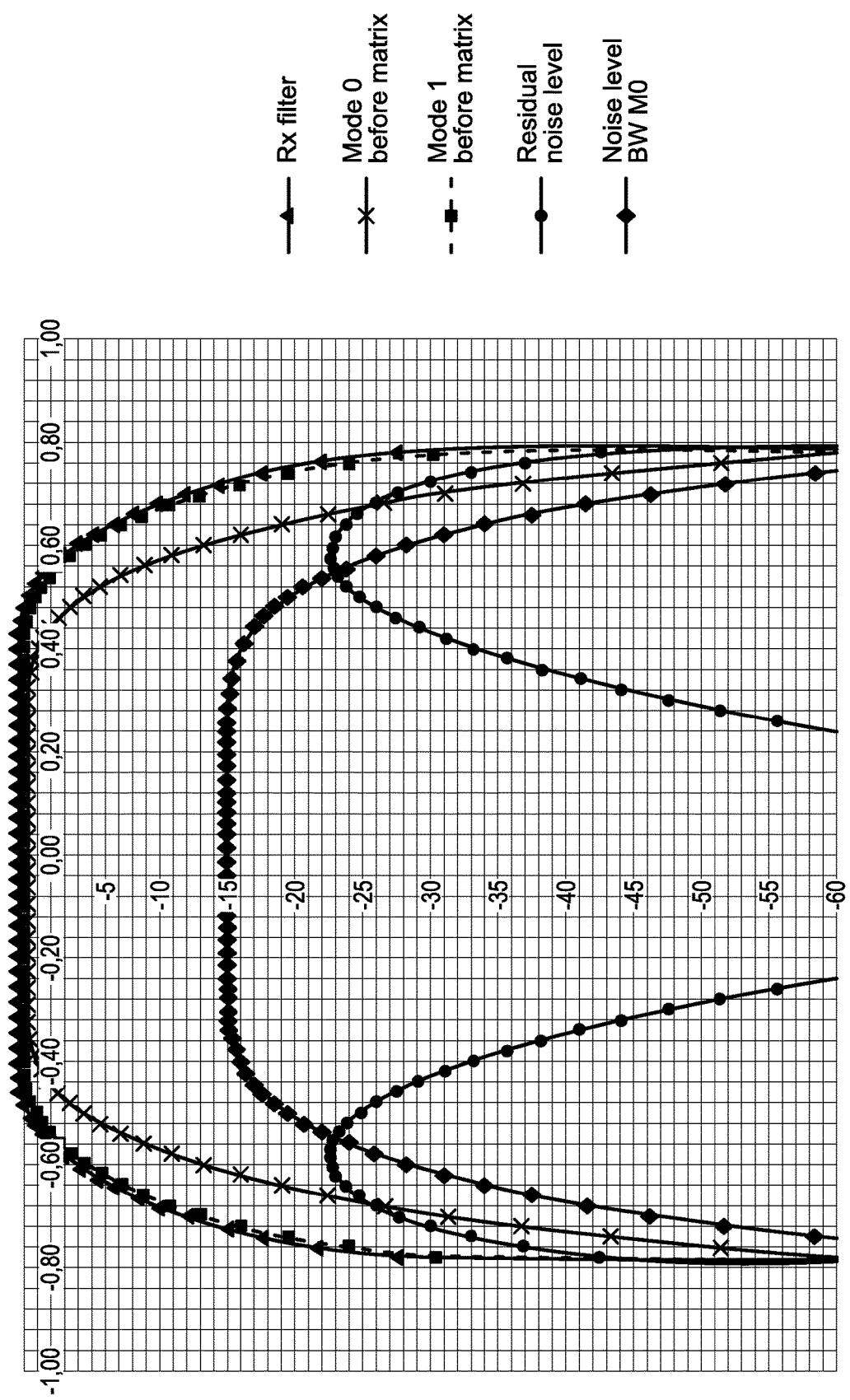

In this connection, FIG. 18 shows the spectrum of the two noise components $N_{MM\text{-}TX\text{-}Filter}(f)$ and $N_{\Delta filter}(f)$ at the input of the first reception matrix 122b. From FIG. 18 it can be noted that the main noise contribution is present on the main mode, while the HOMs are affected by a much lower noise contribution, which, however, can be unfortunately amplified by the first reception matrix 122b (in particular, if the bandwidth of the HOMs is too sharpened) due to the structure of the first reception matrix 122b itself, as also explained in detail in WO 2015/067987 A1 and WO 2015/068036 A1. This noise structure is important for balancing noise growth due to the first reception matrix 122b, the bandwidth increase and the backward compatibility, maintaining for all configurations a reasonably good bit error rate (BER). In fact, when necessary, there is the possibility of reducing the energy per symbol only for the HOMs, thereby allowing compatibility with a conventional receiver.

The Applicant has carried out many experimental tests in order to assess the performance of the first radio communications system 1. The results of some of said experimental tests will be presented in the following.

In particular, said experimental tests have been carried out in relation to the following configuration of the first radio communications system 1:

the first transmission filter 112a is a square root raised cosine filter with 20% roll-off;

the given raised cosine filter $H_{RC}^{HOM\text{-}RX}(f)$ in equations (2) has a roll-off equal to 32%, the filter-partition-related parameter $\alpha$ is equal to 0.1, and the cutoff-frequency-related parameter $\gamma$ is equal to 1.25;

the transmission time window 112b is a raised cosine time window with 100% time roll-off; and it is assumed to have an arbitrary number of equal channels, properly frequency-spaced, according to the selected roll-off of 20% of the first transmission filter 112a.

In the adjacent channel interference computation one channel has been considered for evaluation, but the interference value has been multiplied by two so as to take into account the general case of two interfering adjacent channels.

At the beginning, an initial value has been computed for an initial signal-to-noise ratio (S/N or SNR) of 15 dB, then the general behavior has been checked changing the S/N value.

In particular, two cases have been considered: the former involving no requirement as for backward compatibility, while the latter supports backward compatibility with at least a QPSK modulation.

The best performance is obtained when the $E_S/N_0$ for the main mode and the one for the HOMs are the same.

In this connection, it is worth considering that, in order to keep constant the overall power level, the initial $E_S/N_0$ is reduced of 1.46 dB for the main mode.

The overall performance is quite good with a maximum spectral efficiency of 6.12 bit/s/Hz (while maximum spectral efficiency with the use of only the main mode is equal to 4.9 bit/s/Hz).

Figure 19:
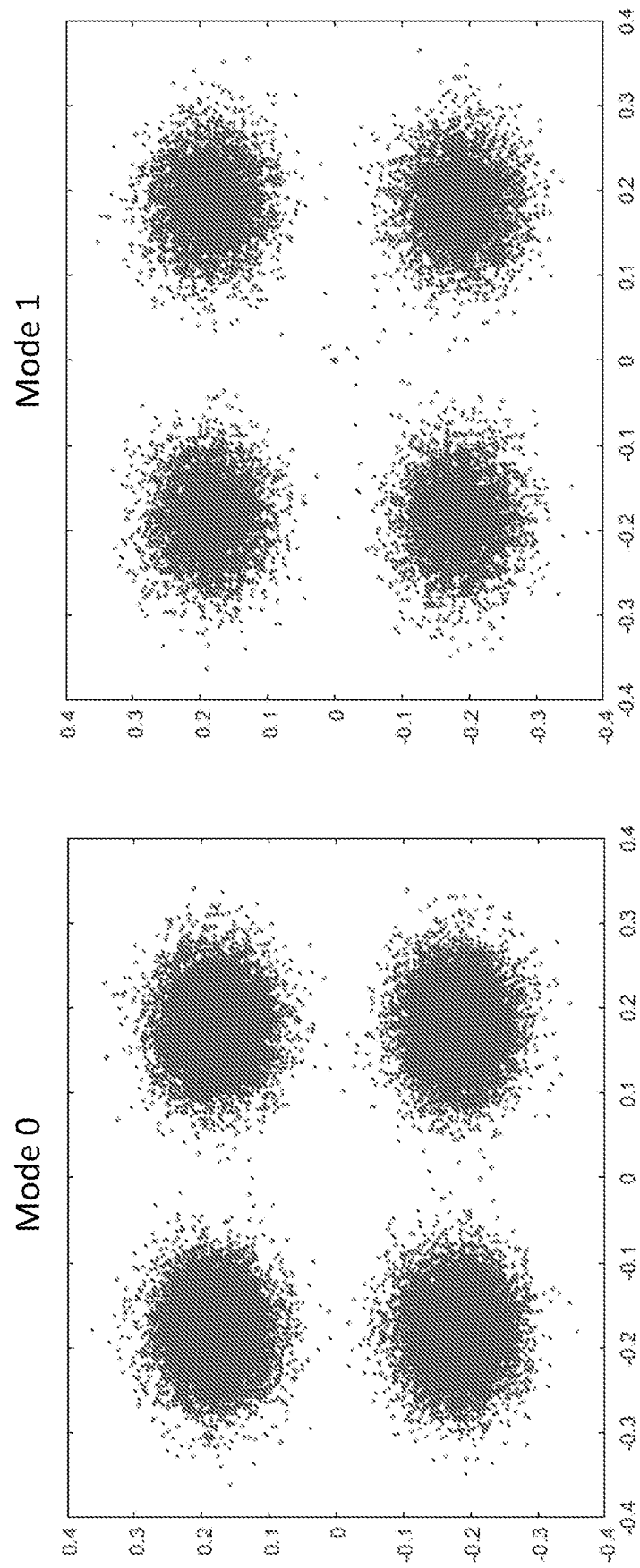

The computed modulation error ratio (MER) of the configuration (using QPSK modulation for all modes) is shown in FIG. 19. In particular, from FIG. 19 it can be noted that the scatter of the main mode and the mode 1 are similar.

Indeed, the first reception matrix 122b is such that to balance noise effects between the two modes.

The simulation has been performed by using Matlab and introducing the thermal noise contribution before the first reception filter 122a. The SNR has been computed after the first reception filter 122a using time sequence averaged levels and is around 15 dB. This level has been kept constant for the twisted wave signal and for the conventional one.

The computed levels of MER after the first reception matrix 122b is around 13.5 dB for both modes. The equivalent Shannon limit for the twisted waves signal is about 6.36 bit/s/Hz against 5.02 of the traditional signal architecture, with an overall gain of 1.27.

This system can also give some level of compatibility with a traditional receiver, while the price to pay is that this kind of receiver considers the presence of HOMs as noise.

This property is called backward compatibility and, in order to have levels of S/N of at least 10-11 dB, the HOMs should be conveniently attenuated around 3 dB with respect to the main mode power level.

A reasonable compromise is obtained by introducing an attenuation for HOMs of the order of 4 dB. The main mode is reduced of 0.64 dB to keep constant the overall power. In this way the maximum spectral efficiency for twisted waves is about 5.3 bit/s/Hz against the value of 4.39 bit/s/Hz related to the use of only the main mode, with a gain of 1.2 and 1.38 assuming the same roll-off for the reference channel.

Figure 20:
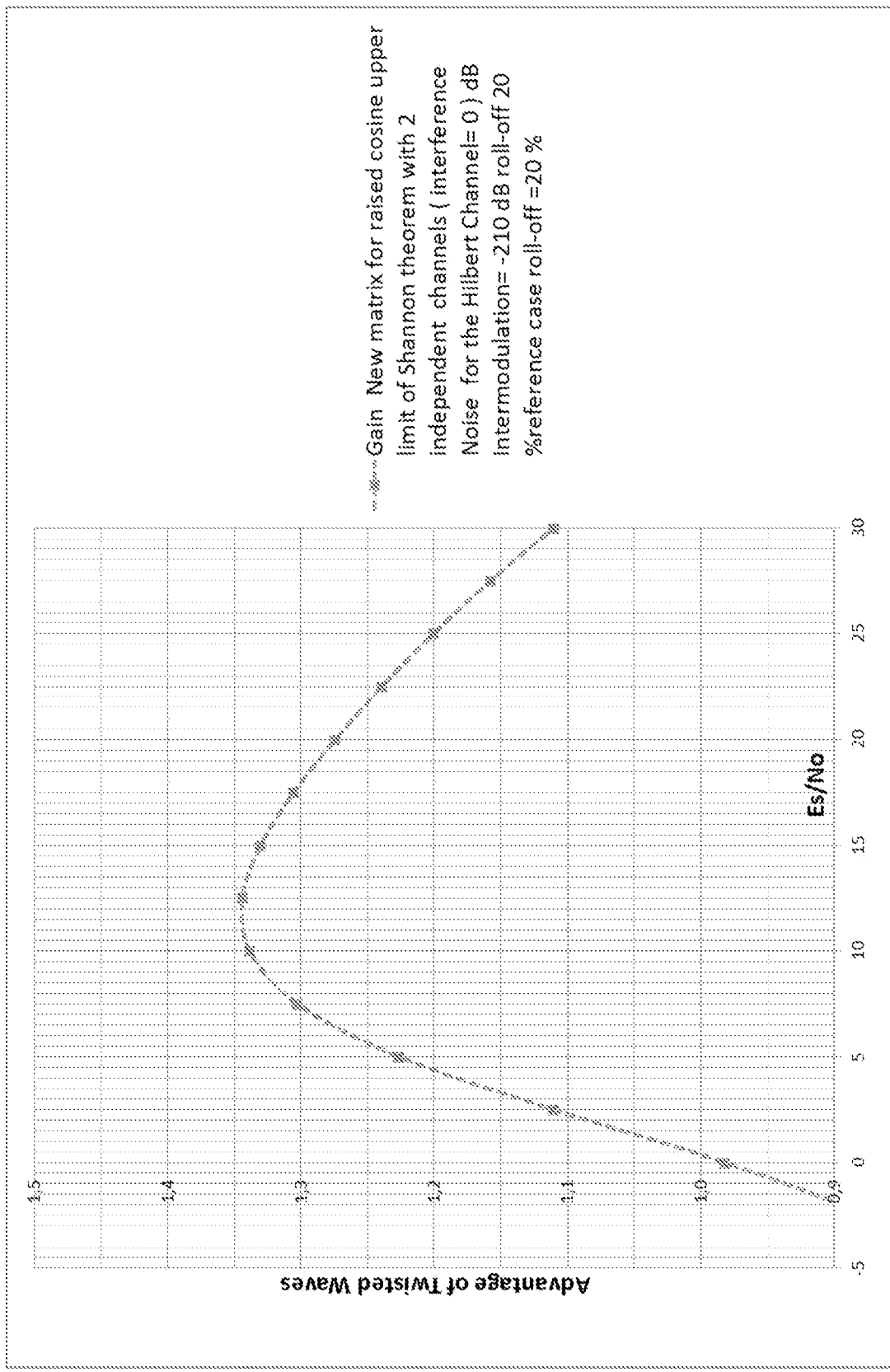

Moreover, FIG. 20 shows gain of the twisted wave signal assuming 0 dB of attenuation for HOMs with respect to the main mode. As shown in FIG. 20, the maximum gain is about 1.35 (same roll-off) and 1.15 with respect Shannon limit with a S/N of 13 dB. Increasing the S/N above 25 dB, the gain starts to decrease due to the impact of residual IFI between RF frames and of the adjacent channel interference which is around −29 dB.

Figure 21:
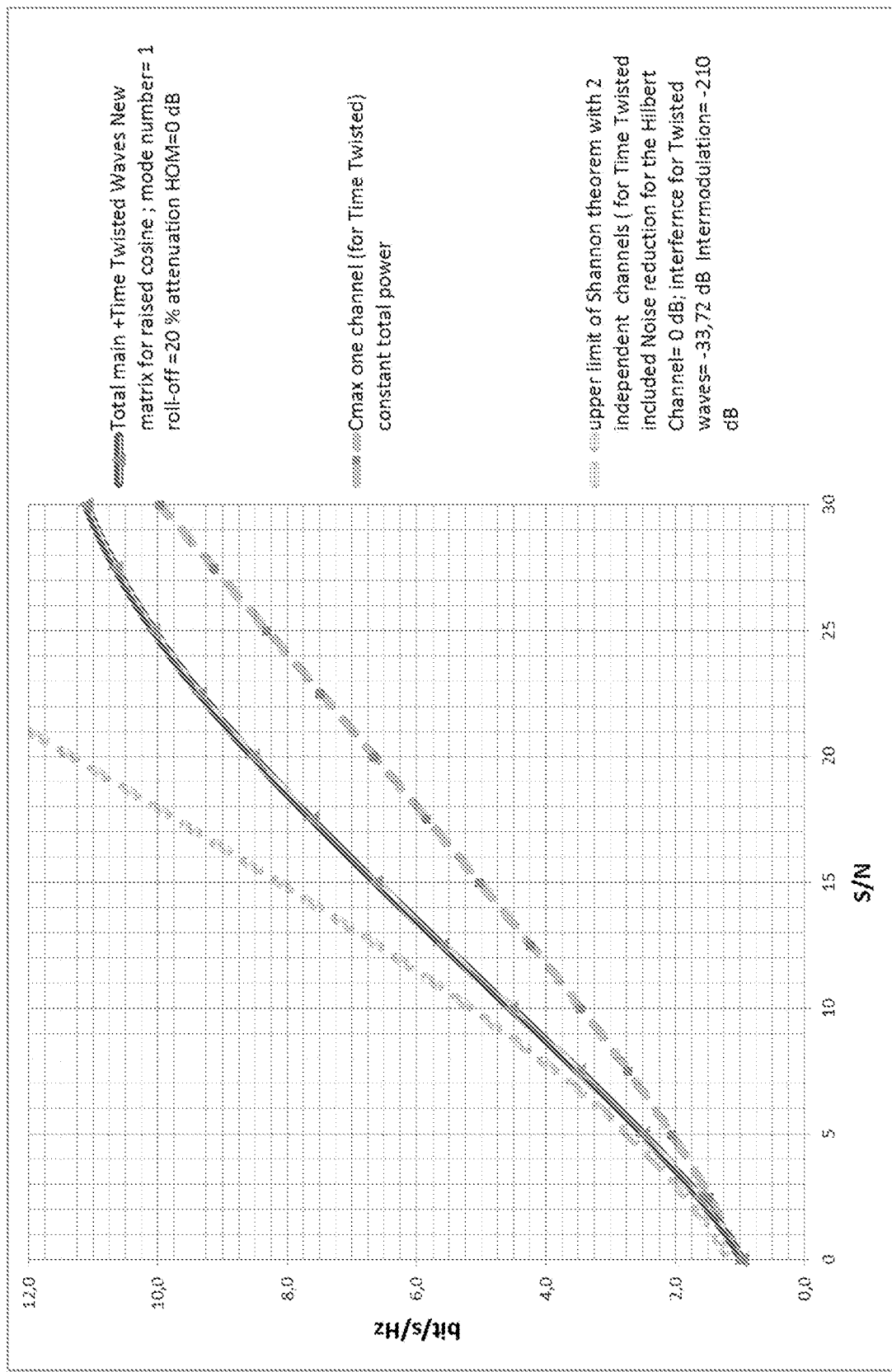

Additionally, FIG. 21 shows information capacity (in terms of bit/s/Hz) as a function of S/N (or $E_S/N_0$). In particular, the behavior of the twisted wave capacity shows a saturation level when the S/N is approaching 30 dB.

This could be considered a limit for the advantageous use of the time twisted wave technology; anyway, this limit is well beyond the practical values used for satellite and mobile communications.

The interesting aspect of using raised cosine for the main mode is the possibility to optimize the central frequency spacing between various channels, maintaining the twisted wave advantage in a reasonable window of S/N.

Figure 22:
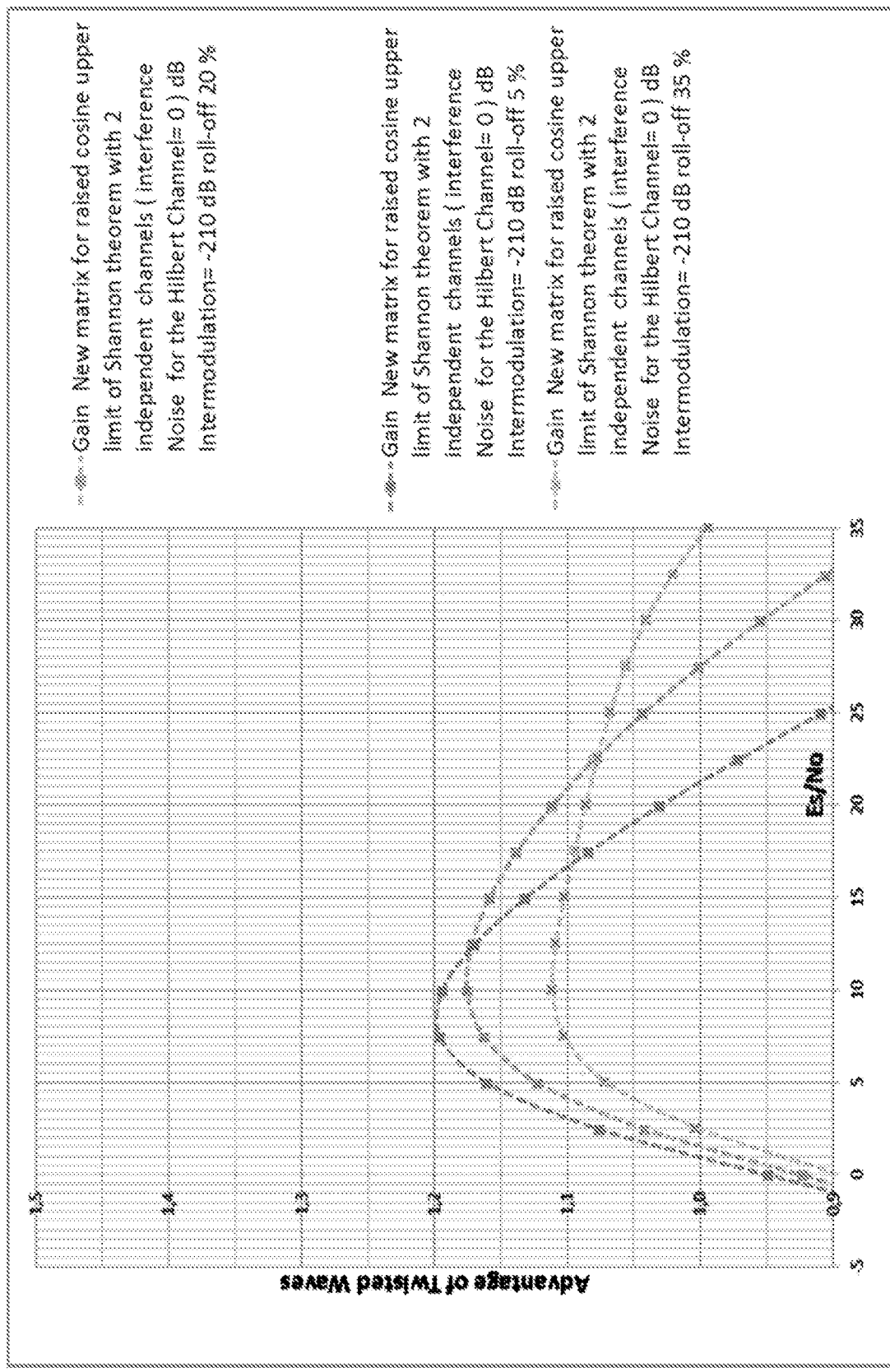

In this respect, FIG. 22 shows the gain of the twisted waves with respect to the S/N for different roll-off values (from 5% up to 35%) and assuming an attenuation of the HOMs of 0 dB.

In order to obtain comparable results, the reference channel is the equivalent rectangular filter corresponding to a roll-off of 0% with the same available power.

The reduction of roll-off causes an increase of the adjacent channel interference, which explains why the gain decreases more rapidly when the S/N increases. In the region where the Gain is maximum its value is higher when the roll-off is lower (e.g., 1.2 for a 5% roll-off vs 1.1 with a 35% roll). As mentioned above, this gain has been evaluated with respect to a rectangular filter.

As is known in the field of numerical analysis, the condition number of a function with respect to an argument measures how much the output value of the function can change for a small change in the input argument. This is used to measure how sensitive a function is to changes or errors in the input, and how much error in the output results from an error in the input.

With specific reference to matrices, the condition number is a typical parameter used to define the sensitivity of a matrix to errors. In mathematical terms, the condition number related to a square matrix A can be defined as:

$$\text{cond}(A) = \|A\| \cdot \|A\|^{-1},$$

where $\|A\|$ denotes the norm of the matrix A.

The matrix norm corresponding to a given vector norm is defined by:

$$\|A\| = \max_{x \neq 0} \frac{\|Ax\|}{\|x\|}.$$

The matrix norm corresponding to vector 1-norm is maximum absolute column sum:

$$\|A\|_1 = \max_j \sum_{i=1}^{n} |a_{ij}|.$$

Thence, the conditioning number is:

$$\text{cond}(A) = \|A\| \cdot \|A\|^{-1} = \left(\max_{x \neq 0} \frac{\|Ax\|}{\|x\|}\right) \cdot \left(\min_{x \neq 0} \frac{\|Ax\|}{\|x\|}\right)^{-1}.$$

The condition number of a matrix measures the amount of distortion of the unit sphere (in the corresponding vector norm) under the transformation by the matrix. The larger the condition number, the more distorted the unit sphere becomes when transformed by the matrix.

The condition number is therefore a measure of how close a matrix is to being singular; in fact, a matrix with large condition number is nearly singular, whereas a matrix with condition number close to 1 is far from being singular.

The practical computation of the conditioning number is rather complex and it has to be considered that for twisted wave signals the transformation matrix is not square, therefore a pseudo-inverse technique is used.

Therefore, it is hereby proposed to use an experimental verification of sensitivity to errors of the first reception matrix 122b, assuming to transmit only the main mode for different S/N values, verifying the level of noise introduced on the HOMs, which should be nominally equal to zero, and measuring how much the output noise is amplified by the matrix transformation.

In particular, the sensitivity of the first reception matrix 122b to the thermal noise with a bandwidth different from the mode 0 is a function of the bandwidth of the first reception filter 122a, the second transmission filter 114a and the spectrum of the residual noise.

It is worth considering that the analyzed configuration is rather new and that the behavior of colored noise spectrum is not clearly stated in the scientific available literature. Anyway, general speaking, the sensitivity can be limited to a negligible factor with appropriate selection of the bandwidth characteristics of the three filters of the first radio communications system 1, namely: the first transmission filter 112a, the second transmission filter 114a and the first reception filter 122a.

Figure 23:
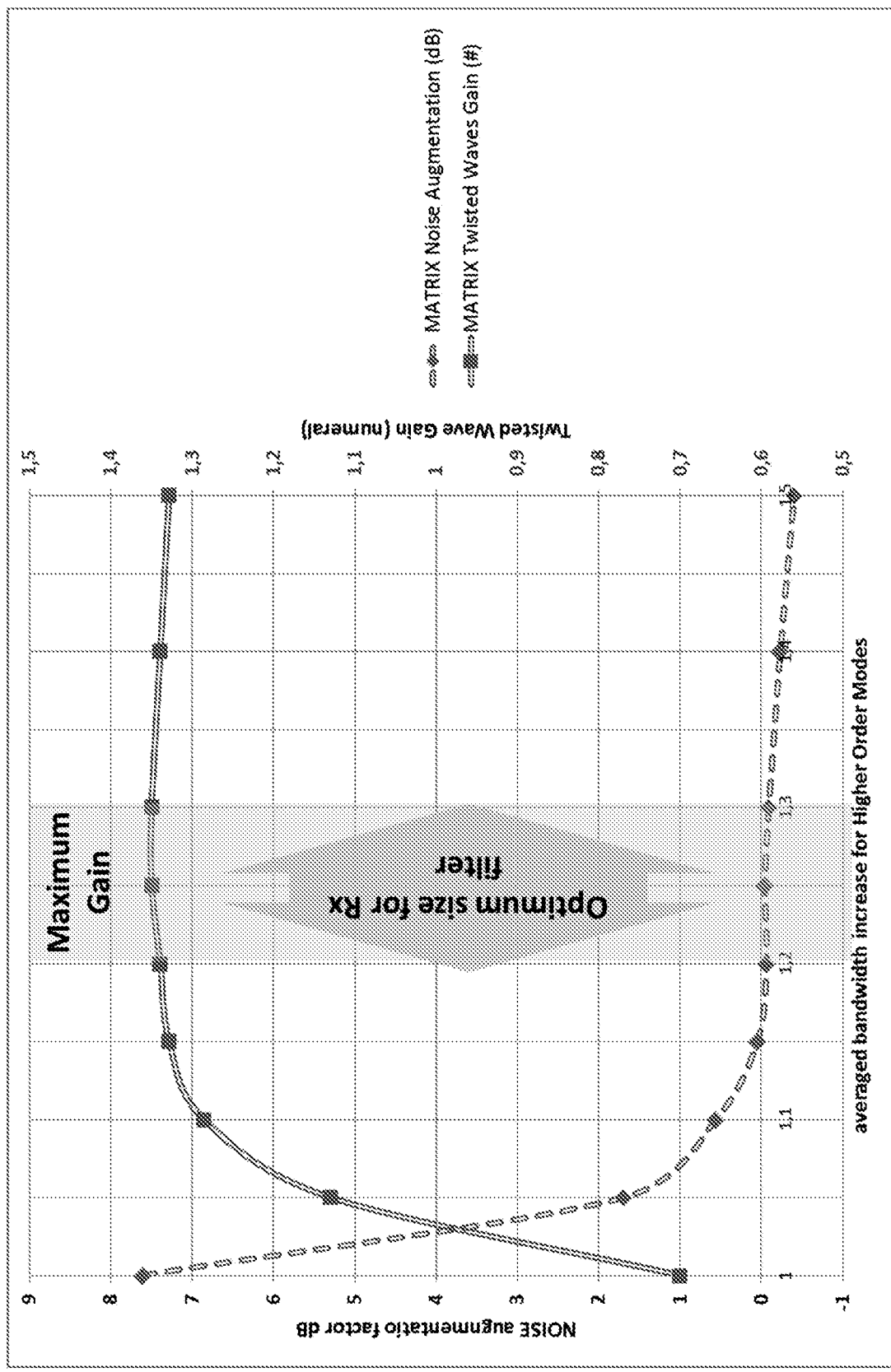

A number of comparative analyses have been performed changing the HOM parameters and leaving free the parameters of the main mode, which define the roll-off. In this respect, FIG. 23 shows results of such comparative analyses.

The possibility of shaping the first reception filter 122a as a part of the raised cosine filter related to the HOMs allow to reduce in a very meaningful way the reception useful bandwidth. As previously explained, in the analyzed cases the partition, between the second transmission filter 114a and the first reception filter 122a, of the exponent of the given raised cosine filter $H_{RC}^{HOM-RX}(f)$ in the equations (2) is 0.1 for the transmission side and 0.9 for the reception side.

Additionally, several tests have been performed by the Applicant in a real satellite communications scenario in order to verify the solidity of the performance of the first radio communications system 1 in the presence of real noise (which is always present in a practical implementation). In particular, these tests have been carried out by using a dedicated portion of a satellite transponder; moreover, a full transmit-receive link has been used to transmit and receive twisted wave signals, and a symbol rate of 240 ksymbol/s has been selected for sizing all the test hardware configuration.

The output figures of merit for the twisted wave signal analysis have been considered the output MER figures for a defined S/N value of the input signal compared with a conventional modulated signal, imposing the same power for both the configurations.

Therefore, the final advantage of the twisted waves with respect to a conventional system is obtained with the same transmitted power, reproducing with the measurements the same conditions assumed in the theoretical analysis.

In order to have a comprehensive view of the results, it is worth specifying that:

the transmitted signal is the sum of two signals, namely the main mode signal filtered by the first transmission filter 112a and the HOM signal filtered by the second transmission filter 114a; this HOM signal can have any possible energy-per-symbol level, such as the same as the main mode signal, or a 3 dB attenuation, or even an infinite attenuation (i.e., only the main mode is present);

the total power is kept constant; therefore, having for this specific implementation four HOM symbols for ten main mode symbols, the power distribution between modes (assuming A dB attenuation for the higher order modes) is $$Power_{mode0} = 10\log\left[\frac{5}{5 + 2 \times 10^{(A/10)}}\right] \text{ dB},$$

$$Power_{mode1} = A + 10\log\left[\frac{5}{5 + 2 \times 10^{(A/10)}}\right] - 4 \text{ dB},$$

$$\text{Total Power} = 10\log\left[\frac{5}{5 + 2 \times 10^{(A/10)}}\left(1 + \frac{2}{5}10^{A/10}\right)\right] = 0 \text{ dB};$$

the spectrum is measured at the output of the first transmitter 11 (i.e., when the bandwidth enters the first radio channel 13 and the satellite transponder);

at reception side, a first measurement is performed after the first reception filter 122a, before the matrix sampling at a symbol rate equal to 1/T (i.e., the sampling rate of the main mode);

if there is no HOM (i.e., A=∞), the scatter diagram represents the MER of a conventional receiver, while, in the presence of HOMs (i.e., A<∞), the scatter diagram represents the MER of a conventional receiver with the additional noise due to the HOMs;

if there is no HOM (i.e., A=∞), the MER should correspond to the MER measured before the first reception matrix 122*b* and after the first reception filter 122*a*;

after the GMF the MER is measured independently for the main mode and for the HOMs (1 or 2).

More in detail, tests have been executed for different configuration of the transmission power and for two different selection of the main mode roll-off, i.e., 20% and 35%. Indeed, the latter value (i.e., 35% roll-off) is necessary to transmit a DVB signal using the full transponder bandwidth with acceptable performance of the twisted wave signal with mode 1, while a 20% roll-off allows to obtain good performance either if the transponder is used for a multicarrier configuration or if the DVB signal (using the full transponder bandwidth) is configured with twisted mode 2.

It is worth noting that, due to the nature of the specific RF transmission section 116 used during tests (which was limited to 10 Watts at 1 dB compression point), the behavior of the twisted wave signal has been stressed up to the saturation level of said specific RF transmission section 116, thereby verifying the usability of the present invention in presence of a distortion of the received signal due to the non-linearity of the communications channel. In fact, the results obtained are very good up to the 1 dB compression point limit.

Figure 24:
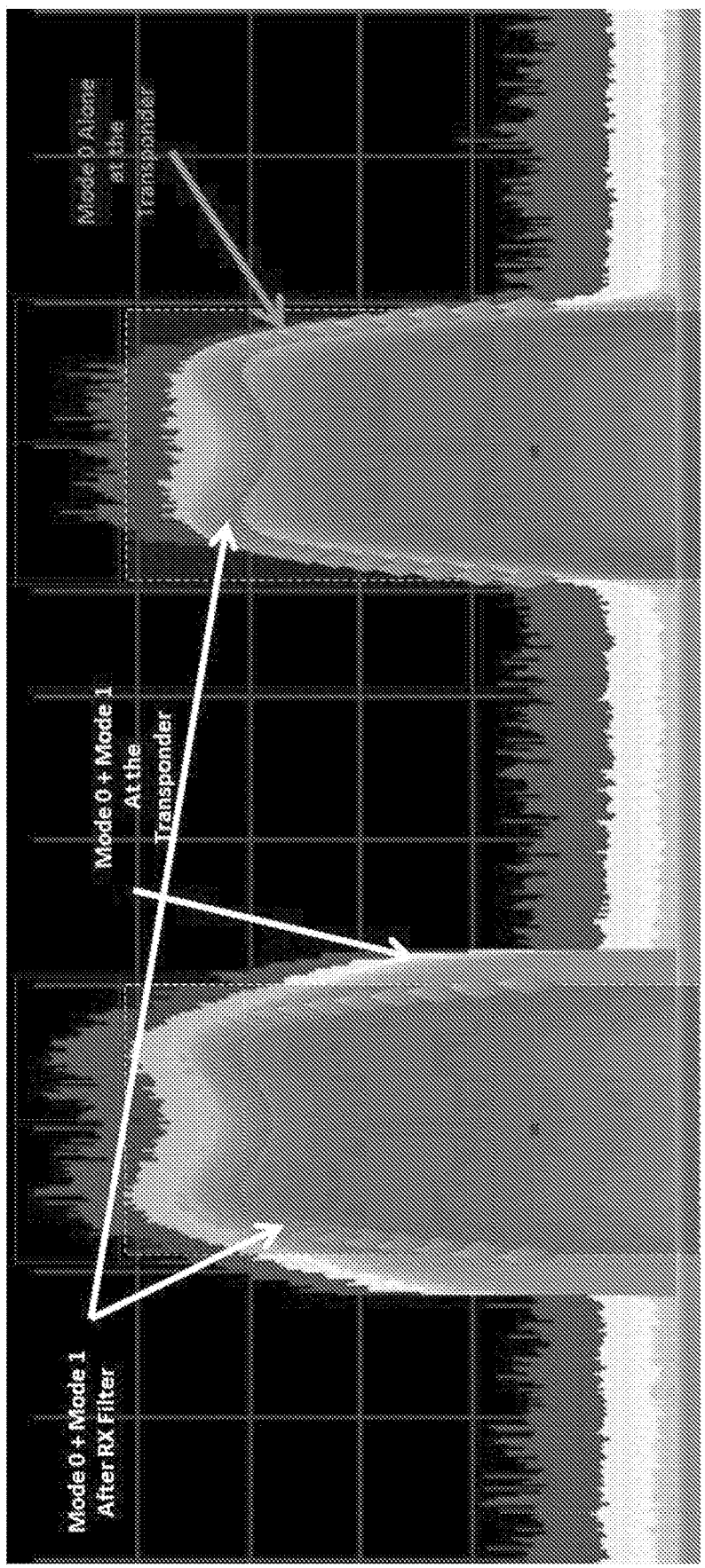
Figure 25:
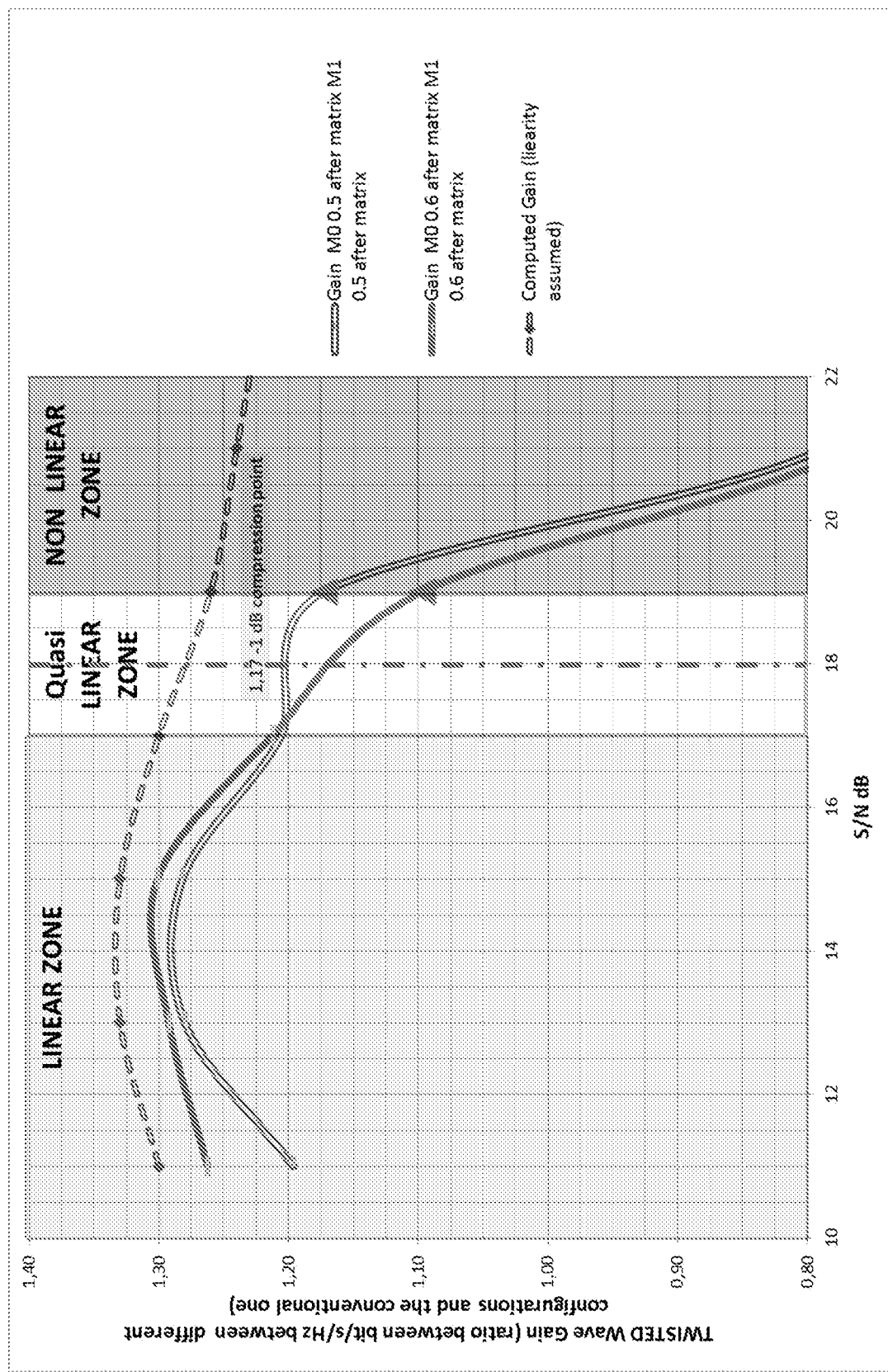

As far as the results of the aforesaid tests are concerned, FIG. 24 shows examples of spectra of the main mode and twisted mode 1 at the transponder level and at the first receiver 12 in the case of 20% ROF. Moreover, FIG. 25 shows gain curves of twisted waves (again in the case of a 20% ROF) with respect to conventional system, wherein said gain curves relate to the results of the tests performed and, for comparison purposes, also to the results of the computer simulations performed. Additionally, FIG. 26 shows MER curves of twisted waves (again in the case of a 20% ROF) with respect to conventional system, wherein said MER curves relate to the results of the tests performed and, for comparison purposes, also to the results of the computer simulations performed.

Figure 26:
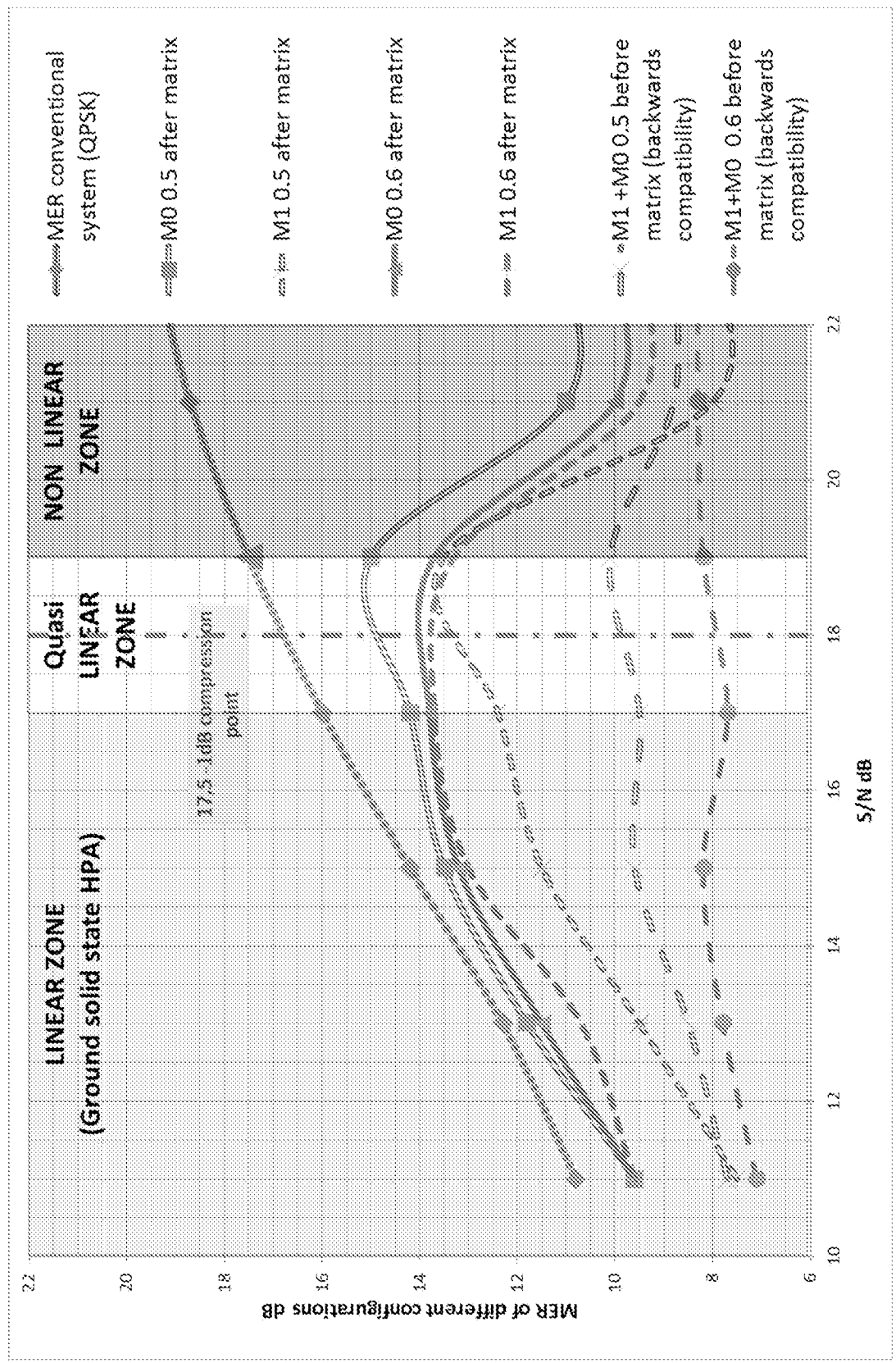

From FIGS. 25 and 26 it can be noted that the test results are in a good agreement with the ones obtained via computer simulation, also taking into consideration effects of the implementation errors and non-linearity effects of solid state amplifiers when S/N values are above 18 dB. It is possible also to note that, attenuating the HOM by about 3 dB, the performance are still acceptable, passing from a typical value of 8.4 dB to about 10.0 dB, in the linear zone.

As previously explained, the Applicant has carried out also several tests based on the use of a 35% ROF for the main mode. In particular, in this case, in order to simulate transponder effects, the transmitted signal has been filtered by a filtering function with the shape of a transponder bandwidth, scaled in order to have a symbol rate equal to 240 ksymbol/s, which is the rate used for the implemented configuration. The overall equivalent bandwidth at 40 MHz with symbol rate of 26.7 Msymbol/s is 360 KHz.

From the results of these tests it can be noted that the main mode is not affected by the transponder cut, while the HOM 1 is subjected to distortion. Anyway, these spectrum characteristics are conveniently taken into consideration by the first reception matrix 212*b*.

As explained in the foregoing, the present invention allows to extend the use of time twisted waves to a quasi-arbitrary main mode signal shape. In particular, up to now the application of time twisted waves to raised cosine filtered signals used by traditional communications systems (such as satellite communications systems) has been described in detail. Anyway, the present invention allows to exploit the time twisted wave technology also with other signal shapes, such as Gaussian signals used in GSM.

In this connection it is worth noting that raised cosine systems are the most critical and demanding ones in terms of the impairments and limitations on the HOM bandwidth. In fact, taking into consideration the use of a raised cosine filter with a cut-off frequency at ½T, it has to be noted that ½T represents the minimum possible bandwidth for a communication signal with a symbol rate of 1/T. Therefore, when using a GSM signal, the available bandwidth for HOMs increases meaningfully.

In particular, in the case of Gaussian main mode signal shape it is again convenient to use a raised cosine shape for the HOMs.

In the following the Gaussian case will be described in detail.

In particular, also in the Gaussian case the reconstruction at reception side of independent signals transmitted via main and twisted modes requires a bandwidth that is slightly larger than the minimum one (i.e., the Nyquist one) strictly necessary to sample the main mode signal. However, thanks to the Gaussian shape, the bandwidth of the HOMs can be inside the main mode bandwidth, simply using a raised cosine filter for HOMs (rather than another Gaussian).

In general terms, the maximum advantage is obtained by using two different transmission filters for main mode and HOMs. In this way, the time twisted technology can be advantageously exploited in radio communications systems based on GSM/PCS standard, using a traditional Gaussian filter for the main mode and adopting a suitable raised cosine filter for HOMs.

Figure 27:
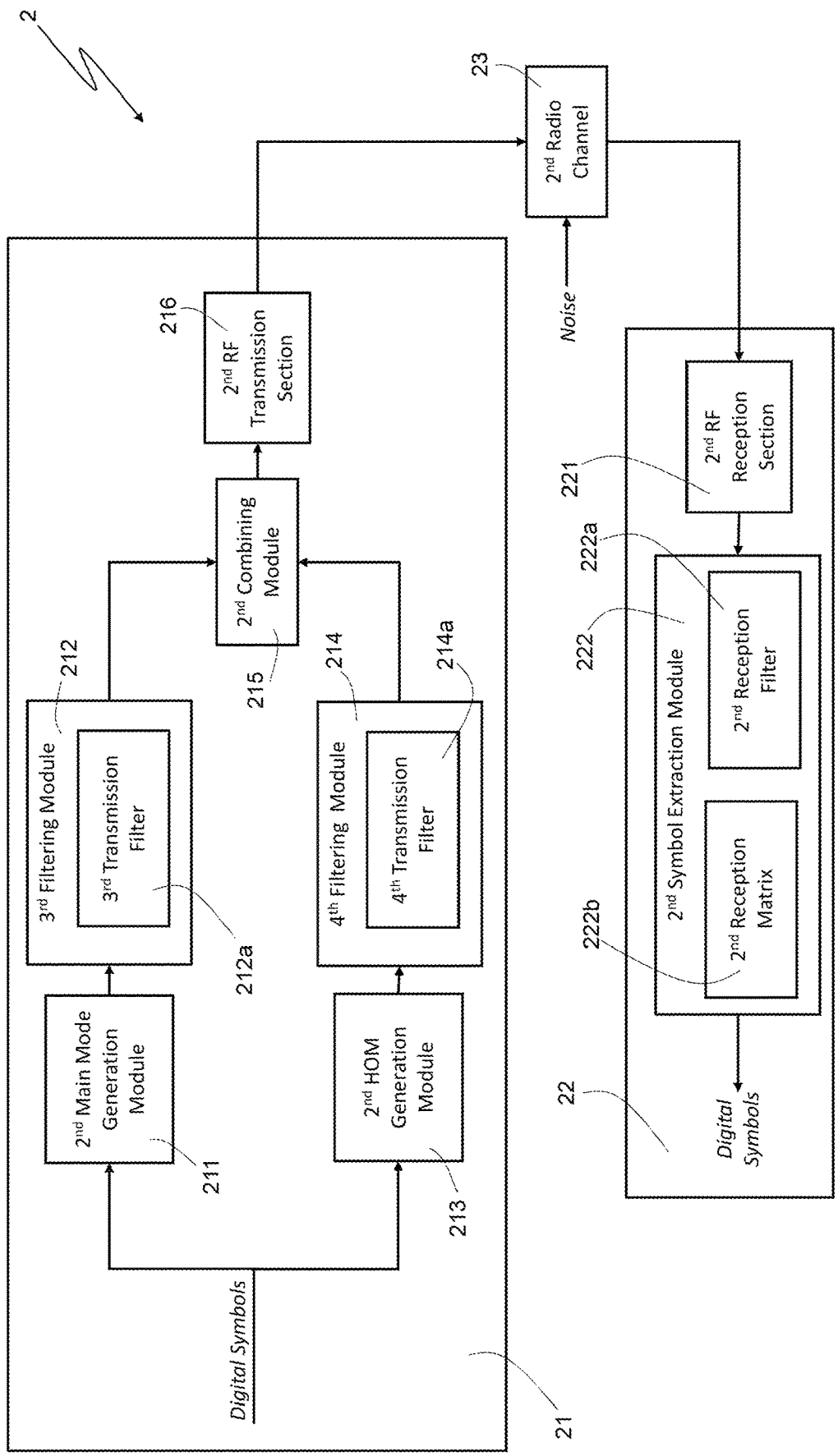
FIG. 27 schematically illustrates a second radio communications system according to a second preferred embodiment of the present invention.

In this connection, FIG. 27 shows a functional block diagram schematically representing a second radio communications system (denoted as a whole by 2) according to a second preferred embodiment of the present invention.

In particular, as shown in FIG. 27, the second radio communications system 2 includes a second transmitter 21 and a second receiver 22 configured to wirelessly communicate through a second radio channel 23 affected by noise.

More in detail, the second transmitter 21 is configured to:
generate or receive digital symbols to be transmitted; conveniently, said digital symbols having a given symbol rate associated with a corresponding symbol period;
generate, by means of a second main mode generation module 211, third digital time signals (conveniently, in-phase and quadrature components thereof), that are related to a first OAM mode with topological charge equal to zero (i.e., the main mode) and that carry third digital symbols to be transmitted; conveniently, each third digital time signal comprising respective third time samples having sampling period equal to the symbol period and carrying, each, a respective third digital symbol;
apply, by means of a third filtering module 212, a third transmission filter 212*a* to the third digital time signals, thereby obtaining filtered third digital time signals;
generate, by means of a second HOM generation module 213, fourth digital time signals (conveniently, in-phase and quadrature components thereof), that are related to one or more second OAM modes with topological charge different than zero (i.e., one or more twisted modes) and that carry fourth digital symbols to be transmitted; conveniently, each fourth digital time signal comprising respective fourth time samples that carry one or more respective fourth digital symbols by means of a modulation (conveniently, a phase-modulation; more conveniently, an amplitude and phase modulation) related to a respective second OAM mode with topological charge different than zero, have sampling period equal to the symbol period, and are time-shifted with respect to the third time samples and to the fourth time samples of the fourth digital time signals related to second OAM modes different than the respective one;

apply, by means of a fourth filtering module 214, a fourth transmission filter 214a to the fourth digital time signals, thereby obtaining filtered fourth digital time signals;

combine, by means of a second combining module 215, the filtered third and fourth digital time signals into second combined digital time signals, all having one and the same second time length; and transmit, by means of a second RF transmission section 216, a second (multi-frame) RF signal carrying, in successive, non-overlapped time frames having the second time length, the second combined digital time signals outputted by the second combining module 215.

Moreover, the second receiver 22 includes:

a second RF reception section 221 configured to receive the second RF signal transmitted by the second transmitter 21 and to process the received second RF signal so as to obtain a corresponding second incoming digital signal; and a second symbol extraction module 222, which is coupled with said second RF reception section 221 to receive the second incoming digital signal therefrom, and which is designed to process said second incoming digital signal so as to extract the third and fourth digital symbols carried by said second incoming digital signal.

More in detail, the second symbol extraction module 222 is designed to process successive, non-overlapped portions of the second incoming digital signal having the second time length by:

applying a second reception filter 222a to the second incoming digital signal's portions having the second time length, thereby obtaining filtered second incoming digital signal's portions; and extract, by using a second reception matrix 222b, the third and fourth digital symbols respectively carried by said filtered second incoming digital signal's portions.

Conveniently, as far as third digital time signal generation (i.e., main mode generation), fourth digital time signal generation (i.e., twisted mode generation) combined digital time signal generation, and RF transmission are concerned, the second transmitter 21 is designed to operate according to the transmission-related principles and features described in detail in WO 2015/067987 A1 and WO 2015/068036 A1 in connection with main and twisted mode generation and transmission (which transmission-related principles and features are herewith enclosed by reference).

Moreover, again conveniently, as far as RF reception and symbol extraction are concerned, the second receiver 22 is designed to operate according to the reception-related principles and features described in detail in WO 2015/067987 A1 and WO 2015/068036 A1 in connection with RF reception and symbol extraction (which reception-related principles and features are herewith enclosed by reference).

On the other hand, the second radio communications system 2 differs from the systems described in WO 2015/067987 A1 and WO 2015/068036 A1 in that these latter ones teach to use, at transmission side, one and the same transmission filter for the main and twisted modes, while the second transmitter 21 exploits two different filters, namely the third transmission filter 212a for the third digital time signals (i.e., for the main mode signals) and the fourth transmission filter 214a for the fourth digital time signals (i.e., for the twisted mode (or HOM) signals), wherein said third and fourth transmission filters 212a and 214a have different characteristics.

In particular, the third transmission filter 212a is a Gaussian filter, preferably a Gaussian filter with 3 dB BT product equal to 0.3 so as to be compatible with conventional GSM/PCS systems.

Additionally, the second transmitter 21, differently from the first transmitter 11, does not apply any time window to the filtered third digital time signals (i.e., to the main mode signals filtered by the third transmission filter 212a), since it is not necessary in this case.

Instead, as far as the fourth transmission filter 214a and the second reception filter 222a are concerned, the same features as the second transmission filter 114a and the first reception filter 122a apply. In particular, in order to stabilize the behavior of the second reception matrix 222b requiring, as explained in WO 2015/067987 A1 and WO 2015/068036 A1, a larger bandwidth to be resilient against errors and to allow pseudo-inversion procedure, also the fourth transmission filter 214a and the second reception filter 222a are raised-cosine-based filters designed so as to satisfy the equations (2), wherein the given raised cosine filter $H_{RC}^{HOM-RX}(f)$ in equations (2) has a roll-off of about 30% (for example, equal to 32%), the filter-partition-related parameter $\alpha$ is equal to 0.1, and the cutoff-frequency-related parameter $\gamma$ is comprised between 1.15 and 1.3 (for example, is equal to 1.25), thereby resulting (as in the case of the first radio communications system 1) that:

$$H_{HOM}^{TX}(f)=(H_{RC}^{HOM-RX}(f))^{0.1},$$

$$H^{RX}(f)=(H_{RC}^{HOM-RX}(f))^{0.9}, \text{ and}$$

$$f_C^{HOM-RX}=1.25 \cdot f_C^{MM},$$

wherein, for the second radio communications system 2, $f_C^{MM}$ denotes the cut-off frequency of the Gaussian filter used as the third transmission filter 212a for the main mode.

As is known, in the GSM standard a Gaussian minimum-shift keying (GMSK) with a BT product of 0.3 is used as a compromise between spectral efficiency and ISI. With this value of BT product, 99% of the power spectrum is within a bandwidth of 250 kHz; therefore, since GSM spectrum is divided into 200 kHz channels for multiple access, there is very little interference between the channels. The speed at which GSM can transmit, with BT=0.3, is 271 kb/s. This implies the use of a continuous phase modulation (CPM) scheme. The equivalent roll-off is of the order of 27%.

Figure 28:
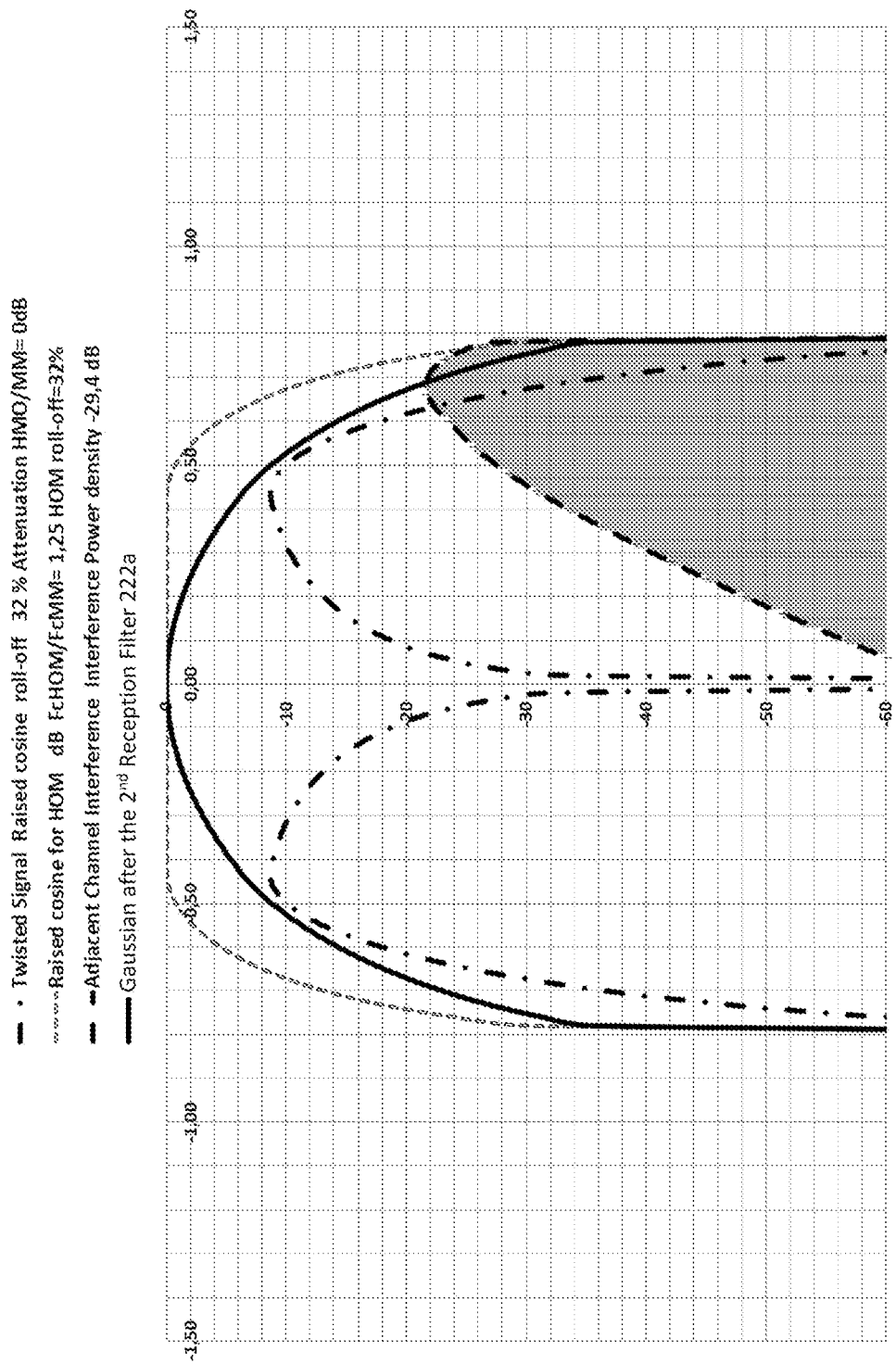

It is worth noting that, for Gaussian performance evaluation, both adjacent channel interference and residual ISI due to the filter shape are to be considered, since they can affect orthogonality between successive symbols. In this respect, FIG. 28 shows adjacent channel interference for a traditional GSM Gaussian channel.

It has to be considered that the use of a simple modulation scheme allows to accept without problems this sort of interferences, allowing a better constancy of the transmitted power level in time.

In particular, the Applicant has carried out an in-depth analysis of the performance (in terms of BER) of different traditional modulation schemes (such as BPSK, QPSK, GMSK) with and without the use of the time twisted waves, thereby arriving at the result that the adoption of different PSK schemes for the main mode and the HOMs can be convenient.

As previously explained, the third transmission filter 212a is preferably defined on the basis of a conventional Gaussian filter used in GSM/PCS systems. In this respect, FIG. 29 shows a conventional Gaussian transmission filter with 30% BT product as defined in GSM standard, along with ideal GSM modulation scatter diagram with transitions (assuming that no thermal noise is present). It is worth noting that the symbol rate of GMSK modulation scheme is based on CPM; therefore, the transition between two adjacent symbols never crosses the origin of the scatter pattern.

The use, as the third transmission filter 212a, of a Gaussian filter causes a strong limitation on the time tails of the impulse response of the third transmission filter 212a itself. Therefore, in this case there is no need to use a time window to limit main mode signals' time tails.

In this connection, FIG. 30 shows examples of spectra of the third transmission filter 212a implemented as a conventional GSM/PCS transmission filter and of a filtered third digital time signal (i.e., of a filtered main mode signal). Since no time window is used, the two spectra have exactly the same shape.

Figure 31:
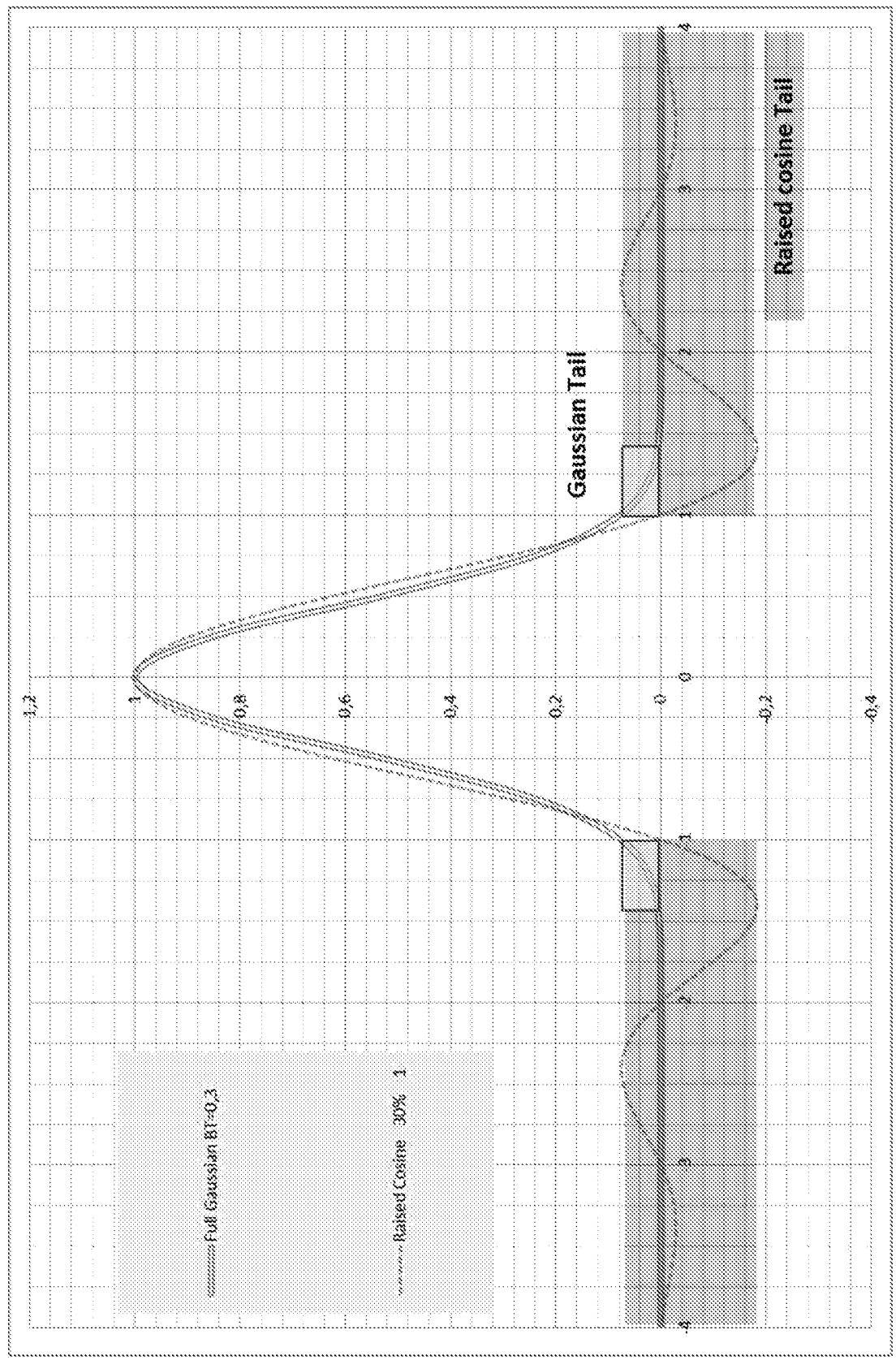

Additionally, FIG. 31 shows a comparison (in particular, with respect to signal tails) between time responses of the third transmission filter 212a implemented as a conventional GSM/PCS transmission filter and of a raised cosine with 30% ROF.

As previously explained and as in the case of the first radio communications system 1, also the second reception filter 222a is matched with the fourth transmission filter 214a (i.e., the filter used for the HOMs at transmission side), which requires more bandwidth. This fact does not increase meaningfully the overall thermal noise level, and does not increase IFI and adjacent channel interference, similarly to the case of the first radio communications system 1.

As previously explained, the Gaussian filter has very short time tails, but the application, at reception side, of the second reception filter 2221 slightly modifies this property. Actually, the distortion due to the second reception filter 222a has no impact inside the RF frame, but can increase IFI. In order to take this problem into account, it is sufficient to consider that the signal does not increase the tail length, but only the interference value on the first sample taken at its maximum value; so, a shift of T/4 of the sampling of the first sample in the second reception matrix 222b can conveniently cause such an interference to disappear.

FIGS. 32A, 32B and 32C schematically illustrate main mode signal evolution from the third filtering module 212 up to the application of the second reception filter 222a (compared to the case of raised-cosine-based filtering) when, for the main mode, at transmission side, no time window is used (FIG. 32A) and two different rectangular time windows are used (FIGS. 32B and 32C).

From FIGS. 32A, 32B and 32C it is evident that the main mode response is essentially insensitive to the time window, therefore it is not worthwhile to introduce any kind of time window filtering for Gaussian signals.

In this connection, Table V in FIG. 33 shows interference values computed for the three different time windows of the examples shown in FIGS. 32A, 32B and 32C.

The overall interference level is well below −28 dB for the main mode and around −48 dB for the HOMs. This small advantage for the HOMs is beneficial, considering that for the backward compatibility is useful to attenuate the HOMs, with respect to the main mode of a few dB (about 3 dB).

As far as the fourth transmission filter 214a and the second reception filter 222a are concerned, the technical features of the second transmission filter 114a and of the first reception filter 122a previously described in detail and the related technical considerations apply, mutatis mutandis, also to said fourth transmission filter 214a and said second reception filter 222a.

Figure 34:
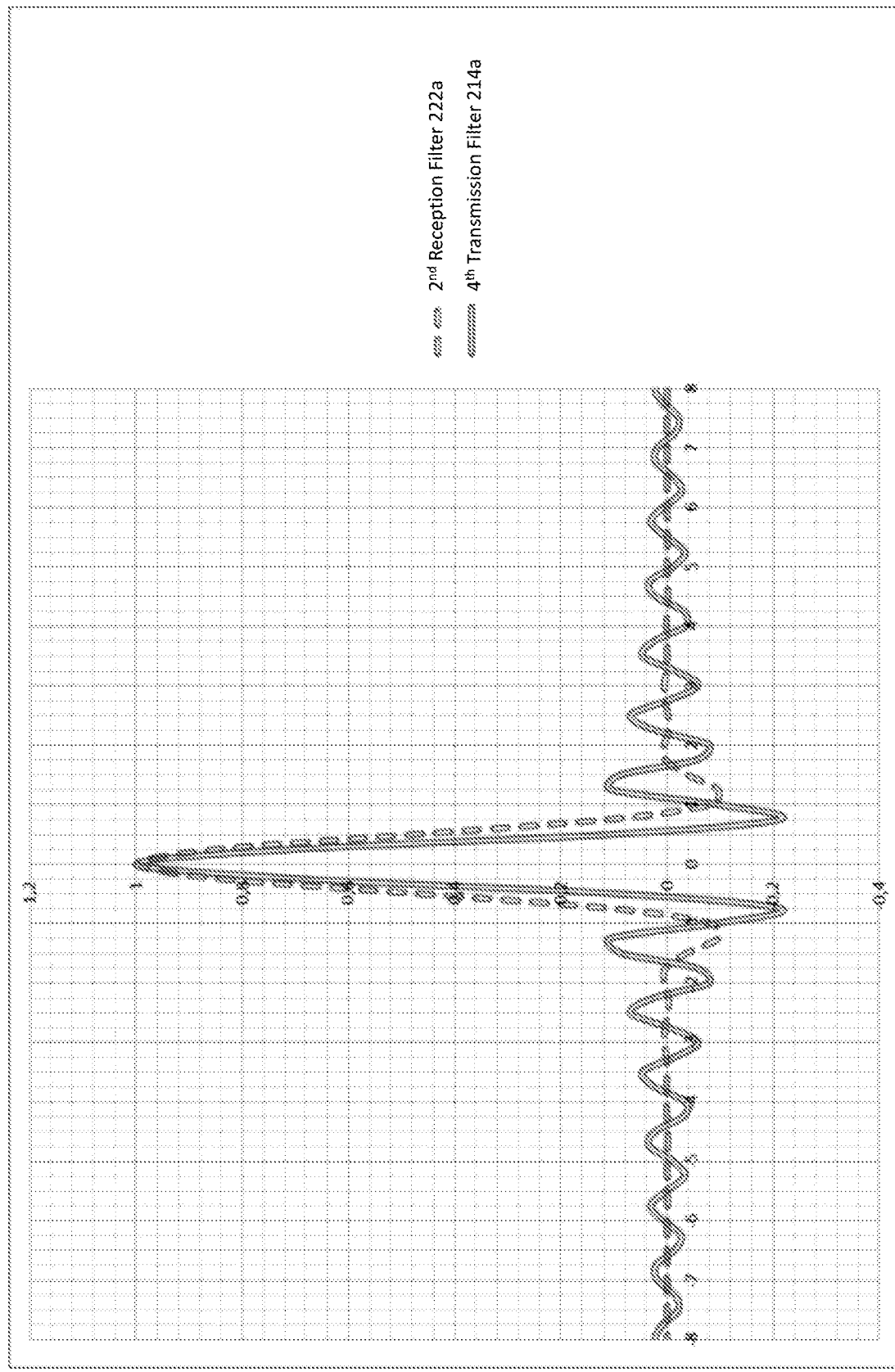

In this connection FIG. 34 shows:
- an example of impulse response of the forth transmission filter 214a, the latter being a raised cosine filter with roll-off equal to 32%, the filter-partition-related parameter $\alpha$ being equal to 0.1, and the cutoff-frequency-related parameter $\gamma$ being equal to 1.25; and
- an example of impulse response of the second reception filter 222a, the latter being a raised cosine filter with a roll-off equal to 32%, the respective exponent $(1-\alpha)$ being equal to 0.9, and the cutoff-frequency-related parameter $\gamma$ being equal to 1.25.

As expected, the two functions are not equal, due to the "unbalanced" partitioning of the raised cosine between transmission and reception sides.

Figure 35:
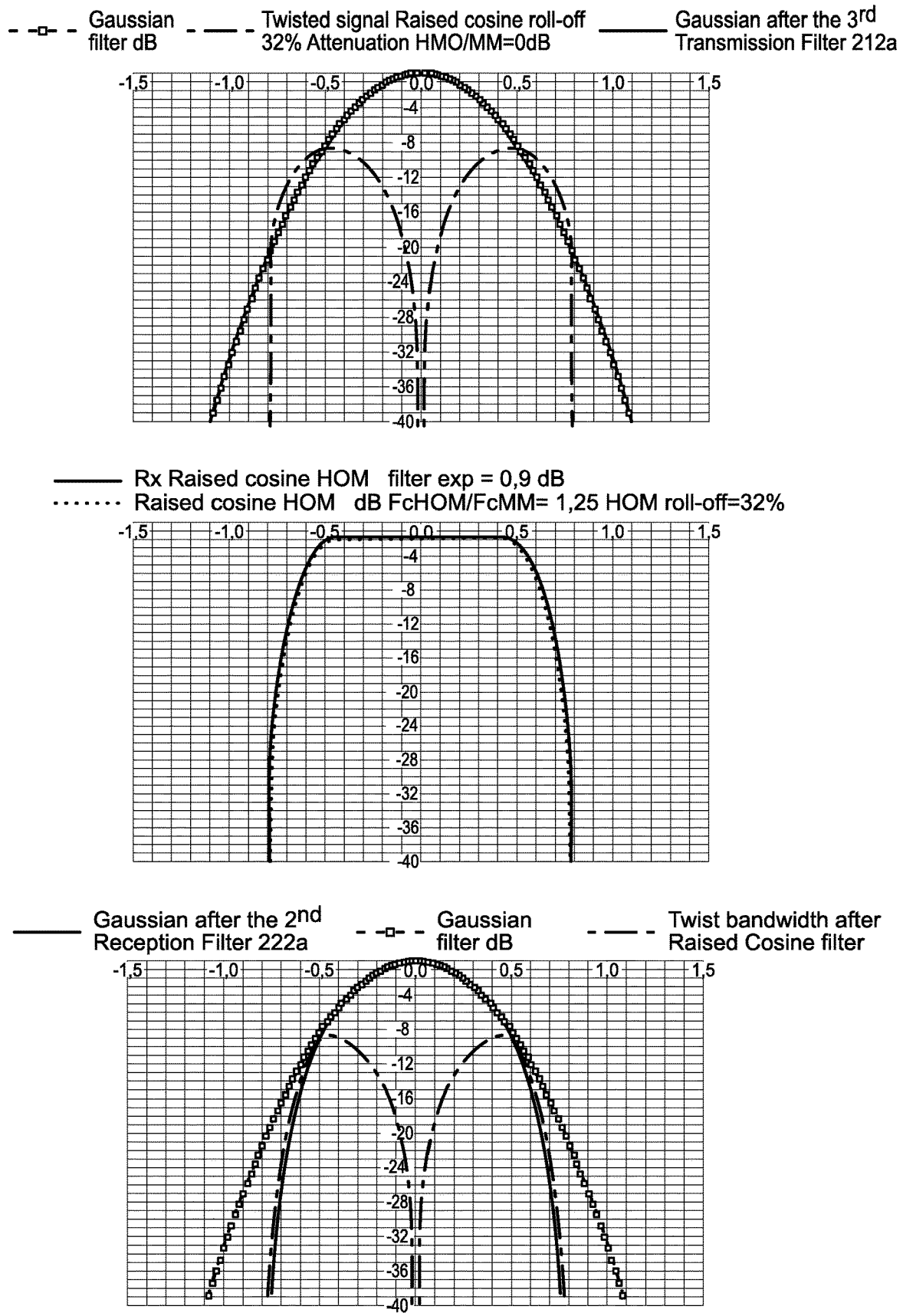

Moreover, FIG. 35 shows examples of spectra of main mode and HOM signals filtered by, respectively, the third transmission filter 212a and the fourth transmission filter 214a, and then by the second reception filter 222a (for the sake of clarity, also spectrum of said second reception filter 222a is shown in FIG. 35).

As far as RF frame optimization is concerned, it is worth noting that the use two independent filters for main mode and HOMs causes a broadening of the Gaussian response. Therefore, it is convenient to increase the size of the RF frame, to reduce the relative impact of this effect.

The minimum size can be considered as ten main symbols (i.e., ten third digital symbols carried by the main mode); in this way the HOM(s) are protected from interference within the RF frame (i.e., insensitivity to the preceding and the following RF frames).

Figure 36:
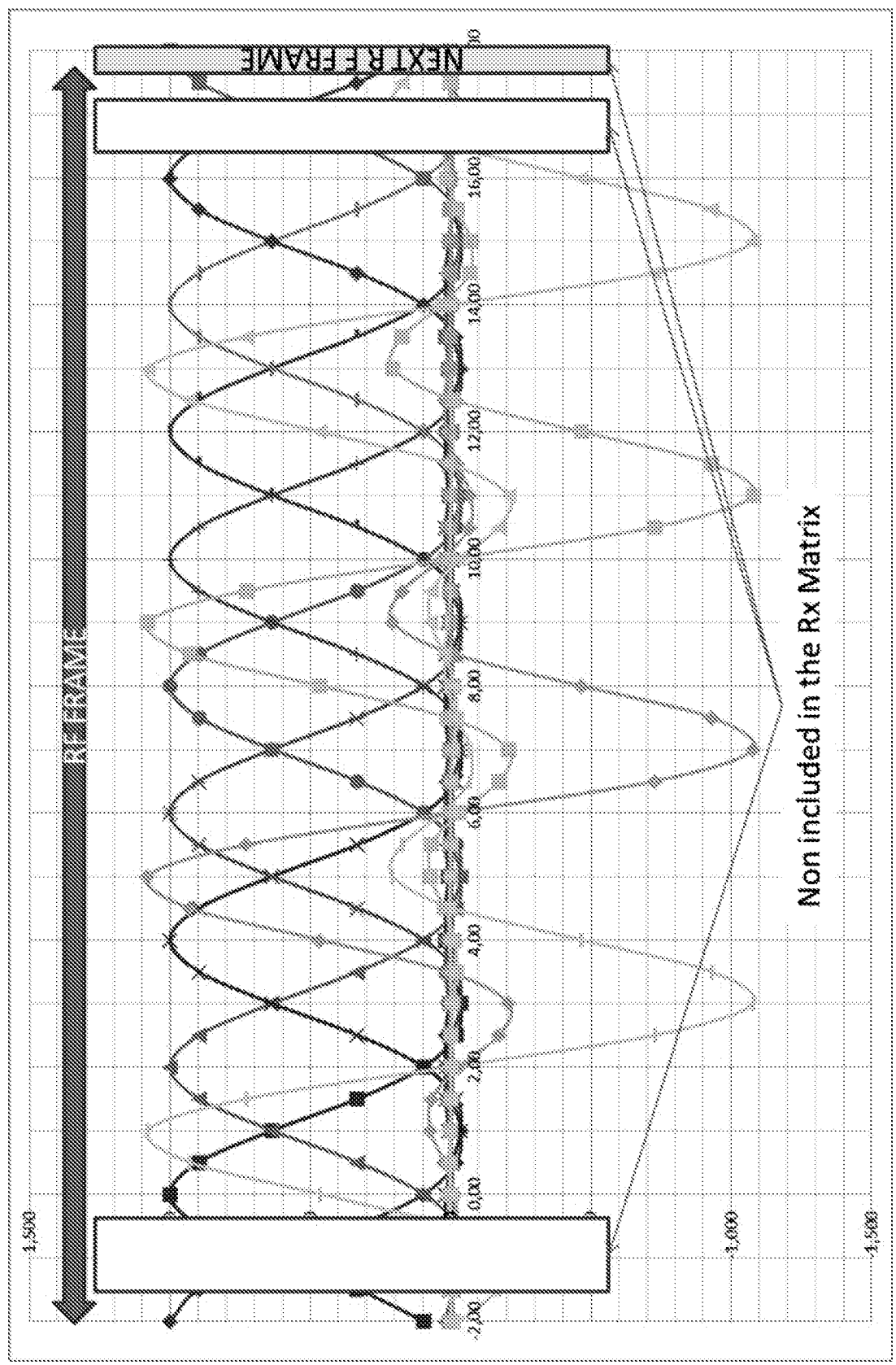

In addition, the first symbol of the next frame is considered to take into account the tail elongation of the main mode signal. This symbol is not considered for its own estimation, but only for its impact on the symbols of the analyzed frame. The logics of this procedure is shown in FIG. 36. The HOMs are reasonably inside the RF frame and the eleventh main symbol gives the impact of the next RF frame on the symbols carried by the previous RF frame, so only the second symbol of the next frame is not included.

As far as backward compatibility is concerned, the use at transmission side, for the main mode, of a Gaussian filter identical to the one used for GSM/PCS is a very good solution, which does not increase ISI level of the overall received signal.

In particular, the above technical considerations concerning backward compatibility of the first radio communications system 1 apply, mutatis mutandis, also to the second radio communications system 2.

Anyway, it is worth noting that, in order to analyze backward compatibility of the second radio communications system 2, it is necessary to consider the twisted wave configuration at the transmission side and the conventional square filter used for the Gaussian channel at the reception side, where no GMF is used and, thence, the HOM signals, present in the received twisted wave signal, are considered noise. This noise slightly degrades the performance of main mode on the conventional channel. However, the presence of HOMs is compatible with Gaussian PSK modulation used for GSM/PCS.

Figure 37:
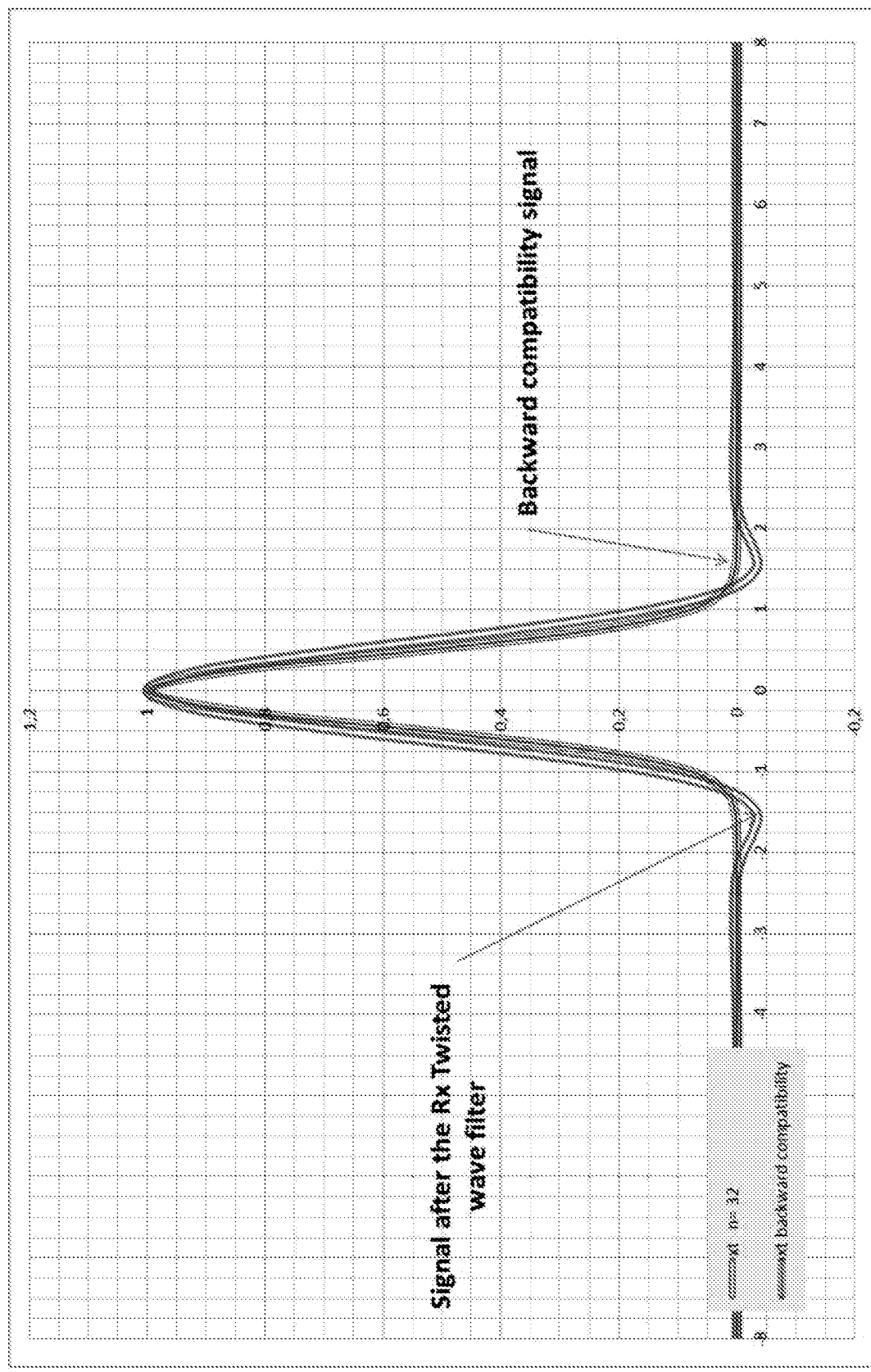

The main mode signal is identical to, and thence has the same behavior as, a conventional Gaussian signal when passes through the filter of a conventional GSM/PCS receiver. In this respect, FIG. 37 shows the impulse response at the output of the second reception filter 222a and at the output of a conventional Gaussian filter present in a conventional GSM/PCS receiver. From FIG. 37 it can be noted that the position of the small side lobe does not affect the signal evaluation after the first next sampling time. In order to limit the influence of the close RF frame, it is convenient to consider the sampling time for the first sample of the RF frame at +T/4 position, where the impulse response is crossing the zero. The case of the backward compatibility signal is identical to the conventional one, therefore there is no change with respect to the Gaussian signal. As a consequence the ISI level is very good as requested to get a good communication channel.

Figure 38:
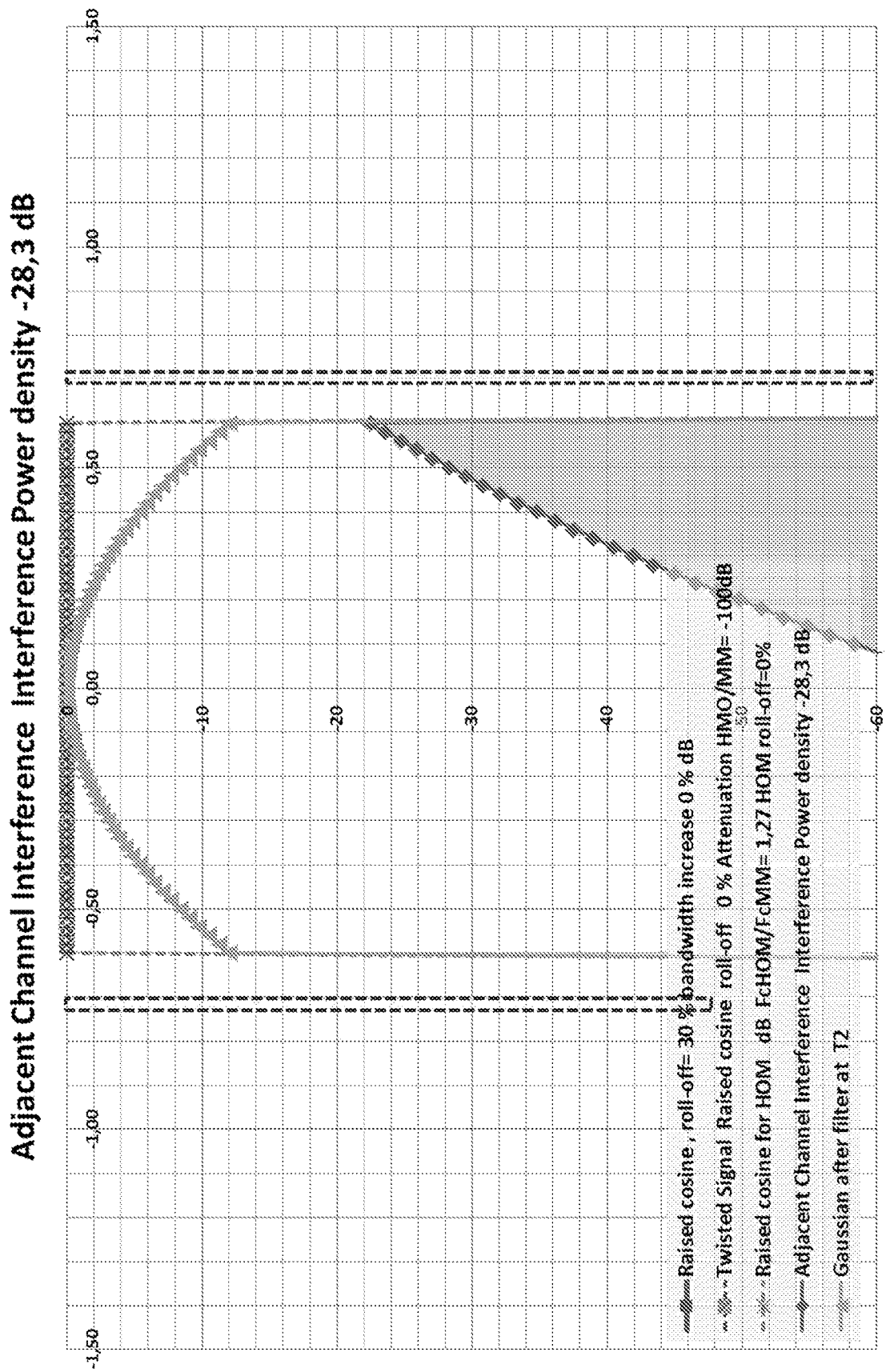

Additionally, FIG. 38 shows adjacent channel interference related to backward compatibility. As it can be inferred from FIG. 38, considering that the worst interference contribution is the one produced by the HOMs, which could be about 10 dB below, in practical terms the adjacent channel interference is fully negligible.

Figure 39:
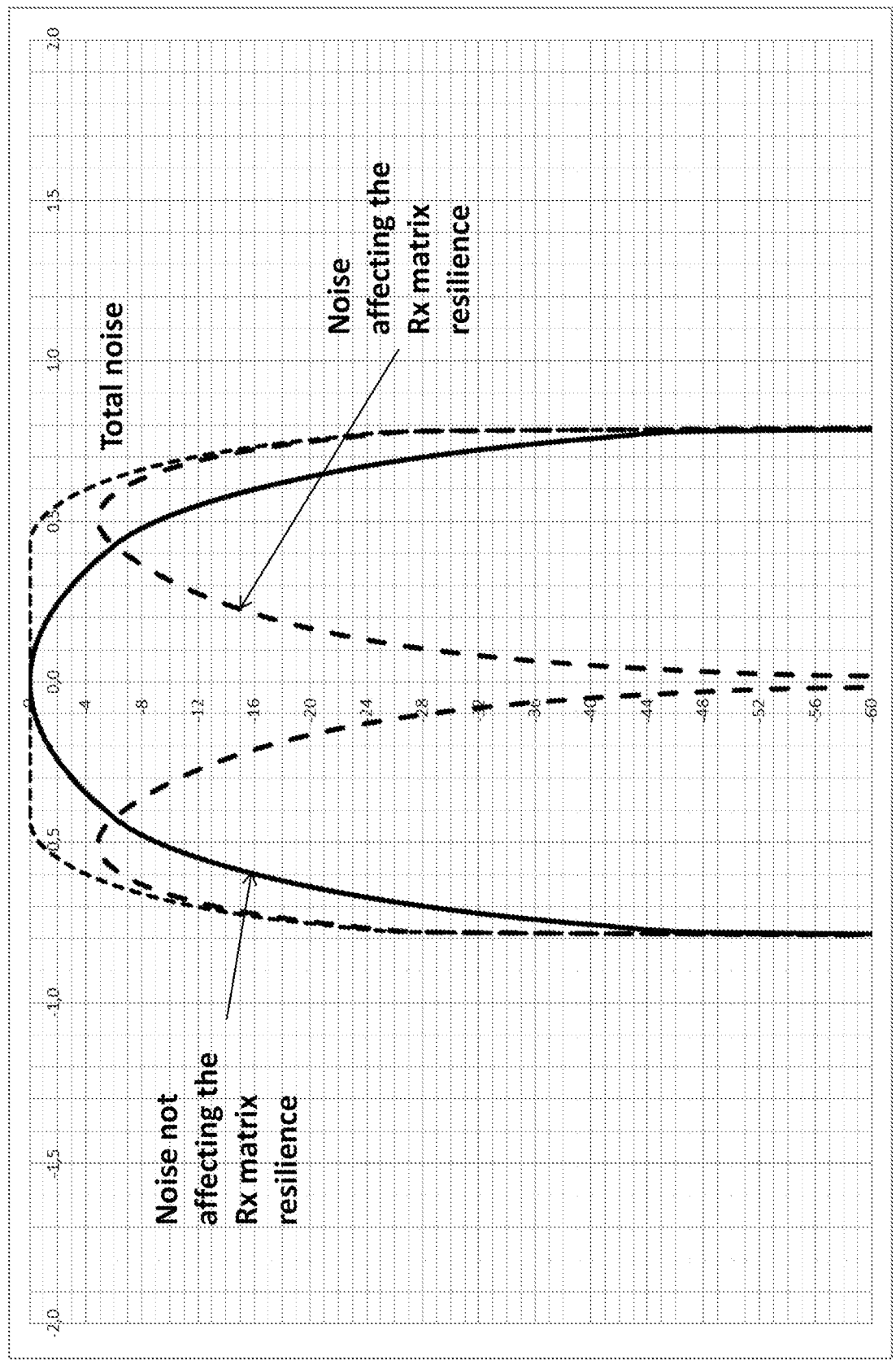

Moreover, the above technical considerations concerning thermal noise analysis at the first receiver 12 of the first radio communications system 1 apply, mutatis mutandis, also to the second radio communications system 2. In particular, also for this latter system the thermal noise affecting signals reaching the second reception matrix 222b can be considered as the sum of two components, namely a first noise component depending on the third transmission filter 212a and a second noise component due to the difference between the second reception filter 222a and the third transmission filter 212a. In particular, said first noise component has the same shape of the main mode and is considered by the GMF as an additional component of the main mode signal, while said second noise component affects main mode and HOMs. In this respect, FIG. 39 shows an example of the spectra of the aforesaid two noise components entering the second reception matrix 222b.

Figure 40:
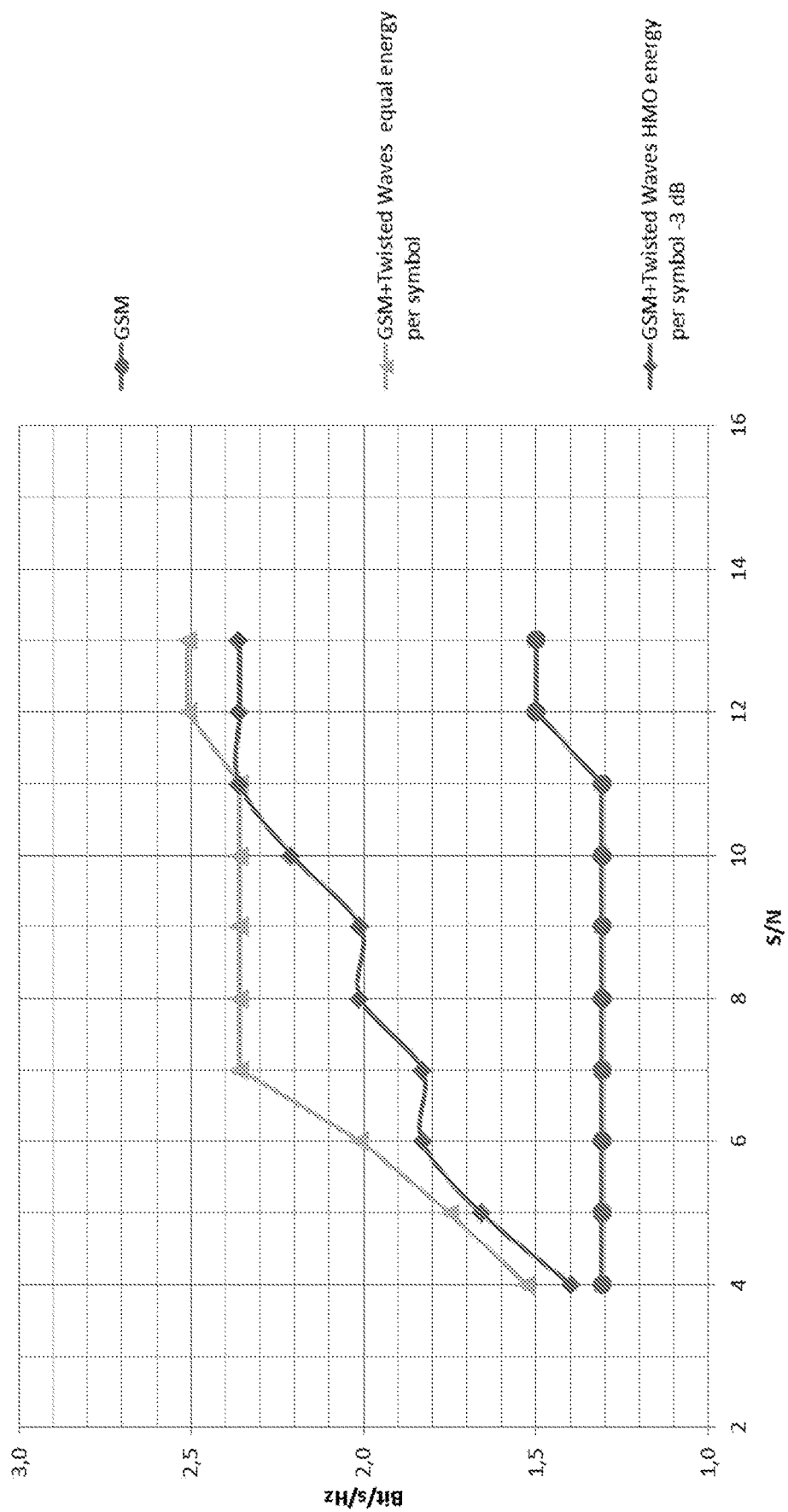

The Applicant has carried out many experimental tests also on the second radio communications system 2, whose results have demonstrated the feasibility and the technical advantages also of said second radio communications system 2. In this connection, FIG. 40 shows twisted wave spectral efficiency with respect to conventional GSM assuming a 0 dB attenuation and 3 dB attenuation of the HOMs with respect to the main mode. From FIG. 40 it can be noted that the attenuation causes an improvement of the spectral efficiency for low S/N and a moderate worsening for higher S/N.

Figure 41:
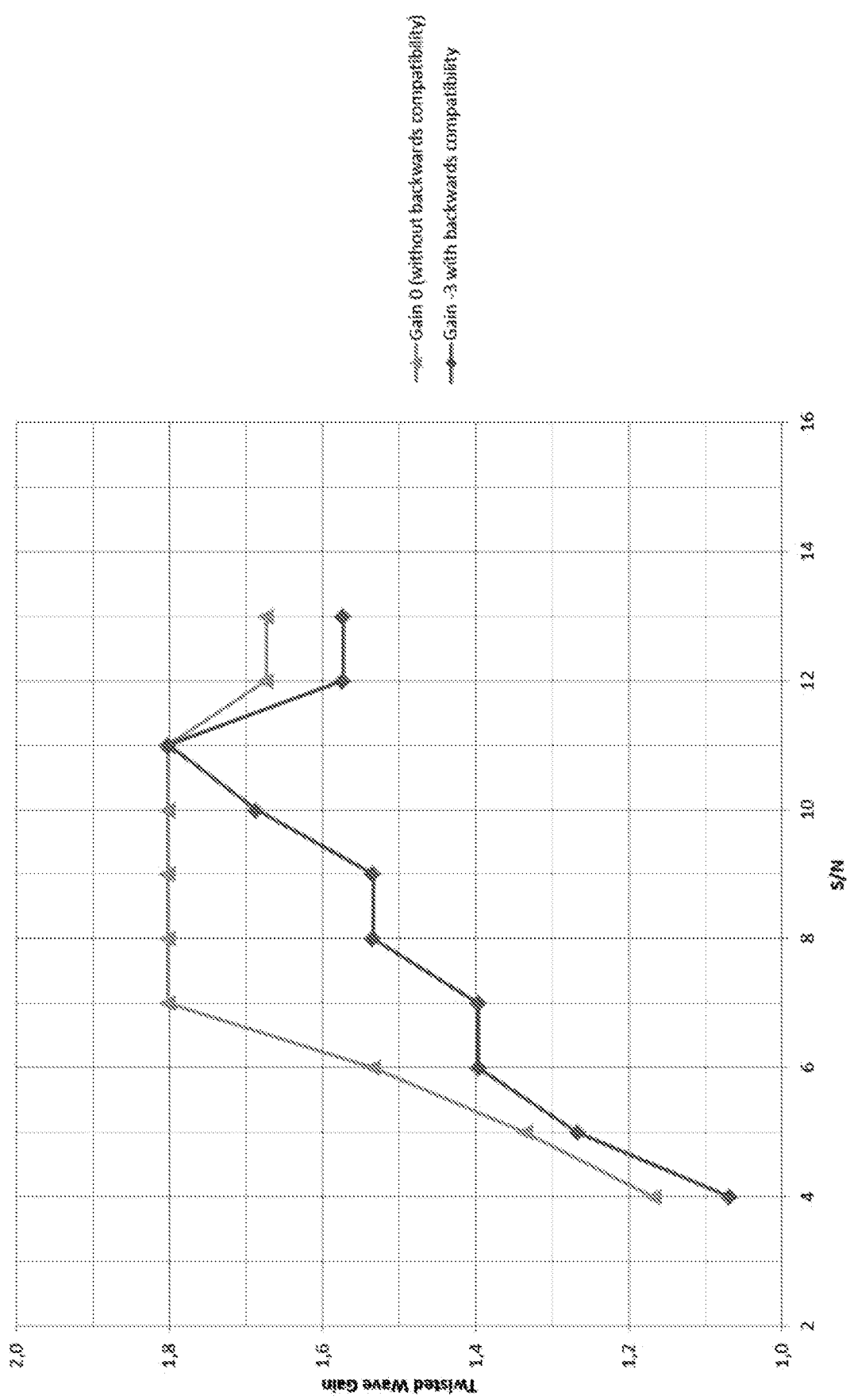

Additionally, FIG. 41 shows twisted wave gain with a dB attenuation and 3 dB attenuation of the HOMs with respect to the main mode. Form FIG. 41 it can be noted that the maximum gain is about 1.8 (with respect to Gaussian alone) for both 0 and 3 dB attenuations, but the maximum is much broader when 0 dB attenuation is used. This maximum is around S/N=8 dB for 0 dB and 10 dB for 3 dB attenuation. The value of the gain is of course related to the specific modulation scheme of the GSM signal, therefore the gain value can be larger than a modulation scheme which could be optimized for the main mode.

From the foregoing description the technical advantages of the present invention are immediately evident. In particular, it is worth summarizing some of said advantages: increased transmission capacity, compatibility with existing systems, use of twisted waves to encrypt the signal (a sort of "hardware encryption"), revitalization of existing radio-mobile standards, smart use of the frequency spectrum resources.

The invention claimed is:

1. Radio communications method including carrying out, by a transmitter, transmission operations that comprise:
   generating first digital time signals related to a first Orbital Angular Momentum mode with topological charge equal to zero, wherein each first digital time signal includes respective first time samples carrying corresponding first digital symbols to be transmitted;
   applying a first transmission filter to the first digital time signals, thereby obtaining filtered first digital time signals;
   generating second digital time signals related to one or more second Orbital Angular Momentum modes with topological charge different than zero, wherein each second digital time signal includes respective second time samples carrying one or more respective second digital symbols by means of a phase, or amplitude and phase, modulation related to a respective second Orbital Angular Momentum mode with topological charge different than zero;
   applying a second transmission filter to the second digital time signals, thereby obtaining filtered second digital time signals;
   combining the filtered first and second digital time signals into combined digital time signals, all having one and the same predefined time length; and
   transmitting a radio frequency signal carrying, in successive, non-overlapped time frames having the predefined time length, the combined digital time signals;
the radio communications method further including carrying out, by a receiver, reception operations that comprise:
   receiving the radio frequency signal transmitted by the transmitter;
   processing the received radio frequency signal so as to obtain a corresponding incoming digital signal; and
   processing said incoming digital signal so as to extract therefrom the first and second digital symbols carried thereby;
wherein the first transmission filter and the second transmission filter have different filtering characteristics.

2. The radio communications method of claim 1, wherein the first transmission filter is a Gaussian filter or a first raised-cosine-based filter, and the second transmission filter is a second raised-cosine-based filter different than said first raised-cosine-based filter.

3. The radio communications method of claim 2, wherein processing the incoming digital signal includes processing successive, non-overlapped portions of said incoming digital signal, wherein the successive, non-overlapped portions of said incoming digital signal have the predefined time length, and wherein processing successive, non-overlapped portions of said incoming digital signal includes:
   applying a reception filter to the successive, non-overlapped portions of said incoming digital signal, thereby obtaining filtered incoming digital signal's portions; and
   extracting, by using a reception matrix, the first and second digital symbols respectively carried by said filtered incoming digital signal's portions;
wherein said reception filter is a third raised-cosine-based filter that is related to the second transmission filter.

4. The radio communications method of claim 3, wherein the reception filter and the second transmission filter are such that:

$$H_{HOM}^{TX}(f) = (H_{RC}^{HOM-RX}(f))^{\alpha},$$

$$H^{RX}(f) = (H_{RC}^{HOM-RX}(f))^{(1-\alpha)}, \text{ and}$$

$$f_C^{HOM-RX} = \gamma \cdot f_C^{MM},$$

where $H_{HOM}^{TX}(f)$ denotes a frequency response of the second transmission filter, $H^{RX}(f)$ denotes a frequency response of the reception filter, $H_{RC}^{HOM-RX}$ denotes a frequency response of a predefined reference raised cosine filter, a is a rational number higher than zero and lower than 1, $f_C^{HOM-RX}$ denotes a cut-off frequency of said predefined reference raised cosine filter, $\gamma$ is a rational number higher than one, and $f_C^{MM}$ denotes a cut-off frequency of the first transmission filter.

5. The radio communications method of claim 4, wherein a is equal to 0.1.

6. The radio communications method according to claim 4, wherein $\gamma$ is equal to 1.25.

7. The radio communications method according to claim 3, wherein the second and third raised-cosine-based filters have one and the same roll-off factor equal to, or higher than, 30%.

8. The radio communications method according to claim 3, wherein the second and third raised-cosine-based filters have a roll-off factor equal to 32%.

9. The radio communications method according to claim 1, wherein the first transmission filter is a square root raised cosine filter.

10. The radio communications method according to claim 1, wherein the first transmission filter is a square root raised cosine filter with roll-off factor equal to, or higher than, 20%.

11. The radio communications method according to claim 1, wherein the first transmission filter is a square root raised cosine filter with roll-off factor comprised between 20% and 35%.

12. The radio communications method according to claim 1, wherein the first transmission filter is a square root raised cosine filter with roll-off factor equal to 20% or 35%.

13. The radio communications method according to claim 1, wherein:
the first transmission filter is a square root raised cosine filter with roll-off factor equal to, or higher than, 20%;
the transmission operations further comprise applying a transmission time window to the filtered first digital time signals, thereby obtaining filtered, time-limited first digital time signals; and
combining the filtered first and second digital time signals includes combining the filtered, time-limited first digital time signals and the filtered second digital time signals into combined digital time signals, all having the predefined time length.

14. The radio communications method of claim 13, wherein the transmission time window is a raised cosine time window.

15. The radio communications method according to claim 13, wherein the transmission time window is a raised cosine time window with time roll-off equal to 100%.

16. The radio communications method according to claim 1, wherein the transmission operations further comprise arranging the filtered second digital time signals within the combined digital time signals according to a given time arrangement criterion modifiable by the transmitter.

17. Radio communications system including:
a transmitter configured to carry out the transmission operations of the radio communications method as defined claim 1; and
a receiver configured to carry out the reception operations of the radio communications method as defined in claim 1.

18. Transmitting and receiving device/system/equipment configured to carry out the transmission operations and the reception operations of the radio communications method as defined in claim 1.

19. Transmitting device/system/equipment configured to carry out the transmission operations of the radio communications method as defined in claim 1.

20. Receiving device/system/equipment configured to carry out the reception operations of the radio communications method as defined in claim 1.

* * * * *